US011390354B2

(12) United States Patent
Dunlap, III et al.

(10) Patent No.: US 11,390,354 B2
(45) Date of Patent: Jul. 19, 2022

(54) BRAKING SYSTEM FOR A BICYCLE

(71) Applicant: SRAM, LLC, Chicago, IL (US)

(72) Inventors: Charles Dunlap, III, Manitou Springs, CO (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/124,649

(22) Filed: Dec. 17, 2020

(65) Prior Publication Data
US 2021/0101658 A1 Apr. 8, 2021

Related U.S. Application Data

(63) Continuation of application No. 16/294,617, filed on Mar. 6, 2019, now Pat. No. 10,913,510.

(51) Int. Cl.
*B62L 3/02* (2006.01)
*B62L 1/00* (2006.01)
*F16D 65/00* (2006.01)
*F16D 55/225* (2006.01)
*F16D 65/18* (2006.01)
*B62L 3/08* (2006.01)
(Continued)

(52) U.S. Cl.
CPC .............. *B62L 3/023* (2013.01); *B62L 1/005* (2013.01); *B62L 3/08* (2013.01); *F16D 55/225* (2013.01); *F16D 65/0056* (2013.01); *F16D 65/0068* (2013.01); *F16D 65/18* (2013.01); *F16D 2055/0008* (2013.01); *F16D 2055/0016* (2013.01); *F16D 2121/04* (2013.01)

(58) Field of Classification Search
CPC .............. F16D 55/225; F16D 65/0056; F16D 65/0068; F16D 65/18; F16D 2055/0008; F16D 2055/0016; F16D 2121/04; B62L 3/023; B62L 1/005; B62L 3/08
USPC .............................. 188/344, 72.4; 303/9.64
See application file for complete search history.

(56) References Cited

U.S. PATENT DOCUMENTS 3,554,334 A    1/1971   Shimano
4,598,954 A *   7/1986   Hayashi .................. B60T 8/261
                                                           188/106 P
(Continued)

FOREIGN PATENT DOCUMENTS

CN           206841410 U     1/2018
DE       102014007717 B3     9/2015
(Continued)

OTHER PUBLICATIONS

Syscend, Inc, "Surestop Brake System | Safer, Smarter, Simpler Braking", surestop.bike, Apr. 6, 2018, 7 pages, http://surestop.bike.

Primary Examiner — Thomas W Irvin

(57) ABSTRACT

Example brake systems and apparatus for providing pitch control on bicycles are described herein. An example rear brake caliper described herein includes a caliper housing to be coupled to the bicycle. The caliper housing includes a first port to be fluidly coupled to a first fluid line fluidly coupled to a front brake actuator and a second port to be fluidly coupled to a second fluid line fluidly coupled to a front brake caliper. The rear brake caliper also includes a valve between the first port and the second port. The valve is operable to affect fluid flow between the first port and the second port.

15 Claims, 28 Drawing Sheets

(51) Int. Cl.
*F16D 121/04* (2012.01)
*F16D 55/00* (2006.01)

(56) References Cited

U.S. PATENT DOCUMENTS

| | | | |
|---|---|---|---|
| 5,501,511 A * | 3/1996 | Wagner | B60T 8/261 |
| | | | 303/113.5 |
| 6,193,030 B1 * | 2/2001 | Kuo | B62L 1/00 |
| | | | 188/344 |
| 6,382,374 B1 * | 5/2002 | Iwai | B60T 8/261 |
| | | | 188/24.14 |
| 6,651,790 B2 | 11/2003 | Juan | |
| 7,464,798 B2 | 12/2008 | Sandro et al. | |
| 7,695,074 B2 * | 4/2010 | Pongo | B62L 3/023 |
| | | | 303/9.61 |
| 7,980,366 B2 * | 7/2011 | Pericevic | F16D 65/18 |
| | | | 188/72.4 |
| 7,997,389 B2 | 8/2011 | Chen | |
| 8,051,963 B2 * | 11/2011 | Kofuji | F16D 65/18 |
| | | | 188/352 |
| 10,293,878 B2 * | 5/2019 | Como | B60T 8/176 |
| 10,690,200 B2 * | 6/2020 | Larose | F16D 67/04 |
| 2009/0243377 A1 * | 10/2009 | Kofuji | B60T 8/1766 |
| | | | 303/9.64 |
| 2012/0241261 A1 | 9/2012 | Tsai | |
| 2014/0166411 A1 | 6/2014 | Riley et al. | |
| 2015/0336629 A1 | 11/2015 | Ruopp | |
| 2017/0334509 A1 | 11/2017 | Fang et al. | |
| 2018/0072371 A1 | 3/2018 | Wu | |
| 2018/0170472 A1 | 6/2018 | Corno et al. | |
| 2018/0216682 A1 * | 8/2018 | Larose | F16D 67/04 |
| 2019/0276113 A1 * | 9/2019 | Merkle | B62L 3/023 |

FOREIGN PATENT DOCUMENTS

| | | |
|---|---|---|
| TW | I582004 B | 5/2017 |
| TW | 201803765 A1 | 2/2018 |
| WO | 2017015763 | 2/2017 |
| WO | 2018099713 A1 | 6/2018 |

\* cited by examiner

BRAKING SYSTEM FOR A BICYCLE

The present application is a continuation of U.S. patent application Ser. No. 16/294,617, filed Mar. 6, 2019, the contents of which are incorporated herein in their entirety.

FIELD OF THE DISCLOSURE

This disclosure relates generally to bicycle braking systems and, more specifically, to brake systems and apparatus for providing control of bicycles.

BACKGROUND

Bicycles and other two-wheel vehicles often include a front brake and a rear brake. The front brake may be actuated to slow the front wheel and the rear brake may be actuated to slow the rear wheel. The front and rear brakes are actuated independently via respective levers or actuators. Riders have a relatively high center of gravity on bicycles. If a rider actuates the front brake to provide a high deceleration rate, the rear wheel of the bicycle may rise off of the ground. This results in less control of the bicycle. Further, in extreme cases, lifting of the rear wheel may cause a rider to pitch over the front of the bicycle, which can cause injury to the rider.

SUMMARY

An example rear brake caliper for a bicycle is disclosed herein. The rear brake caliper includes a caliper housing to be coupled to the bicycle. The caliper housing includes a first port to be fluidly coupled to a first fluid line fluidly coupled to a front brake actuator and a second port to be fluidly coupled to a second fluid line fluidly coupled to a front brake caliper. The rear brake caliper also includes a valve between the first port and the second port. The valve is operable to affect fluid flow between the first port and the second port.

An example brake system for a bicycle is disclosed herein. The brake system includes a front brake actuator, a front brake caliper, a rear brake actuator, a rear brake caliper, a first fluid line coupled between the front brake actuator and the rear brake caliper, a second fluid line coupled between the rear brake caliper and the front brake caliper, and a third fluid line coupled between the rear brake actuator and the rear brake caliper. Actuation of the front brake actuator supplies first brake fluid through the first fluid line, the rear brake caliper, and the second fluid line to the front brake caliper to actuate the front brake caliper to apply braking pressure to a front wheel of the bicycle. Actuation of the rear brake actuator supplies second brake fluid to the rear brake caliper to apply braking pressure to a rear wheel of the bicycle without actuating the front brake caliper.

Another example brake caliper for a bicycle disclosed herein includes a caliper housing to be coupled to the bicycle near a rear wheel of the bicycle. The caliper housing includes a first port to be fluidly coupled to a first fluid line fluidly coupled to first master piston chamber, a second port to be fluidly coupled to a second fluid line fluidly coupled to a front brake caliper, a third port to be fluidly coupled a third fluid line fluidly coupled to second master piston chamber, and a primary slave piston chamber. The third port is fluidly coupled to the primary slave piston chamber such that pressurization of brake fluid in the second master piston chamber increases pressure in the primary slave piston chamber to actuate the rear brake caliper. The caliper housing also includes a secondary slave piston chamber isolated from the primary slave piston chamber. The first port is fluidly coupled to the secondary slave piston chamber such that pressurization of brake fluid in the first master piston chamber increases pressure in the secondary slave piston chamber to actuate the rear brake caliper.

BRIEF DESCRIPTION OF THE DRAWINGS

FIG. 3A shows the example brake system during a state when neither brake actuator is actuated.

FIG. 17A shows an example of the rear brake caliper when an example front brake actuator of the example brake system is actuated and a rear wheel off the example bicycle is in contact with a riding surface.

FIG. 20A shows the example brake system during a state when neither brake actuator is actuated.

FIG. 21A shows the example brake system during a state when neither brake actuator is actuated.

The figures are not to scale. Instead, the thickness of the layers or regions may be enlarged in the drawings. In general, the same reference numbers will be used throughout the drawing(s) and accompanying written description to refer to the same or like parts.

Figure 1:
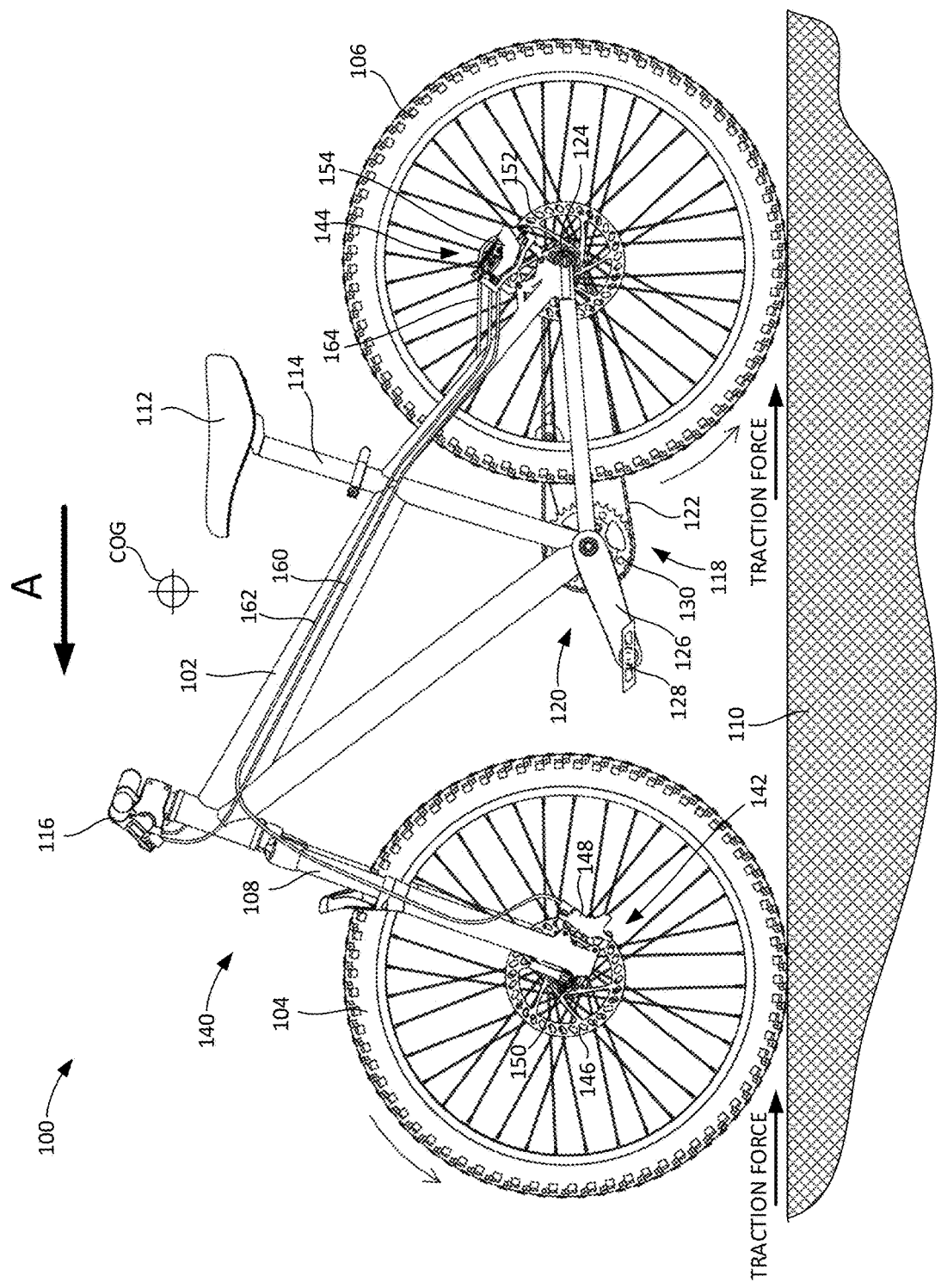
FIG. 1 is a side view of an example bicycle that may employ an example brake system constructed in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Brakes on modern bicycles have evolved to utilize technology from automotive braking systems, such as hydraulic disc brakes. Hydraulic disc brakes have greater stopping power and deceleration control than traditional rim and cable pull brakes used in the past. Typically, bicycles utilizing hydraulic disc brakes have one front brake and one rear brake to minimize stopping distance. In fact, this dual disc brake configuration is even a requirement in some countries. A bicycle and its rider, as well as similar two-wheel vehicles, have a relatively high center of gravity and a short wheelbase length. The greater stopping power and high center of gravity of the modern bicycle put the rider at risk of a front wheel pitch over during emergency or aggressive braking events. In particular, when excessive front braking is experienced, the rear wheel may rise off of the ground. This reduces control of the bicycle. Further, in extreme cases, the rider may pitch over the handlebars of the bicycle, which can lead to serious injury to the rider and/or others around the rider.

Some known anti-pitch brake systems exist for cable pull rim brakes. In these known systems, one brake lever is used to directly apply the rear brakes. As the rear brakes generate braking force at the rim, movement of a sliding brake pad transmits this force through a cable to a front brake caliper, thereby applying the front brake. As such, both brakes are applied to minimize stopping distance. If the rear wheel leaves the ground in a possible pitch-over event, the rear brake force at the rim goes to zero, the sliding brake pads retract, and the front brake force reduces to zero. The rear wheel then returns to the ground, eliminating the possibility of a pitch-over event. However, these known systems are only applicable for cable pull rim brakes. Further, these known systems only offer one brake lever that actuates both brakes simultaneously.

Other known anti-pitch brake systems utilize electronic control of the front brakes. These known electronic systems require on-board battery power and a complex sensing system to detect a pitch-over event. When the electronic system senses a pitch-over event, pressurized fluid providing the front brake force is diverted to reduce the front brake force and alleviate the pitch-over event. One disadvantage to this known electronic system is that with each successive fluid diversion per a single lever pull, the brake lever moves closer to the handlebar grip. If the brake lever moves sufficiently near the grip, the electronic control system stops this diversion process, which eliminates any pitch-over control. Other disadvantages include the additional weight and complexity added to the bicycle, dependence on a charged battery, and expensive electronic components.

Disclosed herein are example brake systems and apparatus for providing pitch-over control on bicycles that address the disadvantages of the known systems described above. The examples disclosed herein may be implemented in connection with hydraulic disc brakes. Example brake systems and apparatus disclosed herein detect when a rear wheel of a bicycle has risen off of the ground and reduce braking pressure to the front wheel, thereby reducing or preventing the possibility of a pitch-over. Further, example brake systems and apparatus disclosed herein enable control of the rear brake independent of the front brake. For example, a front brake actuator may be used to actuate the front brake, and a rear brake actuator may be used to actuator the rear brake without actuating the front brake. Thus, the rear brake actuator can be used to operate the rear brake independently of the front brake.

An example brake system disclosed herein includes a front brake actuator, a rear brake actuator, a front brake including a front brake disc and a front brake caliper, and a rear brake including a rear brake disc and a rear brake caliper. The front brake actuator is fluidly coupled to the front brake caliper through the rear brake caliper. In particular, the brake system includes a first fluid line (e.g., a hydraulic hose) that fluidly couples the front brake actuator and the rear brake caliper. Further, the brake system includes a second fluid line that fluidly couples the rear brake caliper and the front brake caliper. The rear brake caliper includes a caliper housing having a first port, which is fluidly coupled to the first fluid line, and a second port, which is fluidly coupled to the second fluid line. The rear brake caliper includes a valve between the first port and the second port (and, thus, between the first fluid line and the second fluid line). The valve is operable to affect fluid flow or fluid communication between the first port and the second port, thereby affecting application of braking pressure to the front wheel. For example, the valve may be operable between an open state (e.g., a first state) and a closed state (e.g., a second state). In the open state, the first fluid line is fluidly coupled to the second fluid line and, thus, the front brake actuator can be actuated to supply brake fluid to the front brake caliper or relieve brake fluid from the front brake caliper. As a result, the front brake actuator can be used to apply braking pressure to the front brake caliper or relieve brake pressure on the front brake caliper.

In some examples, the valve may switch to the closed state when the rear wheel is lifted from the ground and/or otherwise has reduced traction force. In the closed state, the valve fluidly isolates or disconnects the first port and the second port (and, thus, fluidly isolates the first fluid line and the second fluid line). Thus, further actuation of the front brake actuator does not increase the braking pressure to the front wheel. Rather, because braking pressure from the front brake actuator is cutoff by the closing of the valve, the brake fluid in the front brake caliper and the second fluid line rebounds or flows back in the opposite direction (toward the valve) and decreases in pressure, thereby reducing braking force at the front wheel. With less braking force at the front wheel, the front wheel is able to rotate slightly faster. As a result, the rear wheel is lowered back down to the ground.

As disclosed above, the valve switch may switch between the open and closed states based on whether the rear wheel is in contact with the ground. In some examples, the state of the valve is at least partially controlled based on a position of and/or movement of the caliper housing. For example, the caliper housing may be coupled to the frame of the bicycle (e.g., via a bracket) such that the rear brake caliper housing can pivot or rock between two positions, such as a forward position and a rearward position. When the front brake actuator is actuated, brake fluid is supplied to one or more secondary slave pistons that actuate the rear brake caliper. The secondary slave pistons force one or more rear brake pads into engagement with the rotating rear disc. When the rear wheel is rotating, such as when the rear wheel is in contact with the ground, the frictional engagement between the rear brake pad(s) and the rotating rear brake disc biases the caliper housing in a forward direction (such as a forward rotating direction of the rear wheel) to the forward position. In this position, the caliper housing generates a rear brake force on a flow control member of the valve that maintains the flow control member in an open position. Therefore, as long as the rear wheel is in contact with the ground and rotating, the rear brake force generated by the frictional engagement maintains the valve in the open state.

However, if the rear wheel is lifted from the ground (such as the result of excessive front braking) and/or otherwise has reduced traction force (e.g., when the rear wheel begins to lift and has minimal contact or traction with the ground), the friction between the rear brake pad(s) and the rear brake disc causes the rear brake disc (and, thus, the wheel) to stop rotating. When the rear wheel is no longer rotating, the rear brake force previously applied to the valve is eliminated. This elimination of the rear brake force enables the flow control member to move to a closed position to switch the valve to the closed state. In some examples, movement of the flow control member to the closed position pushes the caliper housing in a rearward direction, opposite of the forward direction, toward the rearward position. In some examples, the valve is implemented as spool valve having a moveable shuttle. In some such examples, the pressure of the brake fluid in the valve causes the shuttle (the flow control member) to move to the closed position, which pushes the caliper housing in the rearward direction. When the shuttle is in the closed position, the valve fluidly isolates the front brake actuator and the front brake caliper, thereby reducing braking pressure at the front wheel and enabling the rear wheel to return to the ground.

If the rear wheel returns to the ground, the rear wheel starts to rotate again. The friction between the rear brake pad(s) and the rear brake disc moves the caliper housing back to the forward position and reopens the valve (e.g., by moving the shuttle to the open position). As such, fluid communication is reestablished between the front brake actuator and the front brake caliper. Therefore, movement of the caliper housing causes a change to the state of the valve and/or otherwise affects the flow characteristics of the valve. The valve may alternate or oscillate quickly between the open and closed states as the rear wheel moves away from or to the ground to control braking power to the front wheel. Various examples are disclosed herein in which the valve is configured as a normally open valve or a normally closed valve. Some examples disclosed herein utilize one or more springs to bias the valve to the normally open state or normally closed state. As such, the example brake systems and apparatus can detect rear wheel lift-off (before a rider may be able to sense the rear-wheel lift-off) and deactivate the front brake, thereby enabling the rear wheel to return to the ground.

Further, the example brake systems disclosed herein may include a third fluid line that fluidly couples the rear brake actuator and the rear brake caliper. The rear brake actuator may be actuated to supply brake fluid, via the third fluid line, to the rear brake caliper to actuate the rear brake caliper. The brake fluid for the rear brake actuator and the brake fluid of the front brake actuator are isolated from each other. As such, the example brake systems disclosed herein enable independent rear braking. In particular, the rear brake actuator can be used to actuate the rear brake caliper without actuating the front brake caliper. Thus, unlike known systems that synchronize front and rear braking, the example brake systems disclosed herein enable a rider to independently control the front and rear brakes.

Further, unlike known electronic anti-pitch systems, the example brake systems and apparatus disclosed herein do not require any electronic devices (e.g., sensor, solenoids, etc.). As such, the example systems add less weight to the bicycle and do not require onboard batteries. Further, the example brake systems can be operate indefinitely, whereas known electronic anti-pitch systems require regular charging or replacement of batteries.

Turning now to the figures, FIG. 1 illustrates one example of a human powered vehicle on which the example brake systems and apparatus disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. In some examples, the front fork 108 includes one or more suspension components (e.g., a shock absorber) to absorb shocks or vibrations. The rear wheel 106 is coupled to the frame 102 to support the rear end of the frame 102. In some examples, one or more suspension components may be coupled between the rear wheel 106 and the frame 102 to absorb shocks or vibrations. A front and/or forward riding direction or orientation of the bicycle 100 is indicated by the direction of the arrow A in FIG. 1. As such, a forward direction of movement for the bicycle 100 is indicated by the direction of arrow A. The bicycle 100 is shown as riding on a riding surface 110. The riding surface 110 may be any riding surface such as the ground (e.g., a dirt path, a sidewalk, a street, etc.), a man-made structure above the ground (e.g., a wooden ramp), and/or any other surface.

In the illustrated example, the bicycle 100 includes a seat 112 coupled to the frame 102 (e.g., near the rear end of the frame 102 relative to the forward direction A) via a seat post 114. The bicycle 100 also includes handlebars 116 coupled to the frame 102 and the front fork 108 (e.g., near a forward end of the frame 102 relative to the forward direction A) for steering the bicycle 100. In the illustrated example, the bicycle 100 has a drivetrain 118 that includes a crank assembly 120. The crank assembly 120 is operatively coupled via a chain 122 to a sprocket assembly. The sprocket assembly is part of an assembly that is mounted to a rear hub 124 providing a rotational axis of the rear wheel 106. The crank assembly 120 includes at least one, and typically two, crank arms 126 and pedals 128, along with at least one front sprocket, or chainring 130. The example bicycle 100 may include a rear gear change device (e.g., a derailleur) and/or a front gear change device to move the chain 122 through different sprockets.

The example bicycle 100 of FIG. 1 includes an example brake system 140 constructed in accordance with the teachings of this disclosure. The example brake system 140 may be used to reduce the speed of the bicycle 100. The example brake system 140 includes a front brake 142 for slowing the rotation of the front wheel 104 and a rear brake 144 for slowing the rotation of the rear wheel 106. In this example, the front and rear brakes 142, 144 are implemented as hydraulic disc brakes. The front brake 142 includes a front brake disc 146 and a front brake caliper 148. The front brake disc 146 is coupled to and rotates with the front wheel 104 on a front hub 150. The front brake caliper 148 is coupled to the front fork 108 adjacent the front brake disc 146. When the front brake caliper 148 is actuated, the front brake caliper 148 moves one or more brake pads into engagement with the front brake disc 146 to slow the front brake disc 146 and, thus, slow the rotation of the front wheel 104. As used herein, actuation of the front brake caliper 148 means that one or more brake pads are moved into engagement with the front brake disc 146. Similarly, the rear brake 144 includes a rear brake disc 152 and a rear brake caliper 154. The rear brake disc 152 is coupled to and rotates with the rear wheel 106 via the rear hub 124. When the rear brake caliper 154 is actuated, the rear brake caliper 154 moves one or more brake pads into engagement with the rear brake disc 152 to slow the rear brake disc 152 and, thus, slow the rotation of the rear wheel 106. As used herein, actuation of the rear brake caliper 154 means that one or more brake pads are moved into engagement with the rear brake disc 152.

While the example bicycle 100 depicted in FIG. 1 is a type of mountain bicycle, the example brake systems and apparatus disclosed herein can be implemented on other types of bicycles. For example, the disclosed brake systems and apparatus may be used on road bicycles, as well as bicycles with mechanical (e.g., cable, hydraulic, pneumatic, etc.) and non-mechanical (e.g., wired, wireless) drive systems. The disclosed brake systems and aparatus may also be implemented on other types of two-, three-, and four-wheeled human powered vehicles. Further, the example brake systems and apparatus can be used on other types of vehicles, such as motorized vehicles (e.g., a motorcycle, a car, a truck, etc.).

Figure 2:
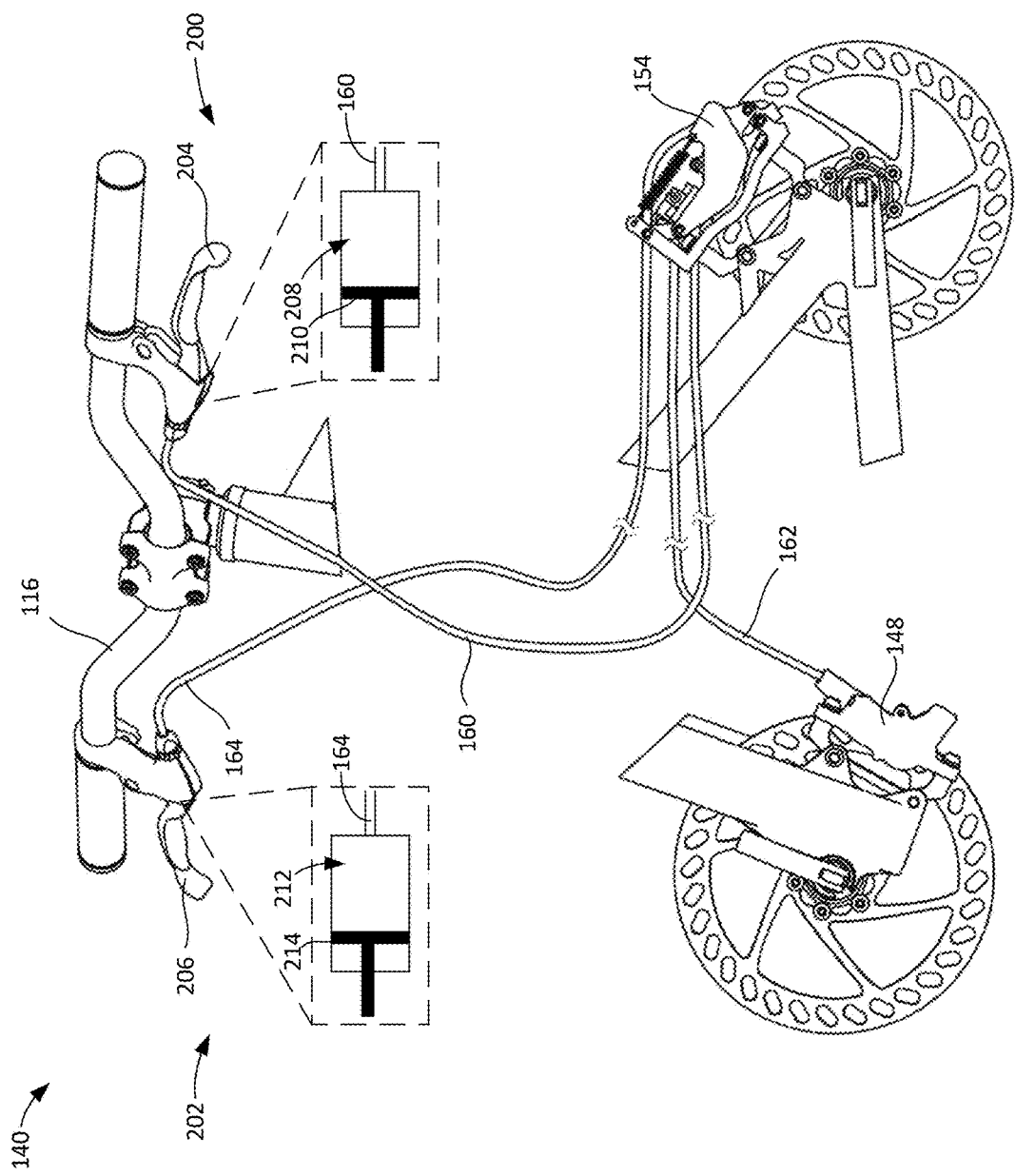
FIG. 2 is an enlarged view of the example components of the example brake system of FIG. 1 implemented on the example bicycle.

FIG. 2 is an enlarged view of the example brake system 140 as employed on the bicycle 100. As shown in FIG. 2, the brake system 140 includes a front brake actuator 200 that is used to actuate the front brake caliper 148. The brake system 140 also includes a rear brake actuator 202 that is used to actuate the rear brake caliper 154. In the illustrated example, the front and rear brake actuators 200, 202 are coupled to the handlebars 116. In this example, the front brake actuator 200 includes a front brake lever 204 and the rear brake actuator 202 includes a rear brake lever 206. However, in other examples the front and rear brake actuators 200, 202 may include other types of hardware. In this example, the front brake actuator 200 is actuated by moving the front brake lever 204 toward the grip on the handlebars 116. This actuation causes brake fluid to be pushed through one or more fluid lines to the front brake caliper 148, as disclosed in further detail herein. Conversely, the front brake actuator 200 is de-actuated by releasing or otherwise moving the front brake lever 204 away from the grip, which relieves or reduces the braking pressure to the front brake caliper 148. The rear brake actuator 202 and the rear brake leer 206 operate similarly in connection with the rear brake caliper 154.

In general, hydraulic disc brakes provide relatively high deceleration rates. Thus, riders often prefer disc brakes over other types of brakes. However, this ability to stop or slow down relatively quickly can also be unsafe. Referring back to FIG. 1, FIG. 1 shows the traction forces needed to decelerate the bicycle 100. FIG. 1 also shows the typical location of the center of gravity (COG) for a rider and the bicycle 100. The COG opposes the traction forces during brake induced deceleration. The center of gravity is substantially higher than the traction force on the front wheel 104 and, combined with a relatively short wheel base, may lead to a pitch-over event during aggressive braking. In particular, in traditional brake systems, if a rider applies too much braking force to the front brake, the rear the rear wheel 106 may lift off of the riding surface 110. This causes loss of control of the bicycle 100. Further, in some instances, the rider could pitch over the handlebars 116 and fall off of the bicycle 100, which can lead to serious injury to the rider.

The example brake systems and apparatus disclosed herein prevent or reduce the possibility of the rear wheel 106 lifting off of the riding surface 110 and help the rider maintain control. As disclosed in further detail herein, the example brake systems and apparatus disclosed herein modulate or reduce braking pressure to the front wheel 104 when the rear wheel 106 is detected as being lifted from the riding surface 110. As a result, the traction force at the front wheel 104 is reduced, which enables the rear wheel 106 to return to the riding surface 110.

To fluidly couple the front brake actuator 200 to the front brake caliper 148, the brake system 140 of FIGS. 1 and 2 includes a first fluid line 160 (e.g., a hose, a tube, etc.) fluidly coupled between the front brake actuator 200 and the rear brake caliper 154 and a second fluid line 162 fluidly coupled between the rear brake caliper 154 and the front brake caliper 148. As such, the brake fluid for actuating the front brake caliper 148 is directed through the rear brake caliper 154 and to the front brake caliper 148. Therefore, in this example, the front brake actuator 200 is not directly fluidly coupled to the front brake caliper 148. Instead, the front brake actuator 200 is fluidly coupled to the front brake caliper 148 through the rear brake caliper 154. As disclosed in further detail herein, the rear brake caliper 154 is configured to prevent excess braking pressure to the front brake caliper 148 when the rear wheel 106 is lifted off of the riding surface 110. The brake system 140 also includes a third fluid line 164 fluidly coupled between the rear brake actuator 202 and the rear brake caliper 154.

As shown in FIG. 2, the front brake actuator 200 includes a first master piston chamber 208 with a first master piston 210. The first master piston chamber 208 contains brake fluid (first brake fluid). When the first brake actuator 200 is actuated, such as by moving the front brake lever 204 toward the handlebars 116, the first master piston 210 moves (e.g., to the right in FIG. 2) to pressurize and displace the brake fluid in the first master piston chamber 208. As a result, brake fluid is pushed through the first fluid line 160 to the downstream sources. Conversely, when the first brake actuator 200 is released or de-actuated, such as by moving the front brake lever 204 away from the handlebars 116, the pressure in the first master piston chamber 208 decreases, which draws the brake fluid back into the first master piston chamber 208 and decreases the pressure at the downstream sources. In some examples, the front brake lever 204 may automatically move back to the initial position after a rider releases the front brake lever 204. As used herein, actuation of the front brake actuator 200 and/or the front brake lever 204 means increasing the pressure in the first master piston chamber 208 to move brake fluid toward the downstream source(s) and/or otherwise increase pressure at the downstream source(s). Similarly, as used herein, release of the front brake actuator 200 and/or the front brake lever 204 means decreasing the pressure in the first master piston chamber 208 to move brake fluid away from the downstream source(s) and/or otherwise decrease pressure at the downstream source(s).

In this example, the first fluid line 160 fluidly couples the first master piston chamber 208 and the rear brake caliper 154. Therefore, when the front brake actuator 200 is actuated, brake fluid is pushed through the first fluid line 160 to the rear brake caliper 154. In some instances, as disclosed in further detail herein, the brake fluid and/or the increased pressure of the brake fluid is transferred through the rear brake caliper 154 to the second fluid line 162 and, thus, to the front brake caliper 148. This supply of brake fluid or increase in pressure of brake fluid actuates the front brake caliper 148, thereby applying braking pressure to the front wheel 104. In other words, in some examples, when the front brake actuator 200 is actuated, the front brake actuator 200 supplies brake fluid through the first fluid line 160, the rear brake caliper 154, and the second fluid line 162 to the front brake caliper 148 to actuate the front brake caliper 148 to apply braking pressure to the front wheel 104. When the front brake actuator 200 is released, the brake fluid and/or pressure of the brake fluid in the first fluid line 160 (and/or in the second fluid line 162) is relieved or moved back toward the front brake actuator 200, thereby reducing braking pressure caused by the front brake caliper 148 at the front wheel 104.

The rear brake actuator 202 similarly includes a second master piston chamber 212 with a second master piston 214. The second master piston chamber 208 contains brake fluid (second brake fluid). When the rear brake actuator 202 is actuated, such as by moving the rear brake lever 206 toward the handlebars 116, the second master piston 214 moves (e.g., to the right in FIG. 2) to pressurize and displace the brake fluid in the second master piston chamber 212. As a result, brake fluid is pushed through the third fluid line 164 to the downstream sources. Conversely, when the rear brake actuator 202 is released or de-actuated, such as by moving the rear brake lever 206 away from the handlebars 116, the pressure in the second master piston chamber 212 decreases, which draws the brake fluid back into the second master piston chamber 212 and decreases the pressure at the downstream sources. In some examples, the rear brake lever 206 may automatically move back to the initial position after a rider releases the rear brake lever 206. As used herein, actuation of the rear brake actuator 202 and/or the rear brake lever 206 means increasing the pressure in the second master piston chamber 212 to move brake fluid toward the downstream source(s) and/or otherwise increase pressure at the downstream source(s). Similarly, as used herein, release of the rear brake actuator 202 and/or the rear brake lever 206 means decreasing the pressure in the second master piston chamber 212 to move brake fluid away from the downstream source(s) and/or otherwise decrease pressure at the downstream source(s).

In this example, the third fluid line 164 fluidly couples the second master piston chamber 212 and the rear brake caliper 154. Therefore, when the rear brake actuator 202 is actuated, brake fluid is pushed through the third fluid line 164 to the rear brake caliper 154. When the brake fluid in the third fluid line 164 is supplied to the rear brake caliper 154, the rear brake caliper 154 is actuated, thereby applying braking pressure to the rear wheel 106. When the rear brake actuator 202 is released, the brake fluid and/or pressure of the brake fluid in the third fluid line 164 is relieved and/or moved back toward the rear brake actuator 202, thereby reducing braking pressure caused by the rear brake caliper 154 at the rear wheel 106. The brake fluid in the third fluid line 164 is isolated or separate from the brake fluid in the first and second fluid lines 160, 162. As such, actuation of the rear brake actuator 202 does not affect braking pressure to the front wheel 104. In other words, the rear brake actuator 202 can be used to apply braking pressure to the rear wheel 104 without actuating the front brake caliper 148.

Figure 3A:
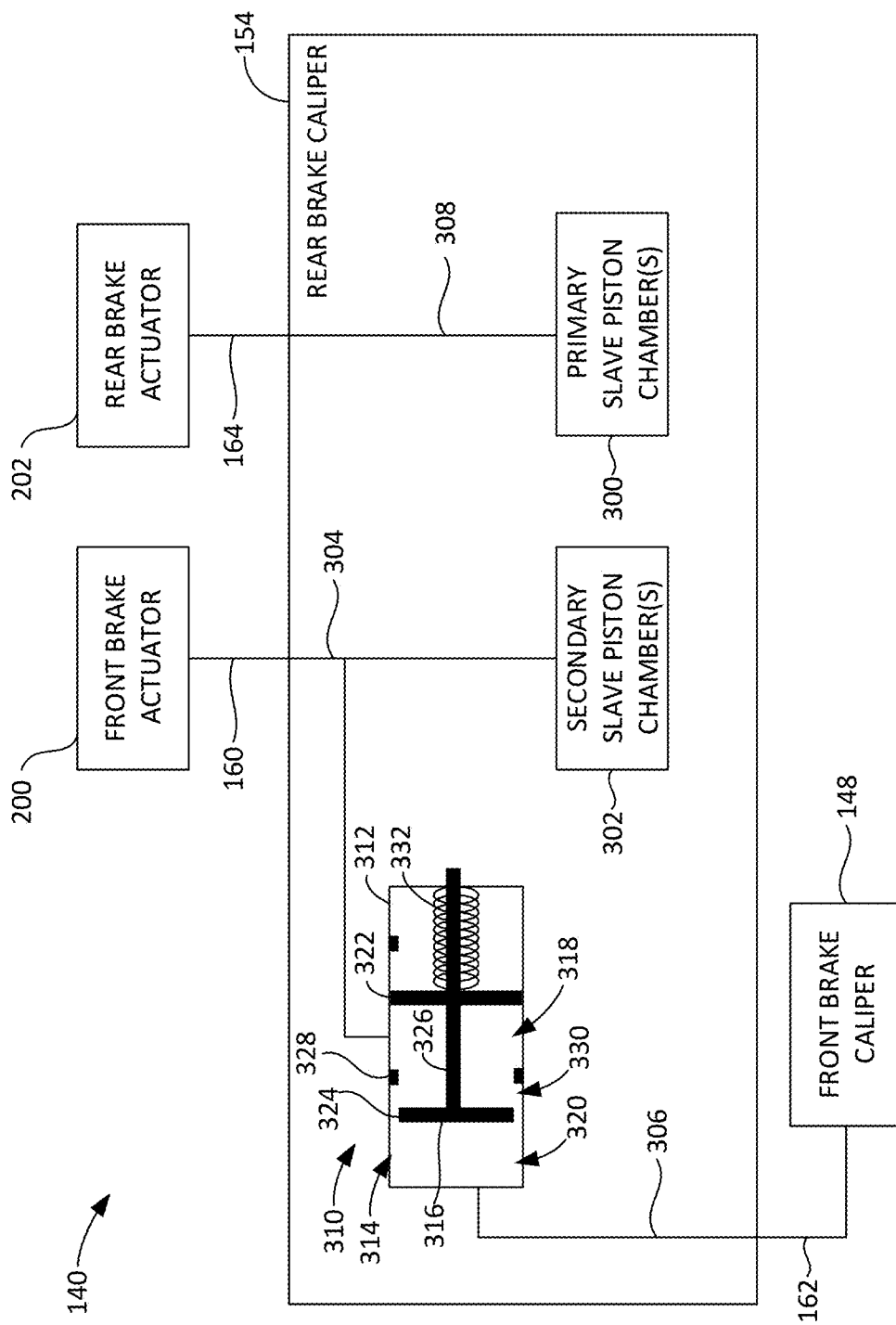
FIG. 3A is a schematic diagram of an example valve and fluid passageway configuration that may be implemented in the example brake system of FIGS. 1 and 2.

FIG. 3A is a schematic diagram of an example valve and fluid passageway configuration implemented by the brake system 140. FIG. 3A illustrates a state of the brake system 140 when neither the front brake actuator 200 nor the rear brake actuator 202 is actuated. This may occur, for example, when the bicycle 100 (FIG. 1) is in motion or at rest.

As shown in FIG. 3A, the front brake actuator 200 is fluidly coupled to the rear brake caliper 154 via the first fluid line 160, the front brake caliper 148 is fluidly coupled to the rear brake caliper 154 via the second fluid line 162, and the rear brake actuator 202 is fluidly coupled to the rear brake caliper 154 via the third fluid line 164. The rear brake caliper 154 includes one or more primary slave piston chamber(s) 300 for actuating the rear brake caliper 154. The rear brake caliper 154 also includes one or more secondary slave piston chamber(s) 302 for actuating the rear brake caliper 154, as disclosed in further detail herein.

In the illustrated example, the rear brake caliper 154 includes a first port 304. The first fluid line 160 (which is fluidly coupled to the first master piston chamber 208 (FIG. 2)) is fluidly coupled to the first port 304. As such, brake fluid can flow freely between the first master piston chamber 208 and the first port 304. The first port 304 may be formed by one or more passageways (e.g., openings, bores, channels, etc.) or fluid lines. The rear brake caliper 154 also includes a second port 306. The second fluid line 162 is fluidly coupled to the second port 306. As such, brake fluid can flow freely between the front brake caliper 148 and the second port 306. The second port 306 may be formed by one or more passageways or fluid lines.

As shown in FIG. 3A, the rear brake caliper 154 includes a third port 308. The third fluid line 164 (which is fluidly coupled to the second master piston chamber 212 (FIG. 2)) is fluidly coupled to the third port 308. The third port 308 is fluidly coupled to the primary slave piston chamber(s) 300 and, thus, fluidly couples the third fluid line 164 and the primary slave piston chamber(s) 300. As such, brake fluid can flow freely between the second master piston chamber 212 and the primary slave piston chamber(s) 300. The third port 308 may be formed by one or more passageways or fluid lines. When the rear brake actuator 202 is actuated, the pressurization of the brake fluid in the second master piston chamber 212 increases pressure in the primary slave piston chamber(s) 300 to actuate the rear brake caliper 154 and apply braking pressure to the rear wheel 106 (FIG. 1).

To control the flow of brake fluid between the first and second ports 304, 306 (and, thus, between the front brake actuator 200 and the front brake caliper 148), the example rear brake caliper 154 includes a valve 310 disposed between the first and second ports 304, 306. The valve 310 is operable to affect fluid flow between the first port 304 and the second port 306, thereby affecting the ability to apply braking pressure to the front wheel 104 (FIG. 1). One or more events may trigger the valve 310 to affect the fluid flow between the first port 304 and the second port 306, as disclosed in further detail herein. In this example, the valve 310 is operable between an open state (a first state) and a closed state (a second state). In the open state, the first port 304 is fluidly coupled to the second port 306 such that brake fluid can flow between the first and second ports 304, 306 and, thus, between the front brake actuator 200 and the front brake caliper 148. Therefore, when the valve 310 is in the open state, the front brake actuator 200 can be used to apply braking pressure via the front brake caliper 148 or relieve braking pressure from the front brake caliper 148. In the closed state, the valve 310 blocks or isolates the first port 304 from the second port 306. As a result, the front brake actuator 200 is fluidly isolated from the front brake caliper 148, which prevents pressure from being applied to the front brake caliper 148.

In this example, the valve 310 is implemented as a spool valve, referred to herein as the spool valve 310. However, in other examples, other types of valves or flow control devices may be implemented. The spool valve 310 has a valve housing 312 (e.g., a body) defining a chamber 314 and a shuttle 316 (which may be referred to as a flow control member) that is moveably disposed in the chamber 314. The chamber 314 and the shuttle 316 define a first cavity 318, referred to herein as a neutral cavity 318, and a second cavity 320, referred to herein as a biasing cavity 320. The first port 304 is fluidly coupled to the neutral cavity 318 and the second port 306 is fluidly coupled to the biasing cavity 320. The shuttle 316 is moveable to allow or block fluid flow between the neutral cavity 318 and the biasing cavity 320. In particular, the shuttle 316 is moveable between an open position (a first position) and a closed position (a second position) to change the spool valve 310 between the open state and the closed state, respectively. In FIG. 3A, the shuttle 316 is in the open position and, thus, the spool valve 310 is in the open state.

In the illustrated example, the shuttle 316 includes a first spool 322 and a second spool 324 connected by a stem 326. The first and second spools 322, 324 may also be referred to as collars or seals. In this example, the spool valve 310 includes a seat 328. In the open position, as shown in FIG. 3A, the second spool 324 is separated from the seat 328. As such, a transfer path 330 is defined between the second spool 324 and the seat 328 that enables fluid flow between the neutral cavity 318 and the biasing cavity 320 and, thus, between the first port 304 and the second port 306. In other examples, the transfer path 330 may be implemented as a separate passageway connected to two different locations in the chamber 314. In such an example, when the shuttle 316 is in the open position, the passageway connects the neutral cavity 318 and the biasing cavity 320. However, when the shuttle 316 is moved to the closed position, both ends of the passageway are in the biasing cavity 320 and, thus, the neutral cavity 318 and the biasing cavity 320 are fluidly isolated from each other.

In this example, the spool valve 310 is configured as a normally open valve. In other examples, the spool valve 310 may be configured as a normally closed valve, an example of which is disclosed in further detail in connection with FIGS. 20A-20D. In a normally open configuration, the shuttle 316 is biased to the open position. In this example, the spool valve 310 includes a biasing member, such as a spring 332. The spring 332 biases the shuttle 316 to the open position (to the left in FIG. 3A) so that the second spool 324 is separated from the seat 328. The spring 332 may be disposed inside the spool valve 310 or may be disposed outside of the spool valve 310 (an example of which is disclosed in further detail in connection with FIG. 17A). In the illustrated example, the spring 332 is a compression spring. However, in other examples, such as when the spring 332 is located on the other side of the shuttle 316, the spring 332 can be implemented as an extension spring.

Figure 3B:
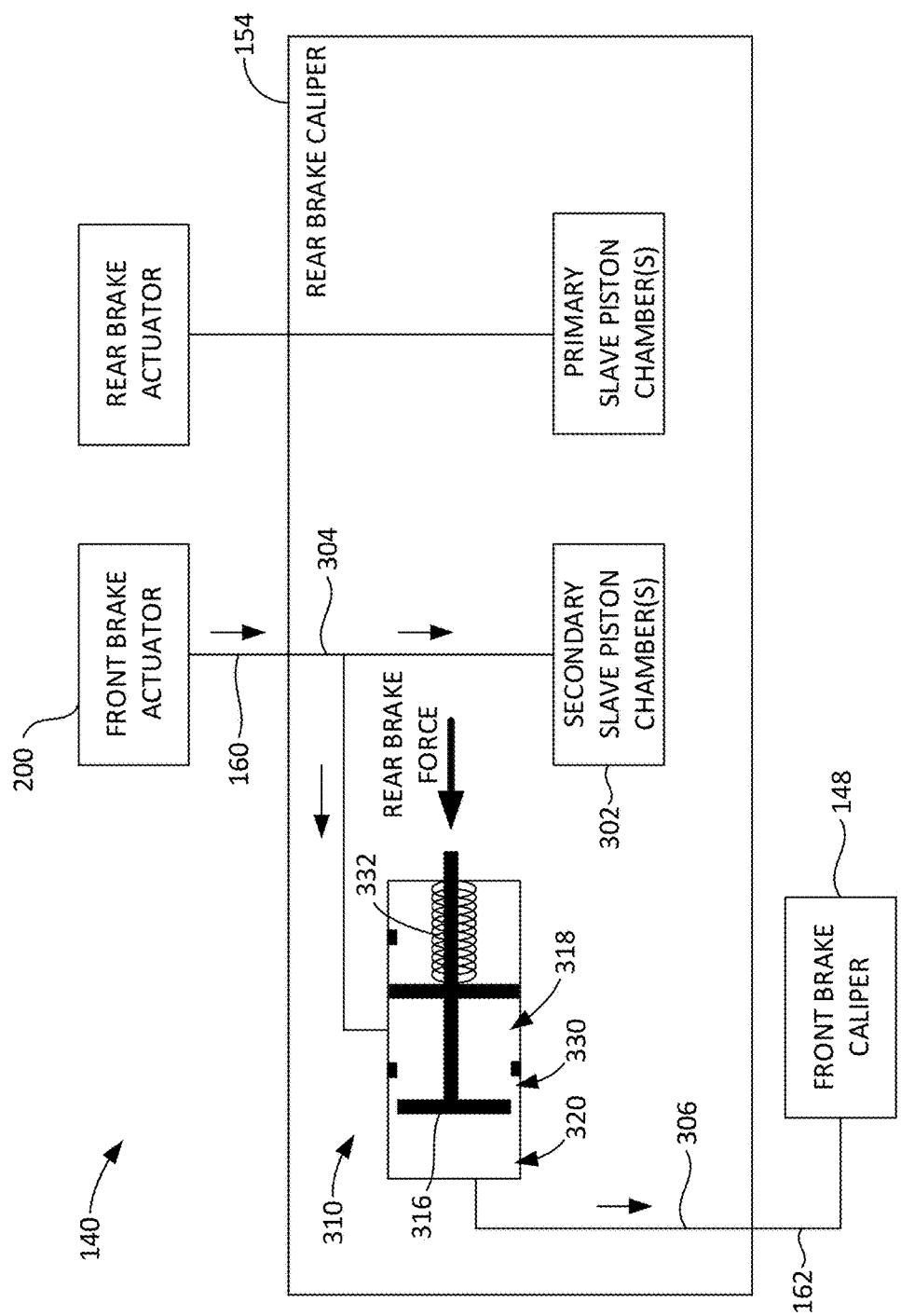
FIG. 3B shows the schematic diagram of FIG. 3A when a front brake actuator is actuated and a rear wheel of the example bicycle is in contact with a riding surface.

FIG. 3B shows the example valve and fluid passageway configuration of FIG. 3A when the front brake actuator 200 is actuated and the rear wheel 106 (FIG. 1) is rotating and remains in contact with the riding surface 110 (FIG. 1). As shown by the arrows, when the front brake actuator 200 is actuated, the front brake actuator 200 pushes brake fluid through the first fluid line 160 and into the first port 304. The first port 304 is fluidly coupled to the secondary slave piston chamber(s) 302. When the front brake actuator 200 is actuated, movement of the brake fluid from the first master piston chamber 208 (FIG. 2) increases pressure in the secondary slave piston chamber(s) 302, which causes one or more rear brake pads (e.g., the rear brake pads 1100, 1202, shown in FIGS. 12 and 13) to engage the rear brake disc 152 (FIG. 1) and, thus, actuates the rear brake caliper 154. As a result, a biasing force is generated on the rear brake caliper 154 by the frictional engagement between the rear brake pad(s) and the rear brake disc 152. This biasing force is in the same direction as the forward rotating direction of the rear brake disc 152 and the rear wheel 106. When this biasing force is present, a rear brake force (as indicated by the arrow) is applied to the shuttle 316 of the spool valve 310 in the direction of the open position (to the left in FIG. 3B), thereby biasing the shuttle 316 to the open position. In this example, the combination of the rear brake force and the force from the spring 332 bias the shuttle 316 to the open position. In some examples, a stop is engaged with the shuttle 316, such that when the rear brake caliper 154 is biased in the forward direction (the forward rotating direction of the rear brake disc 152), the stop is pushed into the shuttle 316 in the open direction. An example of such a stop is disclosed in further detail herein.

While the shuttle 316 is in the open position, the brake fluid is pushed through the neutral cavity 318, through the transfer path 330, through the biasing cavity 320, through the second port 306, and through the second fluid line 162 to the front brake caliper 148, thereby actuating the front brake caliper 148. As such, braking pressure is applied to the front wheel 104 (FIG. 1). Because of the rear braking force, the shuttle 316 remains in the open position. In particular, the combined force from the spring 332 and the rear brake force is greater than the force caused by the pressure of the brake fluid actuating on the shuttle 316 in the opposite direction. As such, as long as the rear wheel 106 (FIG. 1) is rotating (which is indicative of contact with the riding surface 110 (FIG. 1)), the frictional engagement between the rear brake pad(s) and the rear brake disc 152 (FIG. 1) generates sufficient force to maintain the spool valve 310 in the open state. This enables brake fluid to flow back-and-forth between the front brake actuator 200 and the front brake caliper 148 as desired. Therefore, a rider may use the front brake actuator 200 to apply braking pressure to the front wheel 104 or relieve braking pressure from the front wheel 104. Without the rear braking force, the shuttle 316 may move to the closed position, against the force from the spring 332, as disclosed in further detail herein.

Figure 3C:
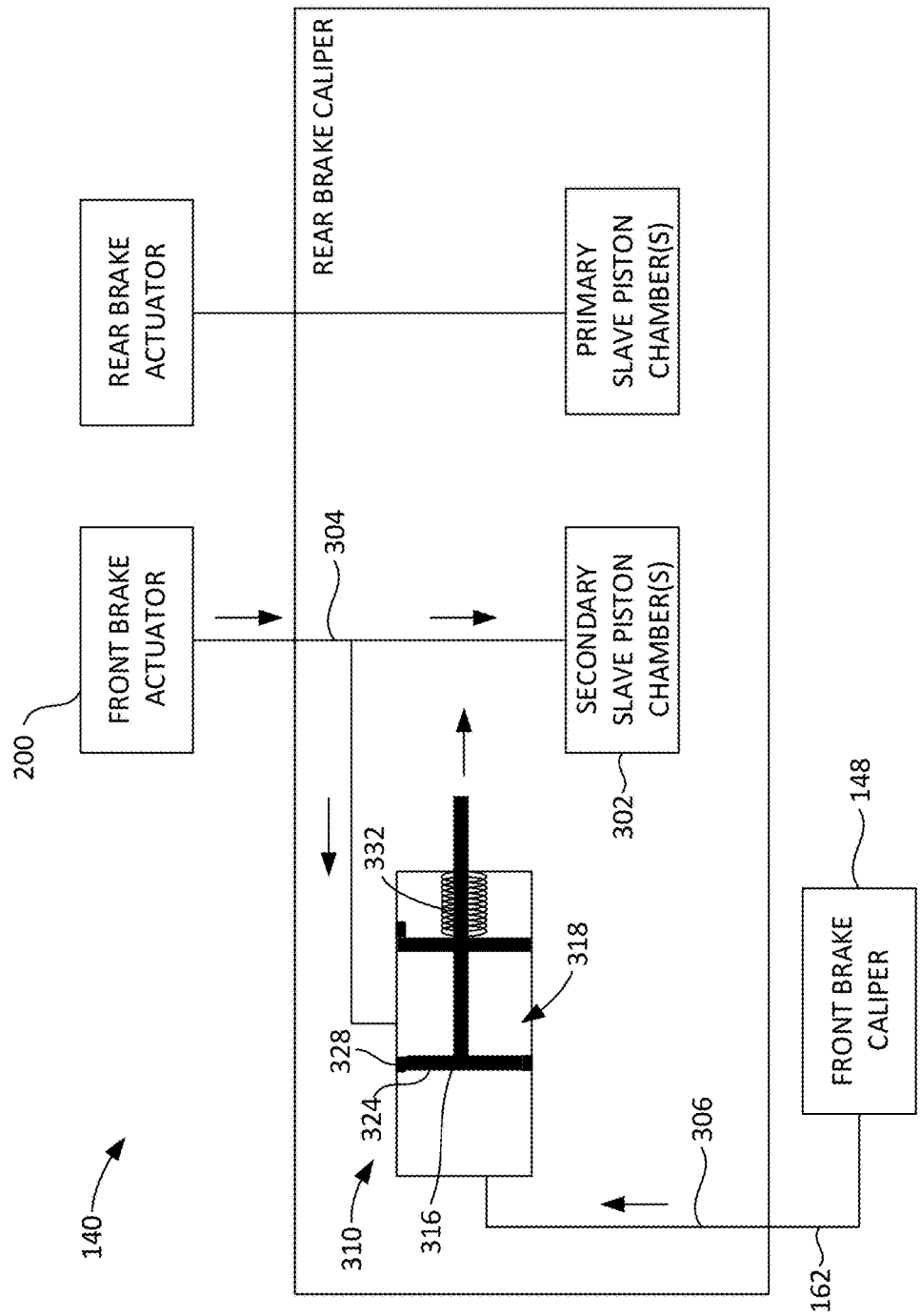
FIG. 3C shows the schematic diagram of FIGS. 3A and 3B when the front brake actuator is actuated and the rear wheel of the example bicycle is not in contact with the riding surface.

FIG. 3C shows the example valve and fluid passageway configuration of FIGS. 3A and 3B when the front brake actuator 200 is actuated while the rear wheel 106 (FIG. 1) is lifted off of the riding surface 110 (FIG. 1) and/or otherwise has reduced traction force. As described above, if too much braking pressure is applied to the front wheel 104 (FIG. 1), the rear wheel 106 may lift off of the riding surface 110. When the rear wheel 106 is lifted off of the riding surface 110, the traction force is reduced and/or eliminated. As a result, the friction between the rear brake pad(s) and the rear brake disc 152 (FIG. 1) (as applied via pressure in the secondary slave piston chamber(s) 302) causes the rear wheel 106 to stop rotating. This may occur relatively quickly because no frictional force from the riding surface 110 is rotating the rear wheel 106.

Once the rear wheel 106 has stopped rotating, the rear braking force (FIG. 3B) applied to the shuttle 316 ceases. Without the rear braking force, the force from the pressure of the brake fluid in the neutral cavity 318 acting on the shuttle 316 overcomes the force from the spring 332 acting on the shuttle 316, which causes the shuttle 316 to move to the closed position (to the right in FIG. 3C). When the shuttle 316 moves to the right in FIG. 3C, the second spool 324 sealingly engages the seat 328 and closes the transfer path 330 (FIG. 3A), as shown in the position of the shuttle 316 in FIG. 3C. In this position, the first port 304 is isolated or fluidly disconnected from the second port 306 and, thus, the front brake actuator 200 is disconnected from the front brake caliper 148. Therefore, the front brake actuator 200 cannot apply pressure to the front brake caliper 148. If the front brake actuator 200 is further actuated, the brake fluid is stopped in the neutral cavity 318 of the spool valve 310. The brake fluid in the second port 306, the second fluid line 162, and the front brake caliper 148 is cutoff from the fluid in the first port 304.

Once the shuttle 316 is in the closed position, the brake fluid in the second port 306, the second fluid line 162, and the front brake caliper 148 decreases in pressure and flows back toward the spool valve 310. This is due to the expansion of the biasing cavity 320 and the disconnection from the first port 304 (which was previously supplying a flow of brake fluid). The reduction in pressure reduces or relieves braking pressure applied by the front brake caliper 148. As a result, the front wheel 104 (FIG. 1) can move faster, which reduces the pitching moment and enables the rear wheel 106 (FIG. 1) to move back down to the riding surface 110 (FIG. 1). Once the rear wheel 106 contacts the riding surface 110 again and begins to rotate, the rear brake force is applied again to the shuttle 316 (as in FIG. 3B), which causes the shuttle 316 to move back to the open position (to the left in FIG. 3C). Once the shuttle 316 is in the open position, the pressure of the brake fluid in the first port 304 is again applied through the spool valve 310 to the second port 306 and to the front brake caliper 148. Thus, the spool valve 310 may oscillate or alternate between the open and closed states as the rear wheel 106 is lifted up and down from the riding surface 110.

Figure 3D:
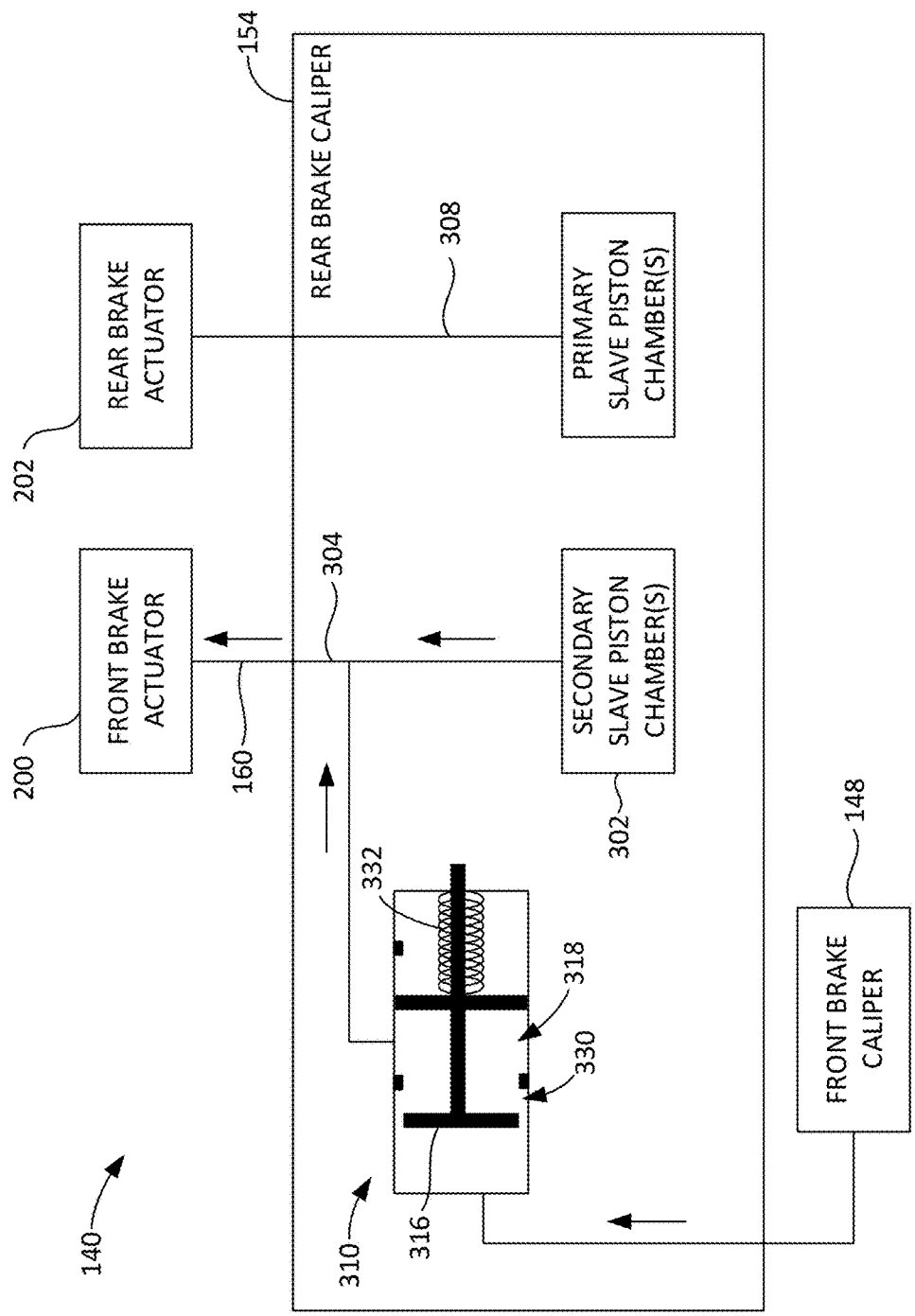
FIG. 3D shows the schematic diagram of FIGS. 3A-3C when the front brake actuator is released.

FIG. 3D shows the example valve and fluid passageway configuration of FIGS. 3A-3C when the front brake actuator 200 is released, such as when a rider intends to reduce braking pressure to the front wheel 104 (FIG. 1). When the front brake actuator 200 is released, the brake fluid in the first port 304 and the first fluid line 160 moves back toward the front brake actuator 200. The pressure in the secondary slave piston chamber(s) 302 is reduced, which releases braking pressure at the rear wheel 106 (FIG. 1). Further, the pressure in the neutral cavity 318 of the spool valve 310 is reduced. If the shuttle 316 was previously in the open position (such as in FIG. 3B), this reduction in pressure relieves braking pressure at the front brake caliper 148. If the shuttle was previously in the closed position (such as in FIG. 3C), and the pressure in the neutral cavity 318 and the rear braking pressure are reduced (e.g., to zero or substantially zero), the force from the spring 332 pushes the shuttle 316 to the open position (to the left in FIG. 3D), thereby reopening the spool valve 310. As a result, the transfer path 330 is reopened, and the pressure at the front brake caliper 148 is reduced. The brake fluid is moved from the front brake caliper 148 through the spool valve 310 and toward the front brake actuator 200 as shown by the arrows.

The rear brake actuator 202 may be used to actuate the rear brake caliper 154, independent of the front brake caliper 148. When rear brake actuator 202 is actuated, the rear brake actuator 202 supplies brake fluid through the third port 308 and into the primary slave piston chamber(s) 300 to cause the rear brake pad(s) to engage the rear brake disc 152 (FIG. 1) to apply braking pressure to the rear wheel 106 (FIG. 1). Conversely, when the rear brake actuator 202 is released or moved in the opposite direction, the brake fluid is moved back toward the rear brake actuator 202, thereby relieving braking pressure at the rear brake caliper 154. The caliper housing 154 isolates the third port 308 from the first and second ports 304, 306. Thus, the rear brake actuator can be used to actuate the rear brake caliper 154 independent of the front brake caliper 148. This enables a rider to have control over the rear brake pressure independent of the front brake pressure. In some examples, the primary slave piston chamber(s) 300 are larger (e.g., have a larger diameter) than the secondary slave piston chamber(s) 302. Thus, actuation of the secondary slave piston chamber(s) 302 applies less braking pressure to the rear disc brake 152.

While in this example the rear brake caliper 154 includes one or more primary slave piston chamber(s) 300 for independently actuating the rear brake caliper 154, in other examples, the primary slave piston chamber(s) 300 may be eliminated. Instead, the only actuation of the rear brake caliper 154 may be from the front brake actuator 200. Also, while in the illustrated example the fluid lines 160, 162, 164 are used to transfer fluid pressure, in other example, cables can be used instead of fluid lines to transmit forces.

In some examples, a bypass passageway and check valve may be used to relieve pressure in the front brake caliper 148 more quickly when releasing the front brake actuator 200 when the spool valve 310 is in the closed state. For instance, as disclosed above, when the shuttle 316 is in the closed position (the position shown in FIG. 3C) and the front brake actuator 200 is released to reduce braking pressure, the pressure in the spool valve 310 reduces and the shuttle 316 moves back to the open position (the position shown in FIG. 3D). However, this movement may take a small amount of time, during which pressure is still applied at the front brake caliper 148. Therefore, in some examples, the rear brake caliper 154 may include a bypass passageway and check valve to relieve pressure more quickly.

Figure 4:
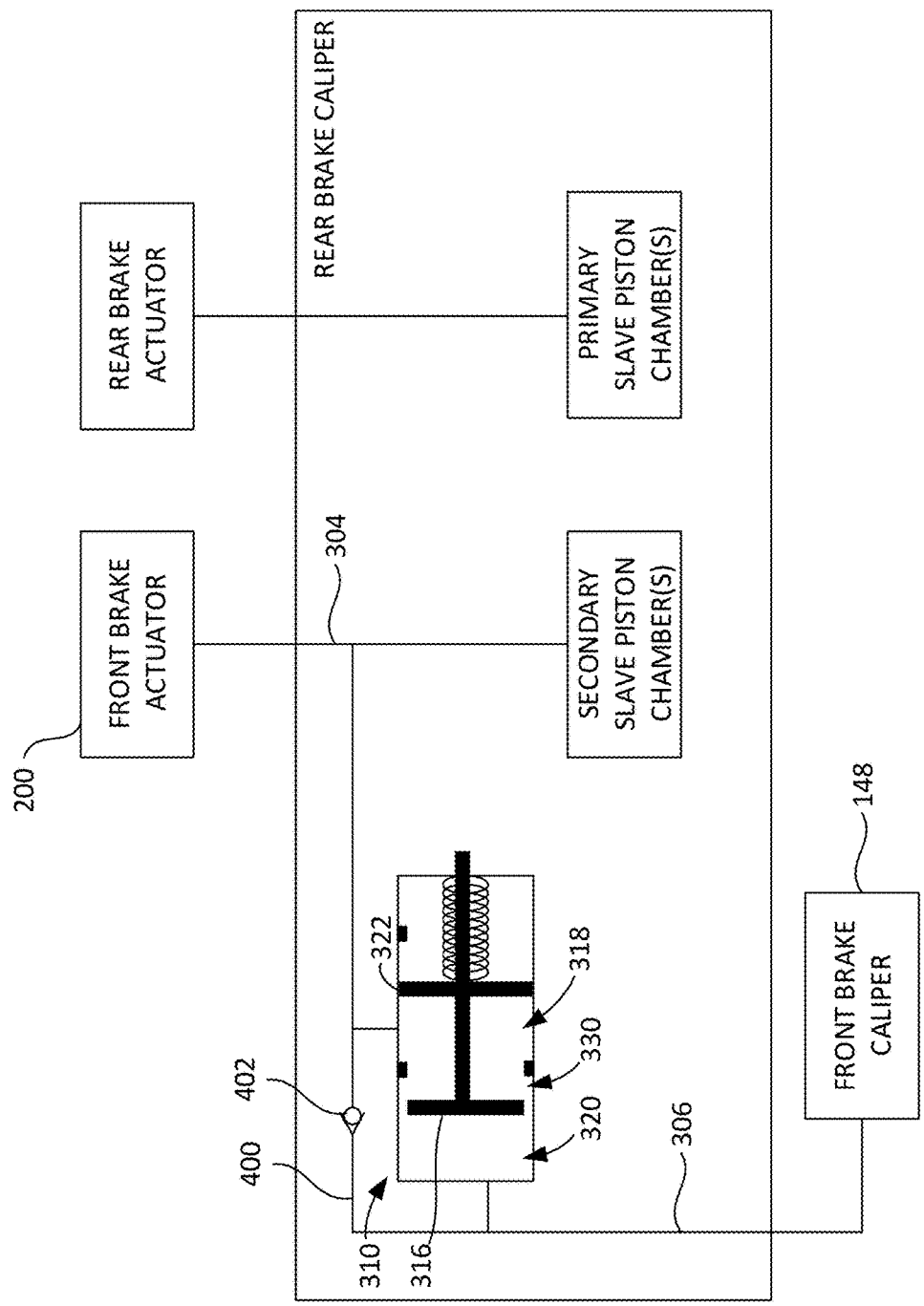
FIG. 4 shows the schematic diagram of FIGS. 3A-3D with an example bypass passageway and check valve that may be implemented in connection with the example brake system.

For example, FIG. 4 shows the example valve and fluid passageway configuration of FIGS. 3A-3D with an example bypass passageway 400. The bypass passageway 400 fluidly couples the first and second ports 304, 306 (and/or the neutral cavity 318 and the biasing cavity 320), thereby bypassing the transfer path 330 of the spool valve 310. As shown in FIG. 4, a check valve 402 is disposed in the bypass passageway 400. The check valve 402 enables the flow of brake fluid from the second port 306 to the first port 304 when the pressure in the second port 306 is higher than the pressure in the first port 304, but prevents the flow of brake fluid from the first port 304 to the second port 306. Therefore, when the front brake actuator 200 is released and the shuttle 316 is initially in the closed position, brake fluid in the front brake caliper 148 flows through the check valve 402 to the first port 304 to more quickly relieve braking pressure while the shuttle 316 is moving to the open position (to the left in FIG. 4).

FIGS. 5-20 illustrate an example physical implementation of the rear brake caliper 154 with the example valve and fluid passageway configuration illustrated in the schematic diagrams of FIGS. 3A-4. In other examples, other valve and fluid passageway configurations may be implemented in the brake system 140. Other example valve and fluid passageway configurations are disclosed in further detail in connection with FIGS. 20A-20D and 21A-21D.

Figure 5:
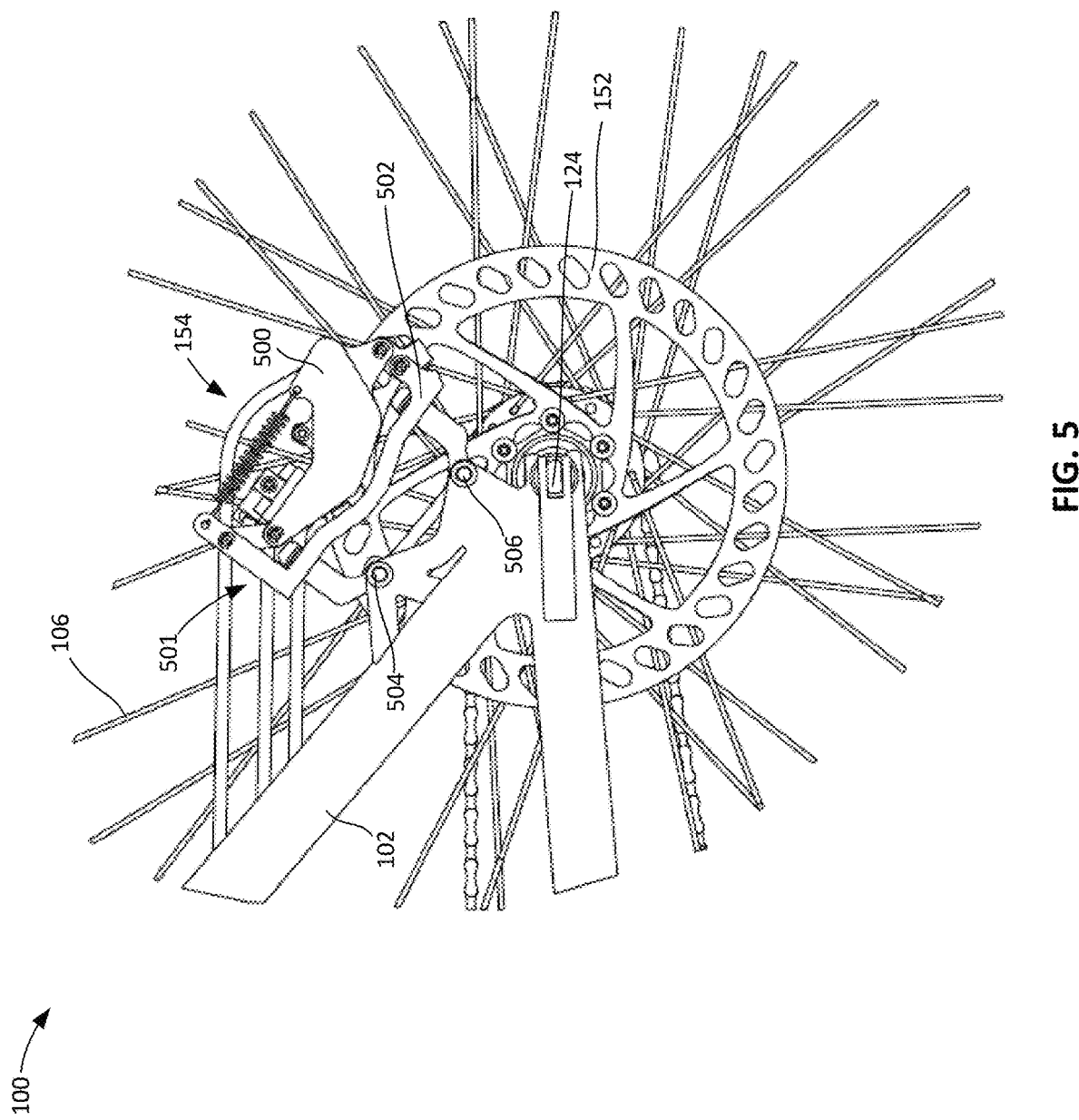
FIG. 5 is a side view of an example rear brake caliper of the example brake system of FIG. 2 as implemented with the example configuration shown in the schematic diagrams of FIGS. 3A-4.

FIG. 5 shows the rear brake caliper 154 coupled to the frame 102 of the bicycle 100. In the illustrated example, the rear brake caliper 154 includes a caliper housing 500 and an articulating mechanism 501. The caliper housing 500 is coupled to the frame 102 of the bicycle 100 via the articular mechanism 501. The articulating mechanism 501 enables the caliper housing 500 to move (e.g., articulate, pivot, rock, etc.) relative to the frame 102 of the bicycle 100 and the rear brake disc 152. In this example, the articulating mechanism 501 includes a bracket 502 (e.g., a mount). As shown in FIG. 5, the bracket 502 is coupled to the frame 102, and the caliper housing 500 is coupled to the bracket 502. Thus, the caliper housing 500 is coupled to the bicycle 100 via the bracket 502. In the illustrated example, the bracket 502 is fixedly coupled to the frame 102 near the rear wheel 106 via two fasteners 504, 506 (e.g., bolts). In other examples, the bracket 502 may be coupled to the frame 102 via only one fastener or more than two fasteners. In still further examples, the bracket 502 may be coupled to the frame 102 via one or more other mechanical or chemical fastening techniques (e.g., welding, clips, etc.). In still further examples, the bracket may be formed integrally as a structure of the frame. In some examples, the articulating mechanism 501 includes one or more rockers (e.g., the front rocker 604 and the rear rocker 614 disclosed in further detail in connection with FIGS. 6 and 7) that enable the caliper housing 500 to move relative to the bracket 502 and, thus, relative to the frame 102 and the rear brake disc 152. In other examples, the caliper housing 500 may instead be coupled directly to the frame 102 of the bicycle 100 (e.g., via the one or more rockers) without the bracket 502. Thus, while many of the examples disclosed herein are described in connection with moving the caliper housing 500 relative to the bracket 502, it is understood that that the caliper housing 500 could be similarly moveably coupled directly to the frame 102 of the bicycle 100 without the bracket 502. Movement of the caliper housing 500 affects the state and/or flow characteristics of the valve 310 (FIG. 3A), as disclosed in further detail herein. The caliper housing 500 receives the rear brake disc 152. When actuated, the rear brake caliper 154 pushes one or more rear brake pads into engagement with the rear brake disc 152 to slow the rear brake disc 152 and, thus, slow the rear wheel 106.

Figure 6:
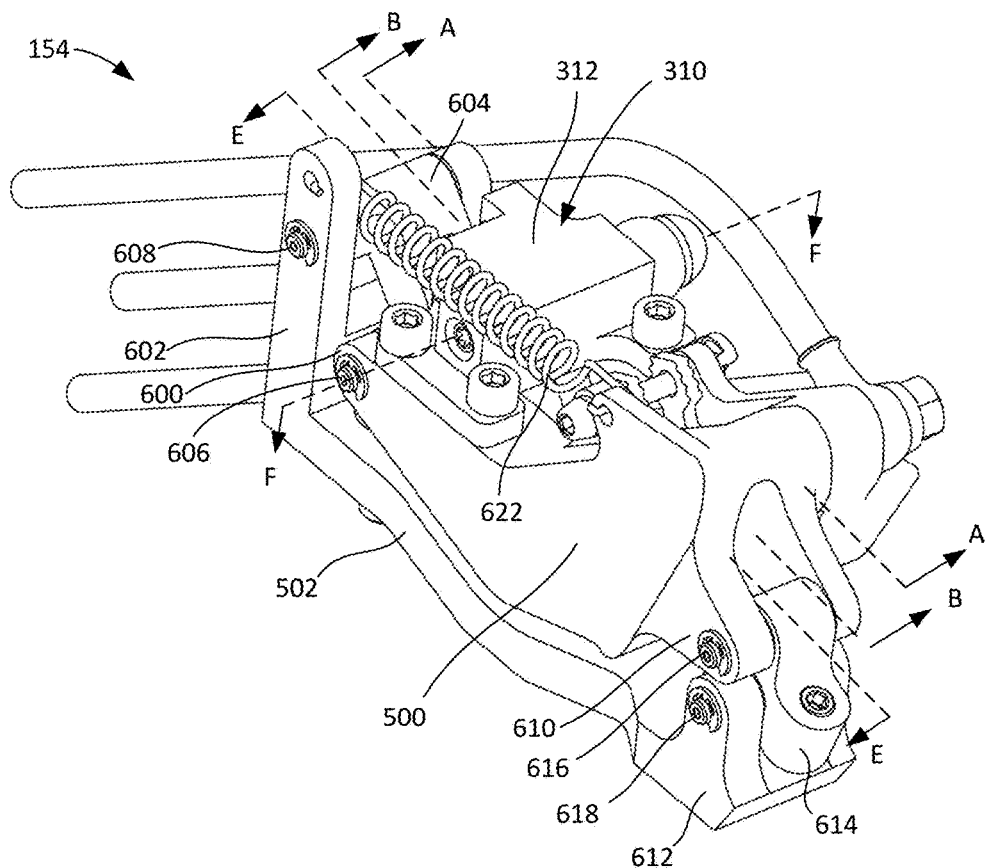
FIGS. 6 and 7 are perspective views of the example rear brake caliper of FIG. 5.
Figure 7:
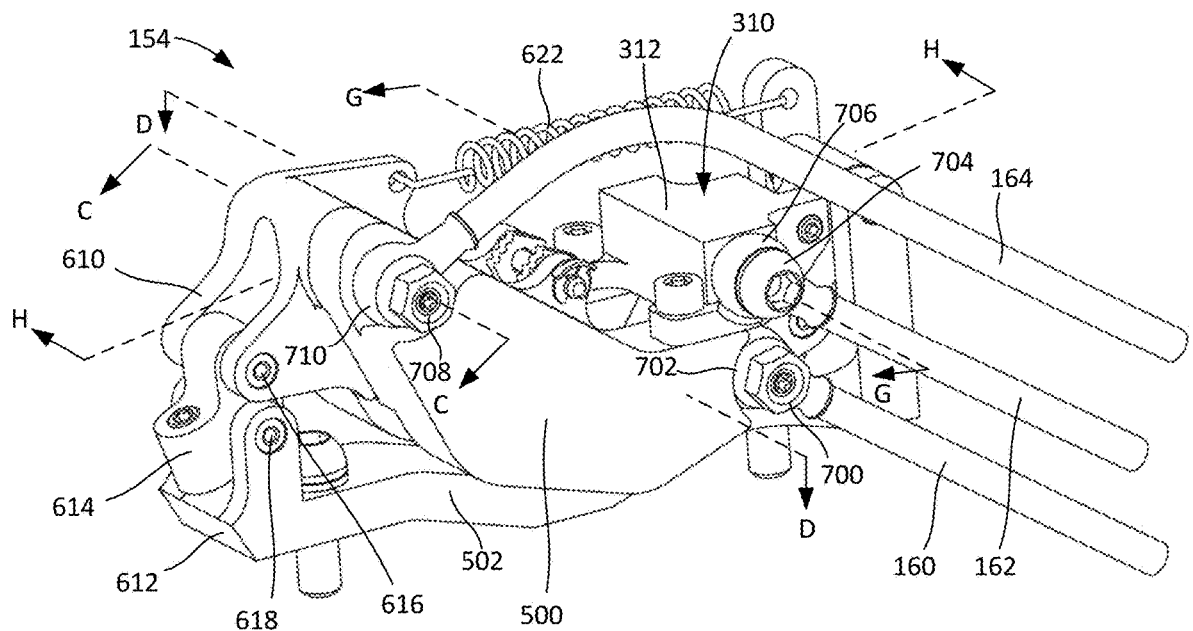

FIGS. 6 and 7 are perspective views of the rear brake caliper 154. As disclosed above, the caliper housing 500 is moveable (e.g., via a rocking or pivoting motion) relative to the bracket 502. As shown in FIG. 6, a front end 600 of the caliper housing 500 is coupled to a front end 602 of the bracket 502 via a front rocker 604. In particular, in the illustrated example, the front end 600 of the caliper housing 500 is coupled to the front rocker 604 via a first pin 606, and the front end 602 of the bracket 502 is coupled to the front rocker 604 via a second pin 608. As such, the front end 600 of the caliper housing 500 can articulate (e.g., pivot, rock, etc.) relative to the front end 602 of the bracket 502.

Similarly, as shown in FIGS. 6 and 7, a rear end 610 of the caliper housing 500 is coupled to a rear end 612 of the bracket 502 via a rear rocker 614. In the illustrated example, the rear end 610 of the caliper housing 500 is coupled to the rear rocker 614 via a first pin 616, and the rear end 612 of the bracket 502 is coupled to the rear rocker 614 via a second pin 618. As such, the rear end 610 of the caliper housing 500 can rotate (e.g., pivot, rock, etc.) relative to the rear end 612 of the bracket 502. The caliper housing 500 is moveable relative to the bracket 502 between a forward position and a rearward position, as disclosed in further detail herein.

As shown in FIGS. 6 and 7, the rear brake caliper 154 also includes a spring 622. The spring 622 corresponds to the spring 332 (FIGS. 3A-4), which biases the shuttle 316 toward the open position. In this example, the spring 622 is external to the spool valve 310. However, in other examples, the spring 622 may be internal to the spool valve 310. In the illustrated example, the spring 622 is an extension spring coupled between the caliper housing 500 and the bracket 502. The spring 622 biases the caliper housing 500 in a forward direction (which corresponds to the open state of the spool valve 310). In other examples, in addition to or as an alternative to the spring 622, a compression spring can be utilized to bias the caliper housing 500. For example, a compression spring can be disposed between the rear rocker 614 and the bracket 502. In other examples, the spring 622 (and/or a compression spring) can be coupled between other components of the caliper housing 500, the bracket 502, and/or the frame 102 (FIG. 1) of the bicycle 100 (FIG. 1). Also shown in FIGS. 6 and 7 is the valve housing 312 of the spool valve 310. The valve housing 312 is coupled to the caliper housing 500. In the illustrated example, the caliper housing 500 and the valve housing 312 are two separate parts or components. However, in other examples, the caliper housing 500 and the valve housing 312 may be constructed as a single unitary housing or body.

As shown in FIG. 7, the first, second, and third fluid lines 160, 162, 164 are fluidly coupled to the rear brake caliper 154. In this example, the first, second, and third fluid lines 160, 162, 164 are coupled to the rear brake caliper 154 via respective banjo bolts and fittings. For example, the first fluid line 160 is fluidly coupled to the caliper housing 500 via a first banjo bolt 700 and a first fitting 702, the second fluid line 162 is fluidly coupled to the valve housing 312 via a second banjo bolt 704 and a second fitting 706, and the third fluid line 164 is fluidly coupled to the caliper housing 500 via a third banjo bolt 708 and a third fitting 710. This allows fluid communication between the first, second, and third fluid lines 160, 162, 164 with their respective ports on the rear brake caliper 154. In other examples, other types of attachment mechanisms (e.g., flare fittings) may be employed.

Figure 8:
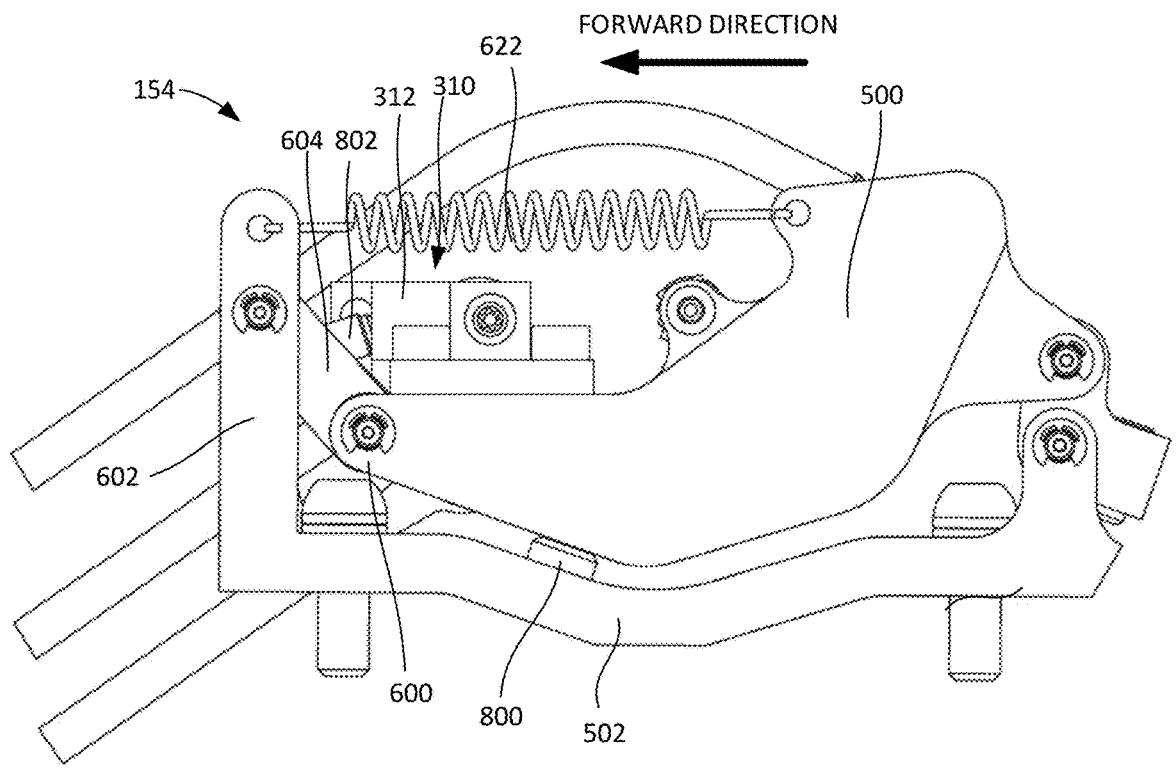
FIGS. 8 and 9 are side views of the example rear brake caliper of FIG. 5.
Figure 9:
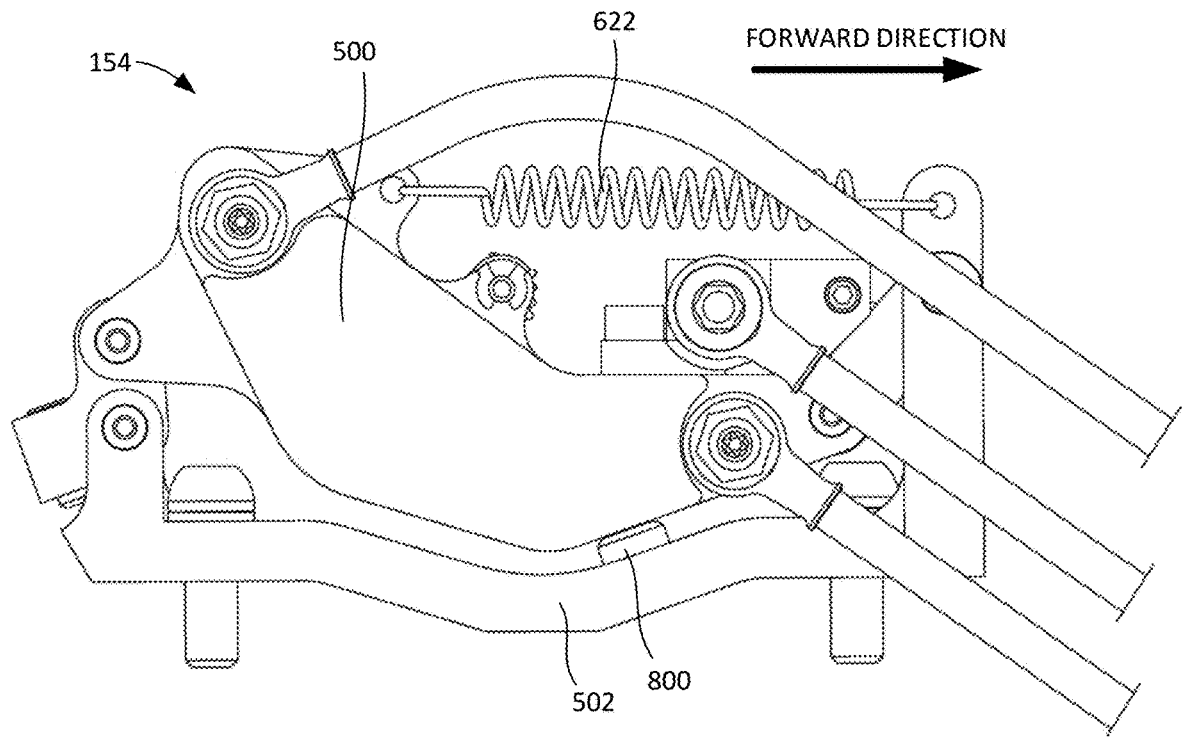

FIGS. 8 and 9 are side views of the rear brake caliper 154. In the illustrated example, the caliper housing 500 is in a forward state or position. The caliper housing 500 may be moved (e.g., rocked) in the opposite direction to a rear state or position, which is shown in further detail in connection with FIG. 18A. As shown, the spring 622 is arranged to bias the caliper housing 500 in a forward direction (to the left in FIG. 8 and to the right in FIG. 9), which corresponds to a forward rotating direction of the rear wheel 106 (FIG. 1) and the rear brake disc 152 (FIG. 1). In the illustrated example, a first stop or bumper 800 is coupled to the bracket 502. In the forward position, the caliper housing 500 is engaged with the first bumper 800. The size of the first bumper 800 and/or location of the bumper 800 may be changed to alter the location of the caliper housing 500 in the forward position.

To transmit the rear braking force (if any) to the shuttle 316 (inside the valve housing 312), the rear brake caliper 154 includes a stop 802 as shown in FIG. 8. In the illustrated example, the stop 802 is coupled to and extends from the front rocker 604. The stop 802 is engaged with and/or otherwise provides a biasing force on the shuttle 316 of the spool valve 310, as disclosed in further detail herein. When the caliper housing 500 is in the forward position, as shown in the position in FIG. 8, the stop 802 is positioned close to or within the spool valve 310. However, when the caliper housing 500 is moved to the rearward position (to the right in FIG. 8), the front end 600 of the caliper housing 500 is moved away from the front end 602 of the bracket 502, such that the stop 802 moves away from or out of the spool valve 310. In some examples, this movement is caused by movement of the shuttle 316 from the open position to the closed position.

Figure 10:
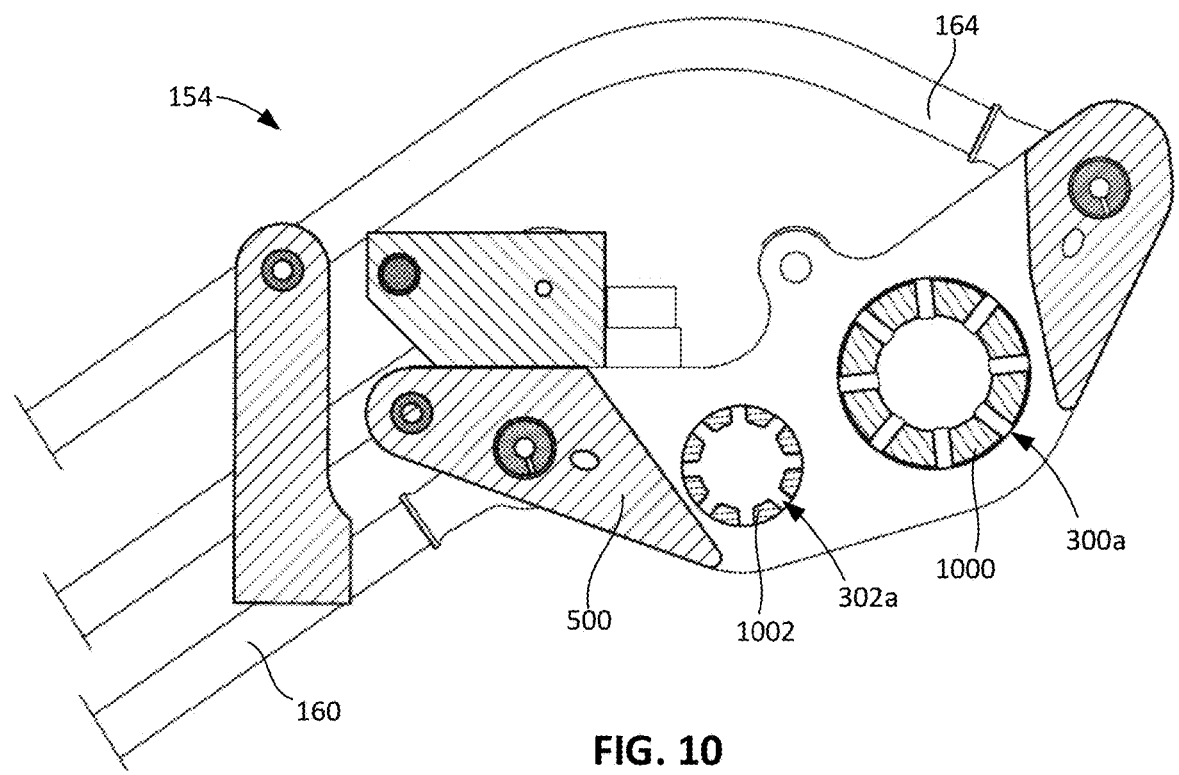
FIG. 10 is a cross-sectional view of the example rear brake caliper taken along line A-A of FIG. 6.

FIG. 10 is a cross-sectional view of the rear brake caliper 154 taken along line A-A of FIG. 6. As shown in FIG. 10, the caliper housing 500 includes a first primary piston chamber 300a, which corresponds to one of the primary slave piston chamber(s) 300 in FIGS. 3A-4. A first primary piston 1000 is disposed in and moveable in the first primary piston chamber 300a. As disclosed herein, the third fluid line 164 is fluidly coupled to the first primary piston chamber 300a. As such, when the rear brake actuator 202 (FIG. 2) is actuated, the first primary piston 1000 is moved (out of the page in FIG. 10).

As shown in FIG. 10, the caliper housing 500 also includes a first secondary piston chamber 302a, which corresponds to one of the secondary slave piston chamber(s) 302 in FIGS. 3A-4. A first secondary piston 1002 is disposed in and moveable in the first secondary piston chamber 302a. In some examples, the first fluid line 160 is fluidly coupled to the first secondary piston chamber 302a. As such, when the front brake actuator 200 (FIG. 2) is actuated, the first secondary piston 1002 is moved (out of the page in FIG. 10). The first primary piston chamber 300a is fluidly isolated from the first secondary piston chamber 302a.

Figure 11:
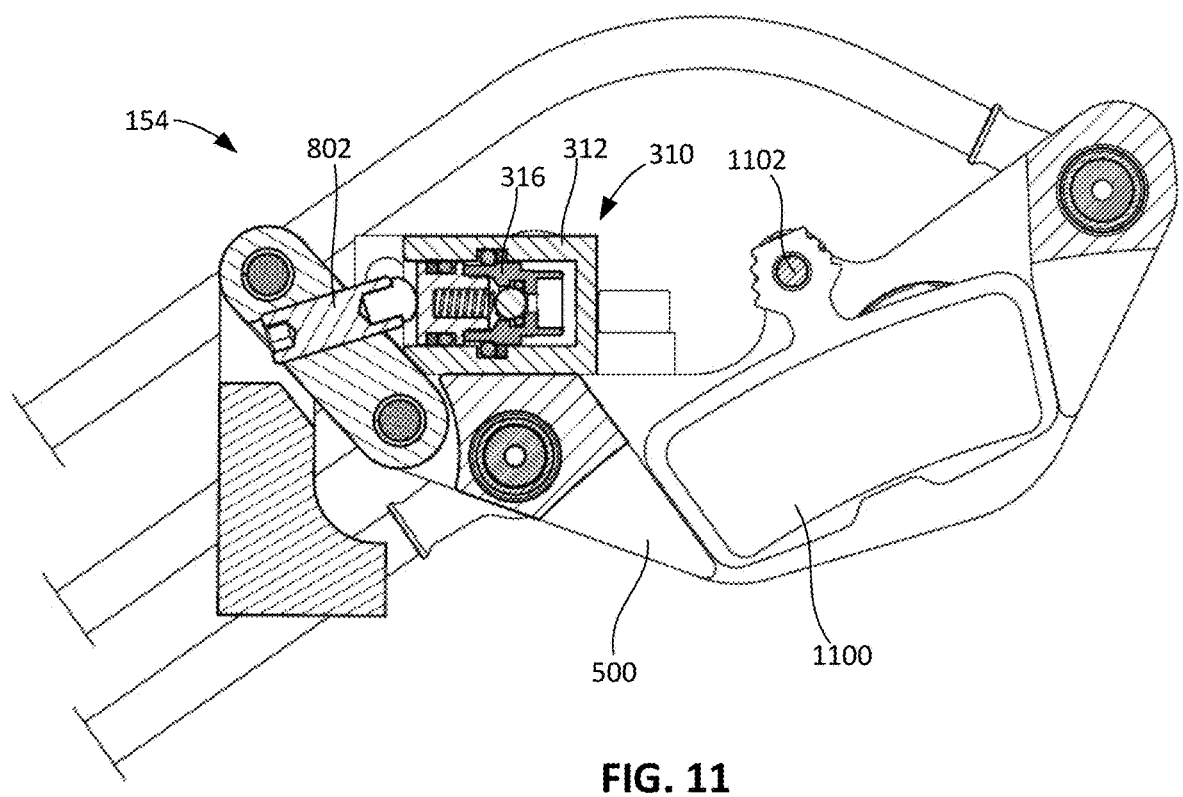
FIG. 11 is a cross-sectional view of the example rear brake caliper taken along line B-B of FIG. 6.

FIG. 11 is a cross-sectional view of the rear brake caliper 154 taken along line B-B of FIG. 6. The cross-section is taken generally about the center of the caliper housing 500. As shown in FIG. 11, the rear brake caliper 154 has a first rear brake pad 1100. The first rear brake pad 1100 is moveably coupled to the caliper housing 500. In this example, the first rear brake pad 1100 is slidable along a pin 1102 extending from the caliper housing 500. The first primary piston 1000 (FIG. 10) and the first secondary piston 1002 (FIG. 10) are coupled to a back side of the first rear brake pad 1100. As such, when either or both of the first primary piston 1000 or the first secondary piston 1002 is/are actuated, the rear brake pad 1100 is moved (out of the page in FIG. 11) and into engagement with the rear brake disc 152 (FIG. 1). The rear brake caliper 154 may also have a second rear brake pad on the opposite side of the rear brake disc 152 that is similarly configured to move into engagement with the other side of the rear brake disc, as shown in connection with FIG. 12. The first secondary piston chamber 302a, as shown in FIG. 10, is smaller in diameter than the first primary piston chamber 300a. As such, actuation of the rear brake caliper 154 via the first secondary piston chamber 302a causes less braking force than actuation of the rear brake caliper 154 via the first primary piston chamber 300a.

As shown in FIG. 11, the spool valve 310 includes the shuttle 316 disposed in the valve housing 312. The shuttle 316 is movable to change the state of the spool valve 310. In the illustrated example, the stop 802 is engaged with the shuttle 316. The shuttle 316 is moveable between the open position and the closed position to move the spool valve 310 between the open state and the closed state. When the front brake actuator 200 (FIG. 1) is actuated and the rear wheel 106 (FIG. 1) is in contact with the riding surface 110 (FIG. 1) and rotating, the stop 802 (via a biasing force from the rear brake force) maintains the shuttle 316 in the open position. However, when the front brake actuator 200 is actuated and the rear wheel 106 is lifted from the riding surface 110 and stops rotating, the shuttle 316 moves to the closed position, thereby closing the spool valve 310. Examples of these positions and states are disclosed in further detail herein in connection with FIGS. 17A-18B.

Figure 12:
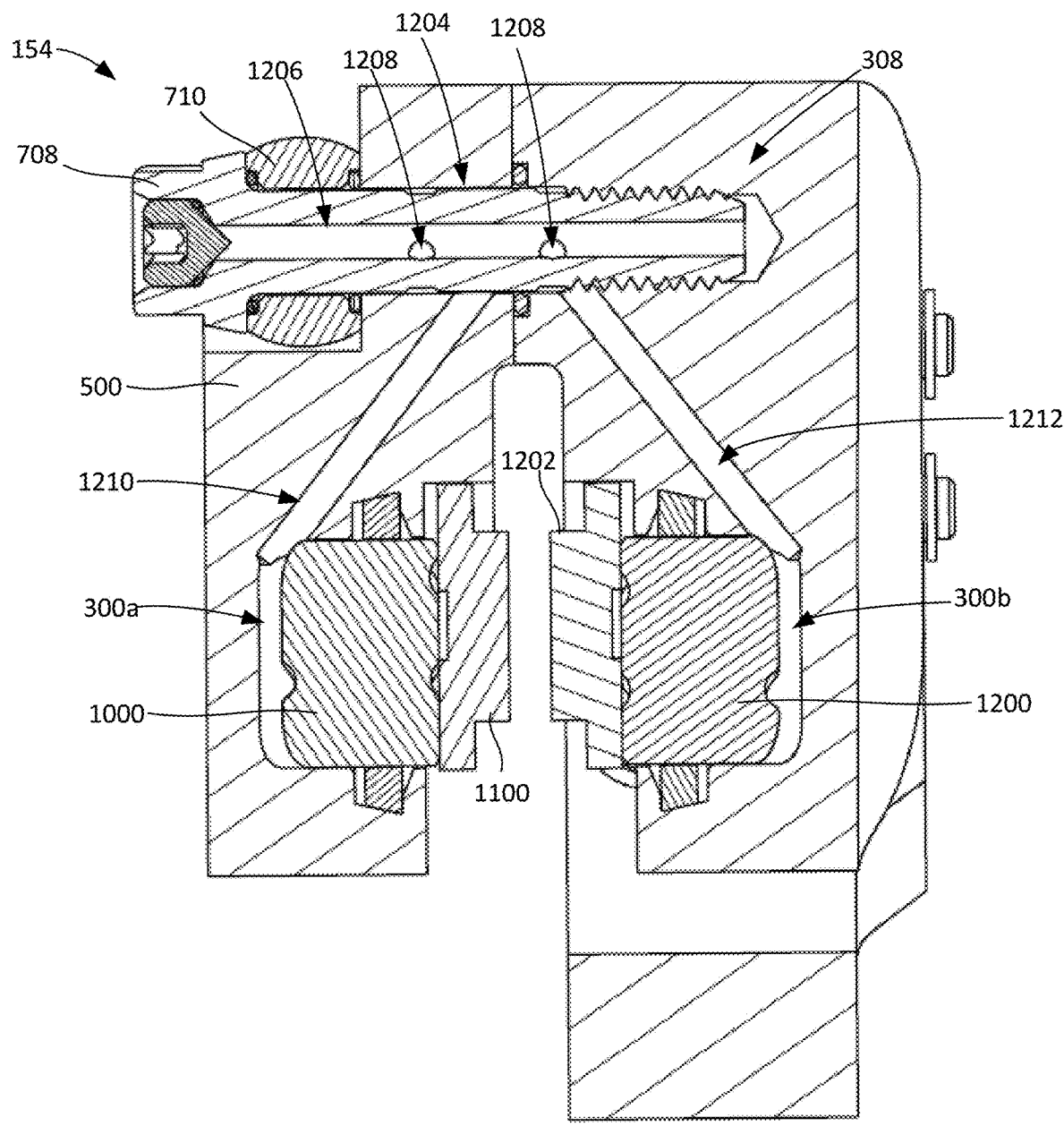
FIG. 12 is a cross-sectional view of the example rear brake caliper taken along line C-C of FIG. 7.

FIG. 12 is a cross-sectional view of the rear brake caliper 154 taken along line C-C of FIG. 7. FIG. 12 shows the first primary piston chamber 300a as well as a second primary piston chamber 300b formed in the opposite side of the caliper housing 500. A second primary piston 1200 is moveably disposed in the second primary piston chamber 300b. A second rear brake pad 1202 is moveably coupled to the caliper housing 500. The second primary piston 1200 is coupled to the second rear brake pad 1202. The rear brake disc 152 (FIG. 1) is to be disposed between the first and second rear brake pads 1100, 1202.

As disclosed herein, the rear brake caliper 154 includes the third port 308, which fluidly couples the third fluid line 164 (FIG. 1) to the primary slave piston chamber(s) 300 (e.g., such as the first and second primary piston chambers 300a, 300b). The third port 308 may be formed by one or more fluid passageways. For example, as shown in FIG. 12, the caliper housing 500 includes a third bore 1204 (first and second bores are disclosed in further detail below). The third banjo bolt 708 is threadably inserted into the third bore 1204. The third banjo bolt 708 has an internal passage 1206. The third fluid line 164 is fluidly coupled to the internal passage 1206 of the third banjo bolt 708 via the third fitting 710 and via an opening in the third banjo bolt 708 (an example of which is shown in connection with the second banjo bolt 704 in FIG. 16). The third banjo bolt 708 includes one or more openings 1208 that connect the internal passage 1206 to the outside of the third banjo bolt 708 and, thus, to the third bore 1204. In the illustrated example, the caliper housing 500 includes a first passageway 1210 that fluidly couples the third bore 1204 and the first primary piston chamber 300a and a second passageway 1212 that fluidly couples the third bore 1204 and the second primary piston chamber 300b. As such, brake fluid can flow freely between the third fluid line 164 (FIG. 1) and the first and second primary piston chambers 300a, 300b. In this example, the third bore 1204 and the first and second passageways 1210, 1212 form the third port 308. In other examples, the third port 308 may be formed by more or fewer passageways and/or the passageway(s) may be arranged in other configurations.

When the rear brake actuator 202 (FIG. 2) is actuated, for example, brake fluid is pushed through the third port 308 and into the first and second primary piston chambers 300a, 300b to move the first and second primary pistons 1000, 1200 inward (toward each other), thereby moving the first and second rear brake pads 1100, 1202 into engagement with the rear brake disc 152 (FIG. 1). Conversely, when the rear brake actuator 202 is released, the brake fluid out is moved out of the first and second primary piston chambers 300a, 300b, thereby retracting the first and second primary pistons 1000, 1200 and moving the first and second rear brake pads 1100, 1202 away from the rear brake disc 152 to relieve braking pressure on the rear brake disc 152.

Figure 13:
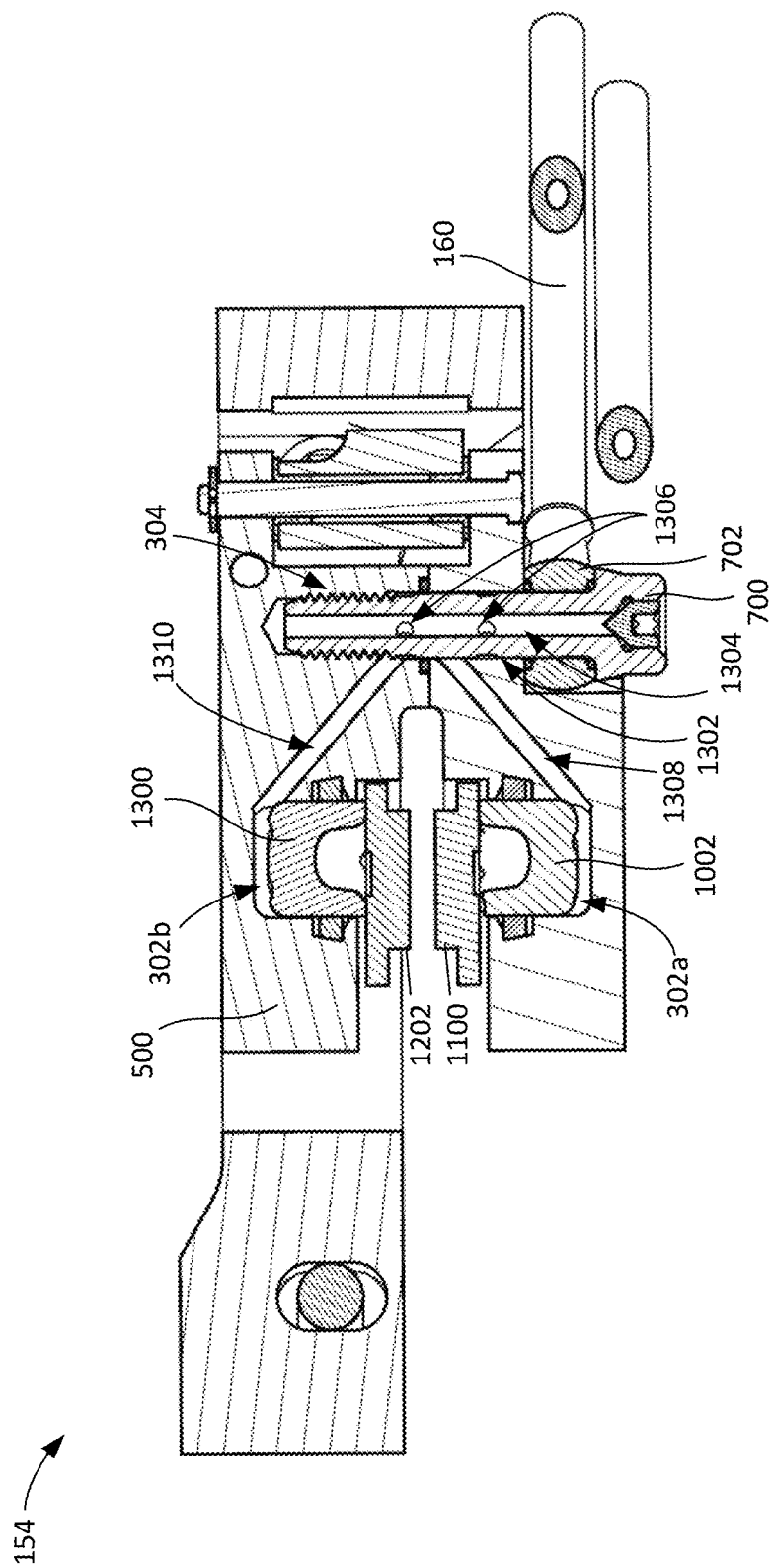
FIG. 13 is a cross-sectional view of the example rear brake caliper taken along line D-D of FIG. 7.

FIG. 13 is a cross-sectional view of the rear brake caliper 154 taken along line D-D of FIG. 7. FIG. 13 shows the first secondary piston chamber 302a as well as a second secondary piston chamber 302b formed in the opposite side of the caliper housing 500. A second secondary piston 1300 is moveably disposed in the second secondary piston chamber 302b. The second secondary piston 1300 is coupled to the second rear brake pad 1202.

As disclosed herein, the rear brake caliper 154 includes the first port 304, which fluidly couples the first fluid line 160 to the secondary slave piston chamber(s) 302, such as the first and second secondary piston chambers 302a, 302b, and the spool valve 310 (FIG. 3). The first port 304 may be formed by one or more fluid passageways. For example, as shown in FIG. 13, the caliper housing 500 includes a first bore 1302. The first bore 1302 is fluidly coupled to the first fluid line 160. Similar to the third banjo bolt 708 disclosed above, the first banjo bolt 700 is threadably inserted into the first bore 1302 and includes an internal passage 1304. The first fluid line 160 is fluidly coupled to the internal passage 1304 of the first banjo bolt 700 via the first fitting 702 and via an opening in the first banjo bolt 700 (an example of which is shown in connection with the second banjo bolt 704 in FIG. 16). The first banjo bolt 702 includes one or more openings 1306 that connect the internal passage 1304 to the outside of the first banjo bolt 700 and, thus, to the first bore 1302. In the illustrated example, a first passageway 1308 fluidly couples the first bore 1302 and the first secondary piston chamber 302a and a second passageway 1310 fluidly couples the first bore 1302 and the second secondary piston chamber 302b. Therefore, in this example, the first bore 1302 and the first and second passageways 1308, 1310 form the first port 304. In other examples, the first port 304 may be formed by more or fewer passageways and/or the passageway(s) may be arranged in other configurations.

When the front brake actuator 200 (FIG. 2) is actuated, for example, brake fluid is pushed through the first port 304 and into the first and second secondary piston chambers 302a, 302b to move the first and second secondary pistons 1002, 1300 inward, thereby moving the first and second rear brake pads 1100, 1202 into engagement with the rear brake disc 152 (FIG. 1). Conversely, when the front brake actuator 200 is released, the brake fluid is moved out of the first and second secondary piston chambers 302a, 302b, thereby retracting the first and second secondary pistons 1002, 1300 and moving the first and second rear brake pads 1100, 1202 away from the rear brake disc 152 to relieve braking pressure.

Figure 14A:
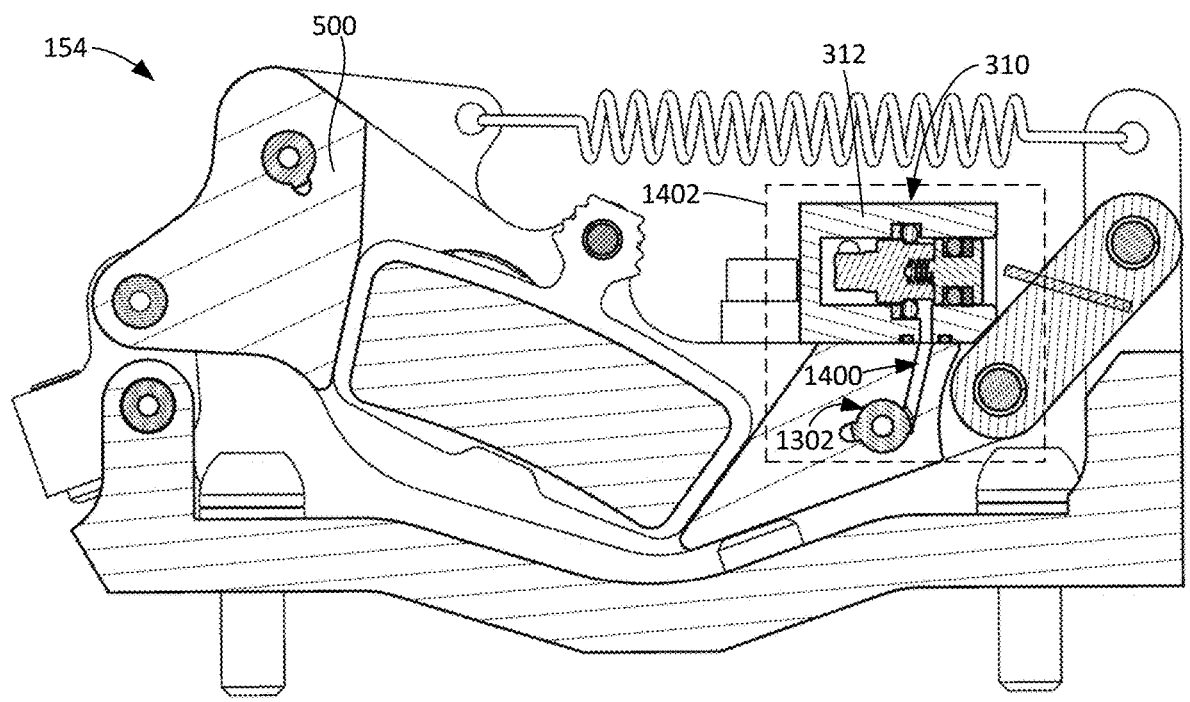
FIG. 14A is a cross-sectional view of the example rear brake caliper taken along line E-E of FIG. 6.
Figure 14B:
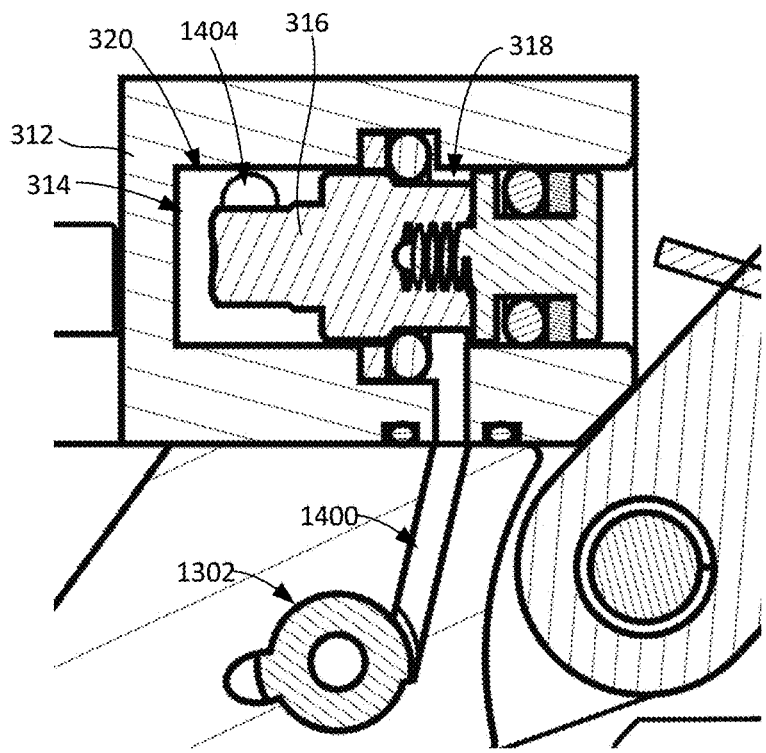
FIG. 14B is an enlarged view of the callout in FIG. 14A.

FIG. 14A is a cross-sectional view of the rear brake caliper 154 taken along line E-E of FIG. 6. As shown in FIG. 14A, the caliper housing 500 and the valve housing 312 includes a third passageway 1400 that fluidly couples the first bore 1302 and the spool valve 310. The third passageway 1400 also forms part of the first port 304 (FIGS. 3 and 13). FIG. 14B is an enlarged view of the callout 1402 in FIG. 14A. As shown in FIG. 14B, the shuttle 316 is disposed in the chamber 314 of the valve housing 312. The chamber 314 and the shuttle 316 define the neutral cavity 318 and the biasing cavity 320. The third passageway 1400 fluidly couples the first bore 1302 and the neutral cavity 318. An opening 1404 (e.g., an inlet/outlet) is shown in the biasing cavity 320 in FIG. 14B that can be used as a bleed port to fill the system with brake fluid during assembly.

Figure 15:
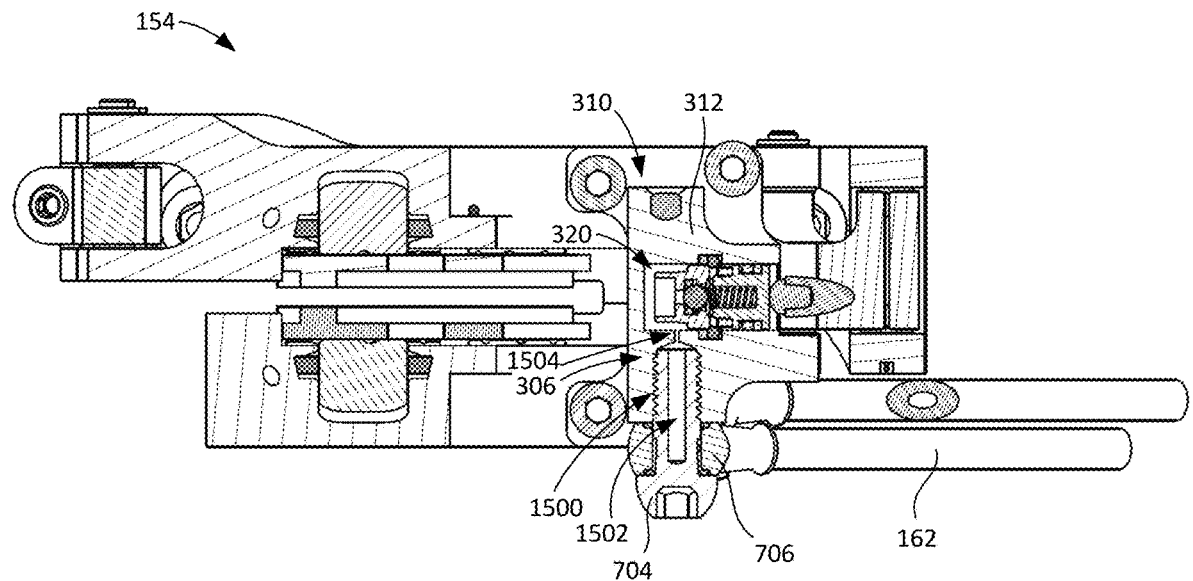
FIG. 15 is a cross-sectional view of the example rear brake caliper taken along line F-F of FIG. 6.
Figure 16:
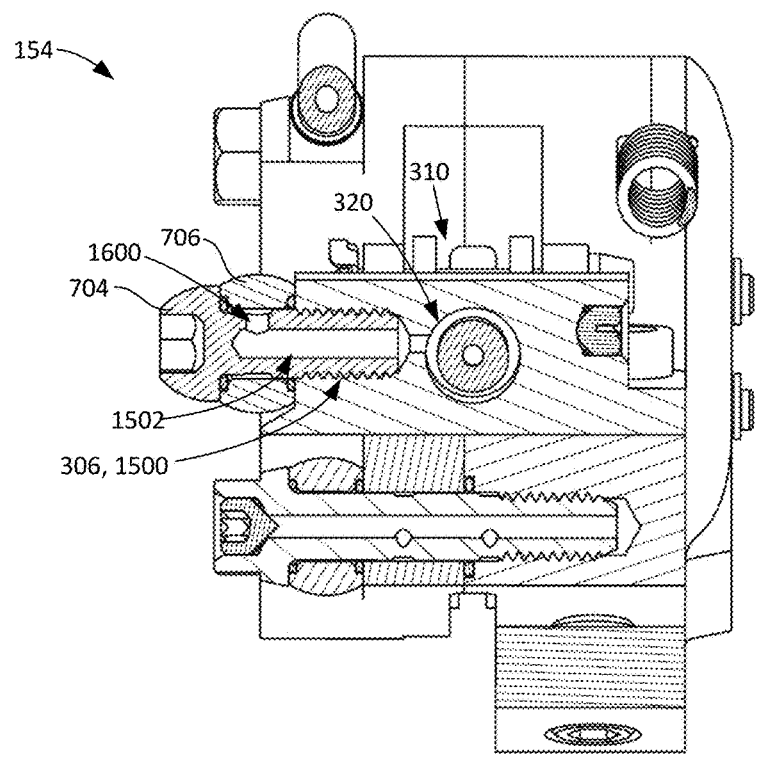
FIG. 16 is a cross-sectional view of the example rear brake caliper taken along line G-G of FIG. 7.

FIG. 15 is a cross-sectional view of the rear brake caliper 154 taken along line F-F of FIG. 6. As disclosed herein, the rear brake caliper 154 includes the second port 306, which fluidly couples the second fluid line 162 to the spool valve 310. The second port 306 may be defined by one or more fluid passageways. For example, as shown in FIG. 15, the valve housing 312 includes a second bore 1500. Similar to the first and third banjo bolts 700, 708 disclosed above, the second banjo bolt 704 is threadably inserted into the second bore 1500 and includes an internal passage 1502. The second fluid line 162 is fluidly coupled to the internal passage 1502 of the second banjo bolt 704 via the second fitting 706 and via an opening in the second banjo bolt 704 (an example of which is shown in FIG. 16). The internal passage 1502 extends to an end of the second banjo bolt 704. As such, the second fluid line 162 is fluidly coupled to the second bore 1500. The second bore 1500 leads to an opening 1504 (an inlet/outlet) in the biasing cavity 320 of the spool valve 310. Therefore, in this example, the second bore 1500 forms the second port 306. In other examples, the second port 306 may be formed by more or fewer passageways and/or the passageway(s) may be arranged in other configurations.

FIG. 16 is cross-sectional view of the rear brake caliper 154 taken along line G-G of FIG. 7. FIG. 16 shows the second bore 1500 (which forms the second port 306) leading to the biasing cavity 320 of the spool valve 310. FIG. 16 also shows the connection between the second fitting 706 and the internal passage 1502 of the second banjo bolt 704. In particular, the second banjo bolt 704 includes an opening 1600 that extends through the second banjo bolt 704 into the internal passage 1502. The opening 1600 is aligned with the second fitting 706. Thus, brake fluid in the second fluid line 162 (and in the second fitting 706) is communicated through the opening 1600 to the internal passage 1502, and vice versa. The first and third banjo bolts 700, 708 and their respective fittings 702, 710 disclosed above may be similarly structured.

Figure 17A:
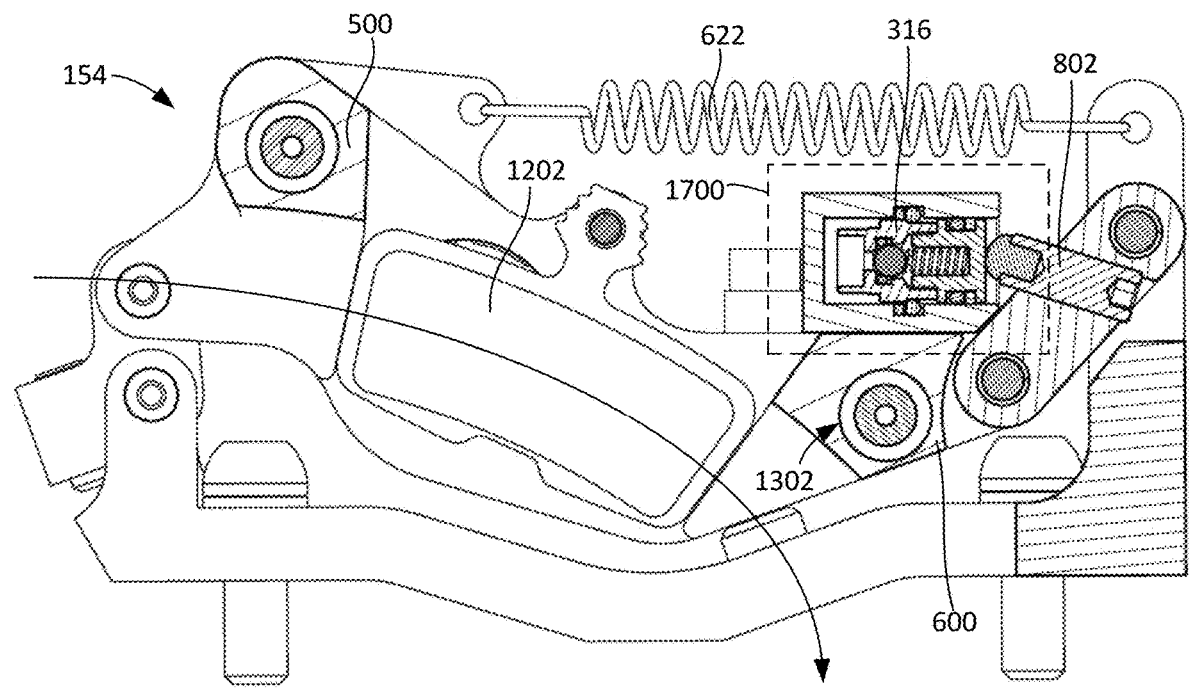
FIG. 17A is a cross-sectional view of the example brake caliper taken along line H-H of FIG. 6.

FIG. 17A is a cross-sectional view of the rear brake caliper 154 taken along line H-H of FIG. 7. FIG. 17A shows the state of the rear brake caliper 154 when the front brake actuator 200 (FIG. 2) is actuated and the rear wheel 106 (FIG. 1) is rotating, such as when the rear wheel 106 is in contact with the riding surface 110 (FIG. 1). When the front brake actuator 200 is actuated, brake fluid is pushed through the first port 304 (e.g., via the first bore 1302 and the first and second passageways 1308, 1310 (FIG. 13)) and into the first and second secondary piston chambers 302a, 302b (FIG. 13). This causes the first and second rear brake pads 1100, 1202 (FIGS. 12 and 13) to engage the rear brake disc 152 (FIG. 1). Even though the first and second secondary piston chambers 302a, 302b are smaller than the first and second primary piston chambers 300a, 300b, the first and second primary piston chamber 302a, 302b produce enough pressure to push the first and second rear brake pads 1100, 1202 into engagement with the rear brake disc 152 and provide some braking to the rear wheel 106. The frictional engagement between the first and second rear brake pads 1100, 1202 and the rear brake disc 152 biases the caliper housing 500 in the forward direction, as indicated by the arrow in FIG. 17A. The forward direction is the forward rotating direction of the rear brake disc 152 and the rear wheel 106. Thus, the caliper housing 500 is biased to the forward position shown in FIG. 17A. In the forward position, the front end 600 of the caliper housing 500 is positioned downward, as shown in the position in FIG. 17A. As such, the stop 802 is forced against the shuttle 316, thereby biasing the shuttle 316 to the open position (to the left in FIG. 17A). The stop 802 provides the rear brake force (FIG. 3B) to maintain the shuttle 316 in the open position. In other words, the stop 802 is biased against the shuttle 316 to maintain the shuttle 316 in the open position. Further, the spring 622 biases the caliper housing 500 to the forward position and, thus, biases the stop 802 against the shuttle 316 in the open direction. However, the spring 622 alone does not provide enough force to maintain the shuttle 316 in the open position.

Figure 17B:
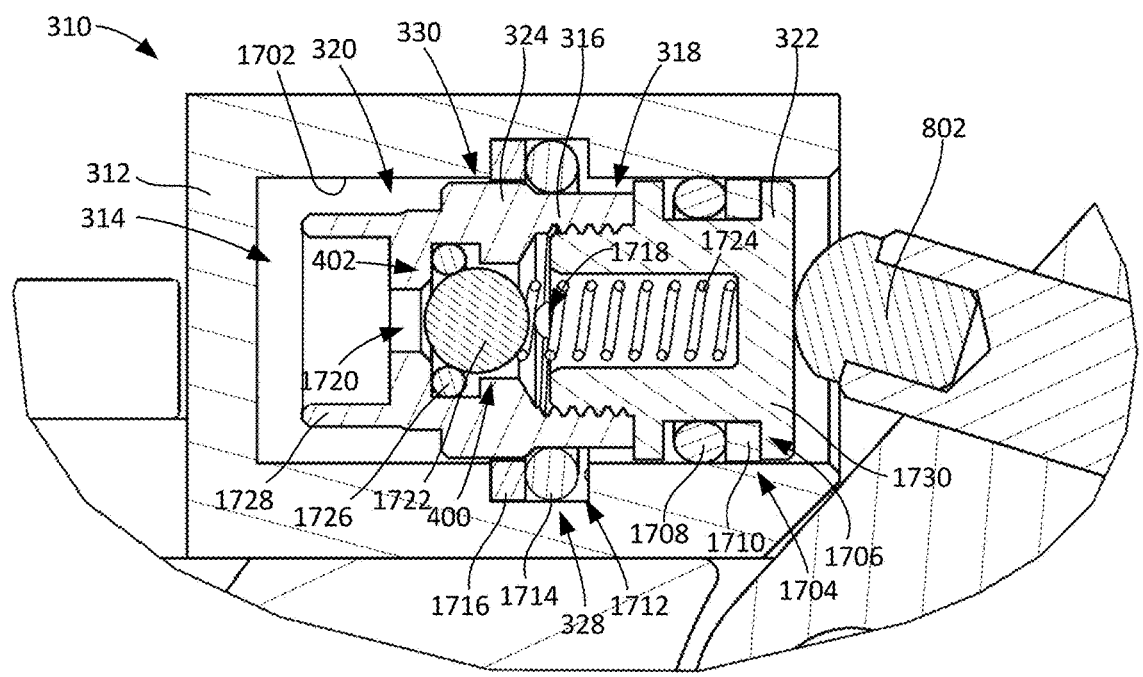
FIG. 17B is an enlarged view of the callout in FIG. 17A, showing an example valve in the open position.

FIG. 17B is an enlarged view of the callout 1700 in FIG. 17A showing the valve 310. As shown in FIG. 17B, the shuttle 316 is slidably disposed in the chamber 314 of the valve housing 312. The first spool 322 is substantially the same diameter as the chamber 314 and is slidable along an inner wall 1702 of the chamber 314. In the illustrated example, a seal assembly 1704 is disposed in a gland 1706 (e.g., a groove) formed in the first spool 322. The seal assembly 1704 creates a seal between the first spool 322 and the inner wall 1702 to prevent leakage. In this example, the seal assembly 1704 includes a first o-ring 1708 and a first retainer 1710. In other examples, the seal assembly 1704 may include more or fewer seals and/or other types of seals. Also shown in FIG. 17B is the seat 328. In the illustrated example, the seat 328 is disposed in a gland 1712 formed in the inner wall 1702. In this example, the seat 328 includes a second o-ring 1714 and a second retainer 1716. In other examples, the seat 328 may include more or fewer seals and/or other types of seals. In FIG. 17B, the shuttle 316 is in the open position. In the open position, the second spool 324 is spaced apart from the second o-ring 1714 of the seat 328 such that the transfer path 330 is formed (to enable fluid flow between the neutral cavity 318 and the biasing cavity 320).

When the front brake actuator 200 (FIG. 2) is actuated and the shuttle 316 is in the open position, the brake fluid from the front brake actuator 200 is supplied via the first port 304 (FIGS. 13 and 14A) to the neutral cavity 318 (e.g., via the third passageway 1400 (FIG. 14)). The brake fluid flows from the neutral cavity 318, through the transfer path 330, and into the biasing cavity 320. From the biasing cavity 320, the brake fluid flows through the second port 306 (FIGS. 15 and 16) to the second fluid line 162 (FIG. 16) and, thus, to the front brake caliper 148 to apply braking pressure at the front wheel 104. When the spool valve 310 is in the open state, the front brake actuator 200 is fluidly coupled to the front brake caliper 148 and can be used to apply or reduce braking pressure to the front brake caliper 148.

As shown in FIG. 17B, the stop 802 is engaged with the first spool 322. The stop 802 provides a force on the shuttle 316 in the open position direction (to the left in FIG. 17B). This force is the result of the combination of the spring 622 (FIG. 17A) and the frictional force from the engagement between the rear brake pads 1100, 1202 (FIGS. 12 and 13) and the rear brake disc 152 (FIG. 1). The force of the pressure of the brake fluid in the neutral cavity 318 acting on the first spool 322 (on the left side of the first spool 322 in FIG. 17B) is less than the force provided by the stop 822 on the first spool 322 (on the right side of the first spool 322 in FIG. 17B). As a result, as long as the rear wheel 106 is rotating and the frictional force is biasing the caliper housing 500 (FIG. 17A) in the forward direction, the spool valve 310 remains in the open state. When the spool valve 310 is in the open state, brake fluid can flow freely between the front brake actuator 200 and the front brake caliper 148. As such, the front brake actuator 200 can be used to apply or reduce braking pressure at the front brake caliper 148.

In this example, the rear brake caliper 154 includes the bypass passageway 400 and the check valve 402. As disclosed herein, the bypass passageway 400 and the check valve 402 may be used to relieve pressure from the front brake caliper 148 (FIG. 1) more quickly when the front brake actuator 200 (FIG. 2) is released. In this example, the bypass passageway 400 and the check valve 402 are integrated into the shuttle 316. In particular, in this example, the bypass passageway 400 extends between a first opening 1718 in the shuttle 316 in fluid communication with the neutral cavity 318 and a second opening 1720 in the shuttle 316 in fluid communication with the biasing cavity 320. In the illustrated example, the check valve 402 includes a ball 1722 (e.g., a flow control member) and a spring 1724. The spring 1724 biases the ball 1722 into a seal 1726 disposed in the bypass passageway 400. When the pressure in the biasing cavity 320 is greater than the combined pressure of the neutral cavity 318 and the spring 1724, the ball 1722 is moved away from the seal 1726 to enable the flow of fluid from the biasing cavity 320 to the neutral cavity 320 (thereby bypassing the seat 328). However, the check valve 402 prevents the flow of fluid through the bypass passageway 400 from the neutral cavity 318 to the biasing cavity 320.

In the illustrated example, the shuttle 318 is constructed of two parts or components, a first component 1728 and a second component 1730. In some instances, this enables easier assembly of the check valve 402 in the shuttle 316. In the illustrated example the first and second components 1728, 1730 are threadably coupled. However, in other examples, the shuttle 316 may be constructed of a single unitary part or component. Further, while in this example the bypass passageway 400 and the check valve 402 are integrated into the shuttle 316, in other examples, the bypass passageway 400 and the check valve may be separate from the shuttle 316. For example, the bypass passageway 400 may be a separate passageway formed in the valve housing 312 and/or the caliper housing 500 between the neutral cavity 318 and the biasing cavity 320 that bypasses the seat 328. In still other examples, the rear brake caliper 154 may not include the check valve 402. In such an example, the shuttle 316 may be constructed of a single unitary part or component.

Figure 18A:
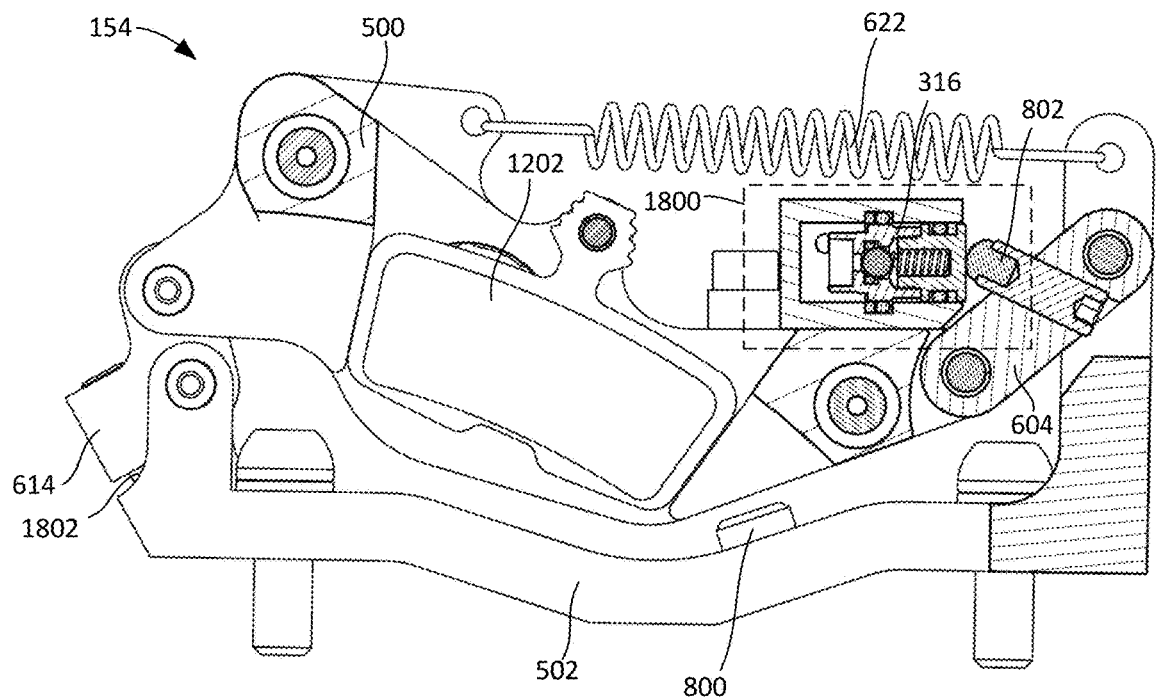
FIG. 18A shows the example rear brake caliper of FIG. 17A when the example front brake actuator is actuated and the rear wheel is not in contact with the riding surface.
Figure 18B:
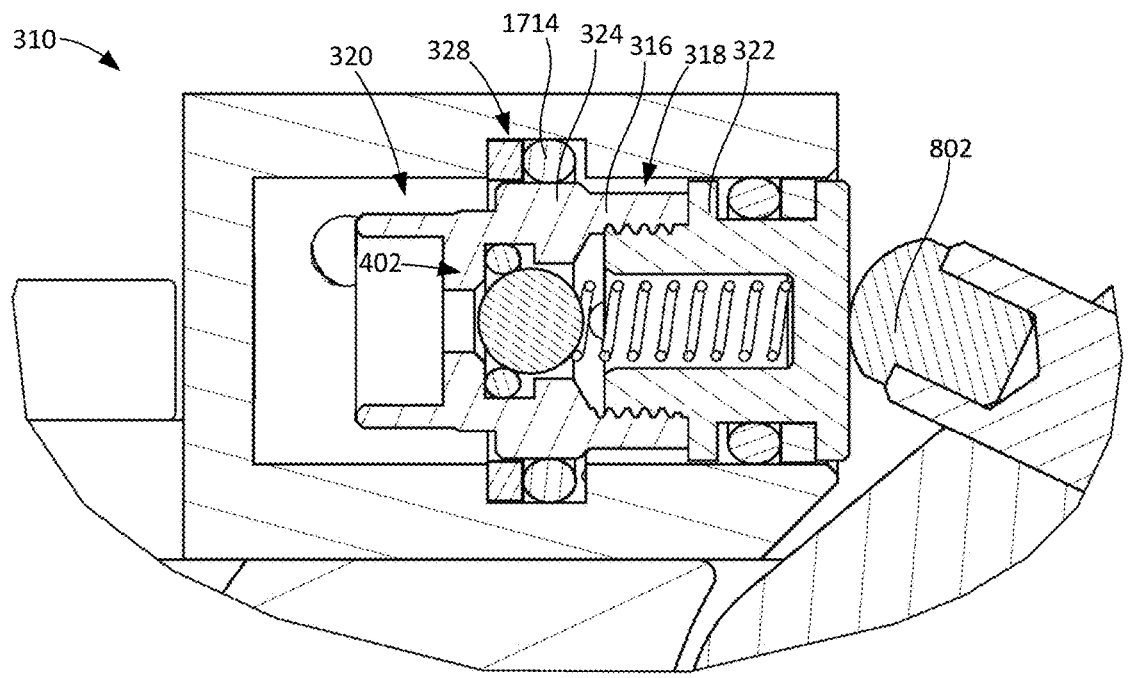
FIG. 18B is an enlarged view of the callout in FIG. 18B, showing the example valve in the closed position.

FIG. 18A shows the state of the rear brake caliper 154 when the front brake actuator 200 (FIG. 2) is actuated and the rear wheel 106 (FIG. 1) is lifted from the riding surface 110 (FIG. 1), and FIG. 18B is an enlarged view of the callout 1800 in FIG. 18A showing the valve 310. While the front brake actuator 200 is actuated, the rear brake pads 1100, 1202 (FIGS. 12 and 13) are pushed into engagement with the rear brake disc 152 (FIG. 1), as disclosed above. However, without the frictional force between the riding surface 110 and the rear wheel 106 to rotate the rear wheel 106, the friction between the rear brake pads 1100, 1202 and the rear brake disc 152 causes the rear wheel 106 to stop rotating, which may occur relative quickly (e.g., 0.5 seconds). Once the rear wheel 106 stops rotating, the biasing force (provided via the brake pads 1100, 1202 and the brake disc 152) on the caliper housing 500 ceases. In this instance, no rear brake force is provided by the stop 802 on the shuttle 316. Instead, the only force provided by the stop 802 on the shuttle 316 is from the spring 622. Therefore, the force from the pressure in the neutral cavity 318 acting on the first spool 322 (on the left side of the first spool 322 in FIG. 18B) is greater than the force provided by the stop 802 on the first spool 322 (on the right side of the first spool 322 in FIG. 18B). As a result of this force differential, the shuttle 316 moves to the closed position shown in FIGS. 18A and 18B. When the shuttle 316 moves to the closed position, the shuttle 316 pushes the stop 802 outward (to the right in FIGS. 18A and 18B). This motion causes the front rocker 604 to pivot the caliper housing 500 in the rearward direction. The rearward direction is opposite or against the forward rotating direction of the rear wheel 106 (FIG. 1) and the rear brake disc 152 (FIG. 1). In other words, when the shuttle 316 moves to the closed position, the shuttle 316 moves the stop 802 and causes the caliper housing 500 to move toward the rearward position. As shown in FIG. 18A, the caliper housing 500 has moved to the rearward position (upward and to the left), away from the first bumper 800. Therefore, the movement of the shuttle 316 from the open position to the closed position causes the caliper housing 500 to move in the rearward direction.

As shown in FIG. 18A, in the rearward position, the rear rocker 614 has a second stop or bumper 1802 that is engaged with the bracket 802 and prevents further movement in the rearward direction. The size and/or locations of the stop 802, the first bumper 800, and the second bump 1802, as well as other features (e.g., the size of the spring 622) of the example rear brake caliper 154, can be varied to affect the range of movement of the caliper housing 500 between the forward and rearward positions. The size and location(s) of these features can be altered for desired performance and pitch-over control sensitivity.

As shown in FIG. 18B, the second spool 324 is sealingly engaged with the second o-ring 1714 of the seat 328, thereby isolating the neutral cavity 318 and the biasing cavity 320. This prevents further pressure from being applied to the front wheel 104 (FIG. 1). Any further pressure is stopped in the neutral cavity 318. The pressure of the brake fluid in the front brake caliper 148 (FIG. 1) (which is fluidly coupled to the biasing cavity 320) reduces as the shuttle 316 is moved to the closed position. This reduction in pressure results in less braking force, which enables the front wheel 104 to rotate slightly faster so that the rear wheel 106 (FIG. 1) falls back down to the riding surface 110 (FIG. 1) and, thus, prevents a pitch-over event.

The spool valve 310 remains in the closed state until the rear wheel 106 (FIG. 1) comes into contact with the riding surface 110 (FIG. 1) again or the rider releases the front brake actuator 200 (FIG. 1). For example, if the rear wheel 106 lowers and comes into contact with the riding surface 110 again, the rear wheel 106 starts rotating. If the front brake actuator 200 is still actuated, the frictional force between the rear brake pads 1100, 1202 (FIGS. 12 and 13) and the rear brake disc 152 (FIG. 1) creates the biasing force again that moves the caliper housing 500 in the forward direction to the forward position (as shown in FIG. 17A). As a result, the stop 802 pushes the shuttle 316 back to the open position (to the left in FIGS. 18A and 18B), thereby fluidly coupling the front brake actuator 200 and the front brake caliper 148 (FIG. 1) again. Therefore, movement of the caliper housing 500 causes a change in state or flow characteristic of the spool valve 310 (e.g., causes the spool valve 310 to open). The shuttle 316 may alternate or oscillate between the open and closed positions as the rear wheel 106 alternates between being in contact with the riding surface 110 and being lifted from the riding surface 110. This enables the rider to safely control the bicycle 100 during a rapid deceleration event.

If the rider releases the front brake actuator 200 while the shuttle 316 is in the closed position (the position shown in FIGS. 18A and 18B), the pressure in the neutral cavity 318 decreases. As a result, the check valve 402 opens and enables the brake fluid to flow from the biasing cavity 320 to the neutral cavity 318 (and, thus, from the first port 304 to the second port 306), which relieves pressure at the front brake caliper 148. Further, the rear brake force provided by the stop 802 (via the spring 622) on the shuttle 316 eventually overcomes the pressure from the neutral cavity 318 acting on the shuttle 316 and the shuttle 316 moves to the open position (to the left in FIGS. 18A and 18B). When the shuttle 316 moves to the open position, the second spool 324 is moved away from the seat 328, and the front brake actuator 200 and the front brake caliper 148 are again fluidly coupled. The pressure in the front brake caliper 148 is reduced as the brake fluid flows back toward the front brake actuator 200.

As seen between FIGS. 17A and 18A, the articulation of the caliper housing 500 between the forward and rearward positions is generally in a circular path along the rotating rear brake disc 152 (FIG. 1) that is centered around an axis of the rear wheel 106. However, in other examples, the caliper housing 500 can be configured to articulate in a path that is not centered around the rear wheel axis. Instead, the caliper housing 500 may articulate (e.g., via the articulating mechanism 501 (FIG. 5)) on some other pre-determined circular, non-circular, linear, or non-linear path. For example, the caliper housing 500 may articulate in a straight line path on a linear slider. Also, while in the illustrated examples the rear brake caliper 154 is disposed in a position that is above or over the rear brake disc 152, in other examples, the rear brake caliper 154 can be disposed in any other location around the rear brake disc 152. For example, the rear brake caliper 154 can be disposed below or under the rear brake disc 152, in front of the rear brake disc 152 (toward the forward direction of the bicycle 100), behind the rear brake disc 152, etc. Additionally or alternatively, the front and rear rockers 604, 614 can be eliminated. Instead, the caliper housing 500 and/or the bracket 502 can be coupled to the frame 102 and/or the rear hub 124 in other configurations that enable articulation (e.g., circular articulation, linear articulation, etc.).

Figure 19:
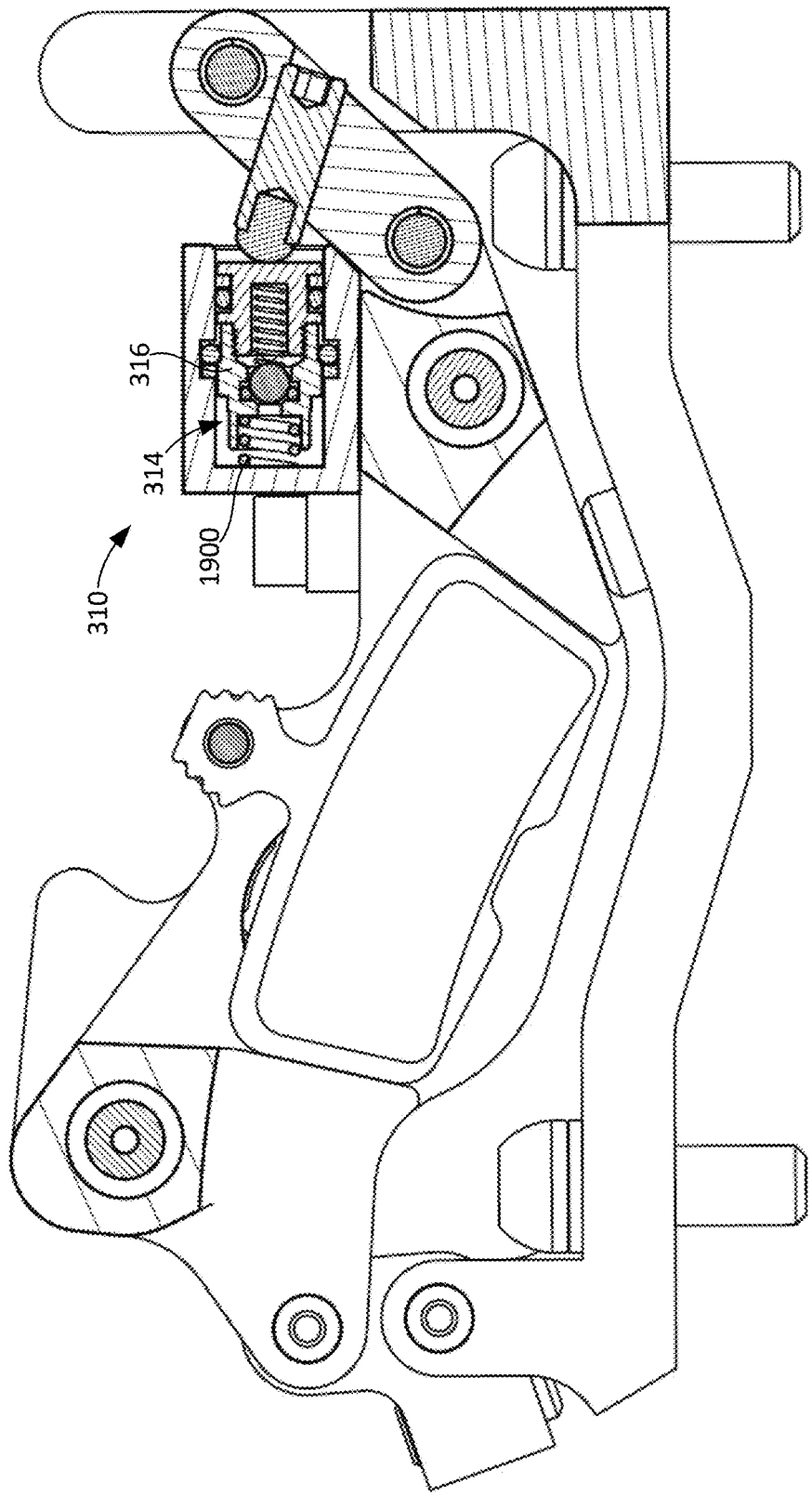
FIG. 19 illustrates an example of the rear brake actuator of FIG. 17A with an additional or alternative spring configuration.

In the illustrated example of FIGS. 5-18B, the spring 622 is external to the spool valve 310. However, in other examples, a spring may be disposed within the spool valve 310. For example, FIG. 19 illustrates an example in which a spring 1900 is disposed in the chamber 314 of the spool valve 310. In this example, the spring 1900 is an extension spring. The spring 1900 biases the shuttle 316 to the open position (to the left in FIG. 19). In some examples, the spring 1900 may be used in combination with the spring 622 to provide a combined force. In other examples, only one of the springs may be employed.

In still other examples, no biasing or return spring may be employed. In such an example, the shuttle 316 may remain in the closed position at rest (when the front brake actuator 200 is not actuated). However, when the front brake actuator 200 is actuated, the rear brake force (if present) would move the shuttle 316 to the open position to enable fluid flow between the front brake actuator 200 and the front brake caliper 148.

In the examples disclosed above in connection with FIGS. 3A-19, the spool valve 310 is configured as a normally open valve. However, in other examples, the spool valve 310 can be configured as a normally closed valve. FIGS. 20A-20D are schematic diagrams of an example valve and fluid passageway configuration in which a normally closed valve configuration is implemented in connection with the brake system 140. This valve configuration may be similarly implemented in connection with the rear brake caliper 154 shown in FIGS. 5-19.

Figure 20A:
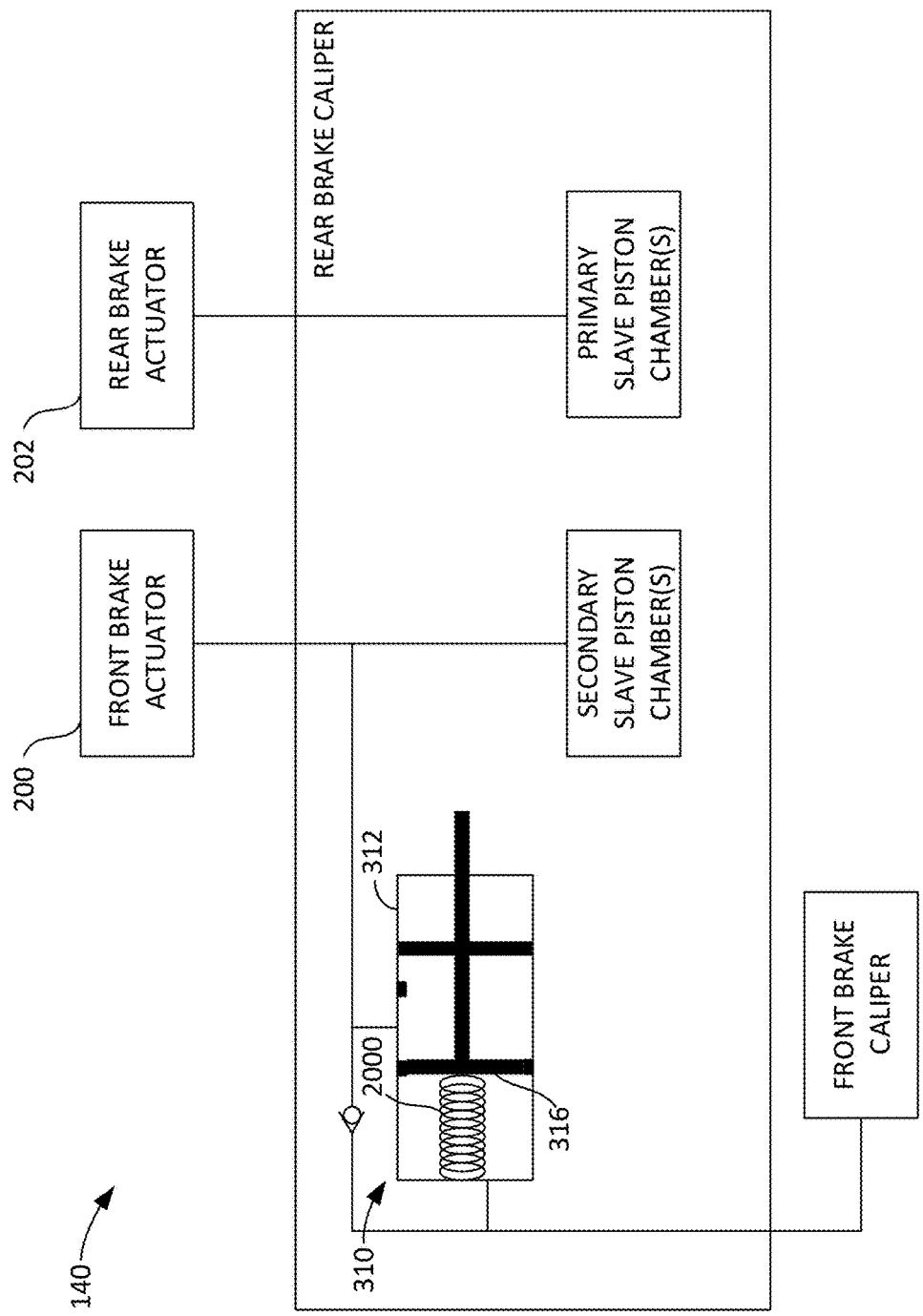
FIG. 20A is a schematic diagram of another example valve and fluid passageway configuration that may be implemented in the example brake system of FIGS. 1 and 2.

FIG. 20A illustrates a state of the brake system 140 when neither the front brake actuator 200 nor the rear brake actuator 202 is actuated. This may occur, for example, when the bicycle 100 (FIG. 1) is at rest or a free rolling state. As shown in FIG. 20A, the shuttle 316 is in the closed position. The shuttle 316 is biased to the closed position (to the right in FIG. 20A) via a spring 2000. Thus, in this example, the spool valve 310 is configured as a normally closed valve. In the illustrated example, the spring 2000 is a compression spring that is disposed in the valve housing 312. In other examples, other types of springs may be used and/or the spring(s) may be disposed in other locations to bias the shuttle 316 to the closed position.

Figure 20B:
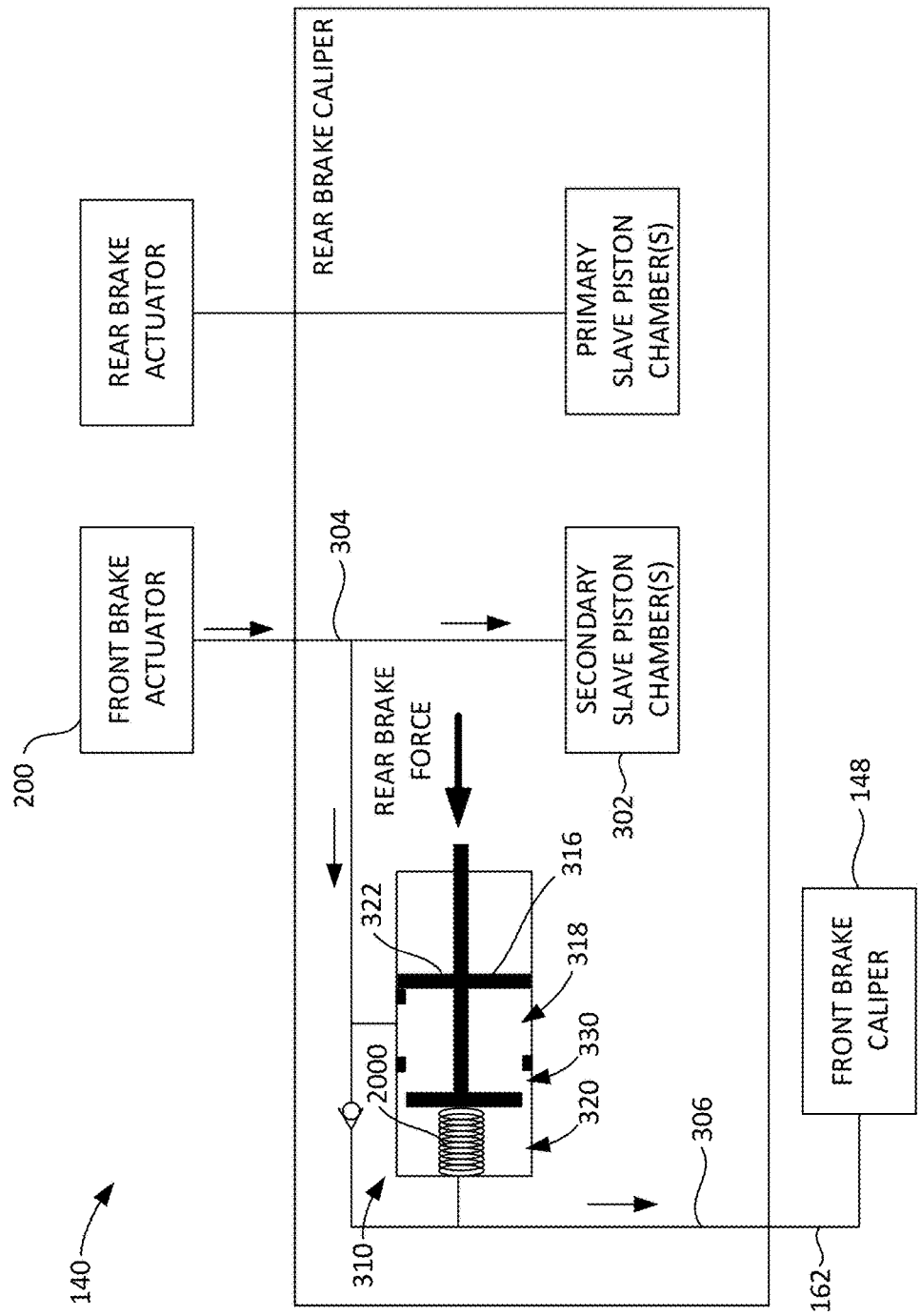
FIG. 20B shows the schematic diagram of FIG. 20A when a front brake actuator is actuated and a rear wheel of the example bicycle is in contact with a riding surface.

FIG. 20B shows the example valve and fluid passageway configuration of FIG. 20A when the front brake actuator 200 is actuated and the rear wheel 106 (FIG. 1) is rotating and remains in contact with the riding surface 110 (FIG. 1). As shown by the arrows, when the front brake actuator 200 is actuated, the front brake actuator 200 pushes brake fluid through the first port 304 and into the secondary slave piston chamber(s) 302 and the spool valve 310. The increased pressure in the secondary slave piston chamber(s) 302 causes the rear brake pads 1100, 1202 (FIGS. 12 and 13) to engage the rear brake disc 152 (FIG. 1). If the rear wheel 106 is rotating (such as when the rear wheel 106 is in contact with the riding surface 110), the frictional force between the rear brake pads 1100, 1202 and the rear brake disc 152 biases the caliper housing 500 (FIG. 5) in the forward direction. As such, a rear brake force is applied to the shuttle 316 to move the shuttle 316 to the open position, as indicated by the arrow. For example, as shown in FIGS. 17A and 17B, the stop 802 biases the shuttle 316 to the open position (to the left in FIGS. 17A and 17B) when the rear brake force is applied. In this example, the rear brake force is greater than the combined force of the spring 2000 and the pressure of the brake fluid in the neutral cavity 318 acting on the first spool 322. As such, the shuttle 316 is moved to the open position. While the shuttle 316 is in the open position, the brake fluid is pushed through the neutral cavity 318, through the transfer path 330, through the biasing cavity 320, through the second port 306, and through the second fluid line 162 to the front brake caliper 148. In this manner, braking pressure is applied to the front wheel 104 (FIG. 1). As such, as long as the rear wheel 106 is rotating (which is indicative of contact with the riding surface 110), the frictional engagement provides enough force to maintain the spool valve 310 in the open state. This enables brake fluid to flow back-and-forth between the front brake actuator 200 and the front brake caliper 148 as desired. Therefore, a rider may use the front brake actuator 200 to apply braking pressure to the front wheel 104 or relieve braking pressure from the front wheel 104.

Figure 20C:
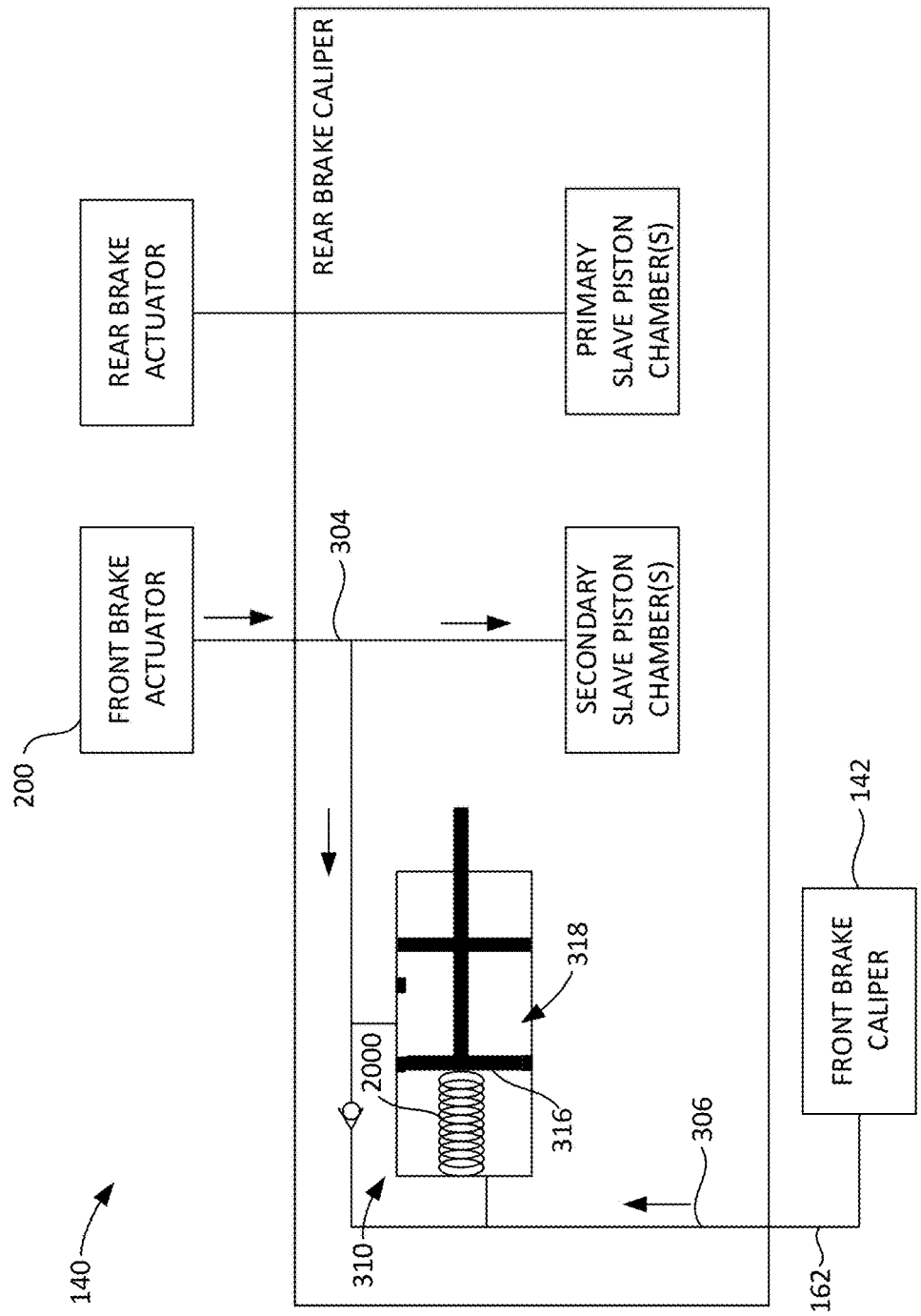
FIG. 20C shows the schematic diagram of FIGS. 20A and 20B when the front brake actuator is actuated and the rear wheel of the example bicycles is not in contact with the riding surface.

FIG. 20C shows the example valve and fluid passageway configuration of FIGS. 20A and 20B when the front brake actuator 200 is actuated while the rear wheel 106 (FIG. 1) is lifted off of the riding surface 110 (FIG. 1). As disclosed herein, when the rear wheel 106 is lifted off of the riding surface 110, the pressure from the rear brake pads 1100, 1202 (FIGS. 12 and 13) stops the rear brake disc 152 and the rear wheel 106. This may occur relatively quickly because no frictional force from the riding surface 110 is rotating the rear wheel 106. Once the rear wheel 106 has stopped rotating, the rear braking force (FIG. 20B) applied to the shuttle 316 ceases. The combined force from the spring 2000 and the pressure of the brake fluid in the neutral cavity 318 moves the shuttle 316 to the closed position (to the right in FIG. 20C).

When the shuttle 316 is in the closed position, the first port 304 is isolated or fluidly disconnected from the second port 306 and, thus, the front brake actuator 200 is disconnected from the front brake caliper 148. Therefore, the front brake actuator 200 cannot apply more pressure to the front brake caliper 148. The brake fluid in the second port 306, the second fluid line 162, and the front brake caliper 148 flows in the opposite direction (back toward the spool valve 310) and reduces in pressure. This is due to the expansion of the biasing cavity 320 and the disconnection from the first port 304 (which was previously supplying a flow of brake fluid). The reduction in pressure reduces or relieves braking pressure at the front brake caliper 148. As a result, the front wheel 104 (FIG. 1) can move faster, which reduces the pitching moment and enables the rear wheel 106 to move back down to the riding surface 110. Once the rear wheel 106 contacts the riding surface 110 again and begins to rotate, the rear brake force is applied again to the shuttle 316 (as in FIG. 20B), which causes the shuttle 316 to move back to the open position (to the left in FIG. 20C). Similar to the valve configuration disclosed in connection with FIGS. 3A-3D, the spool valve 310 in this configuration may oscillate or alternate between the open and closed states as the rear wheel 106 is lifted up and down from the riding surface 110.

Figure 20D:
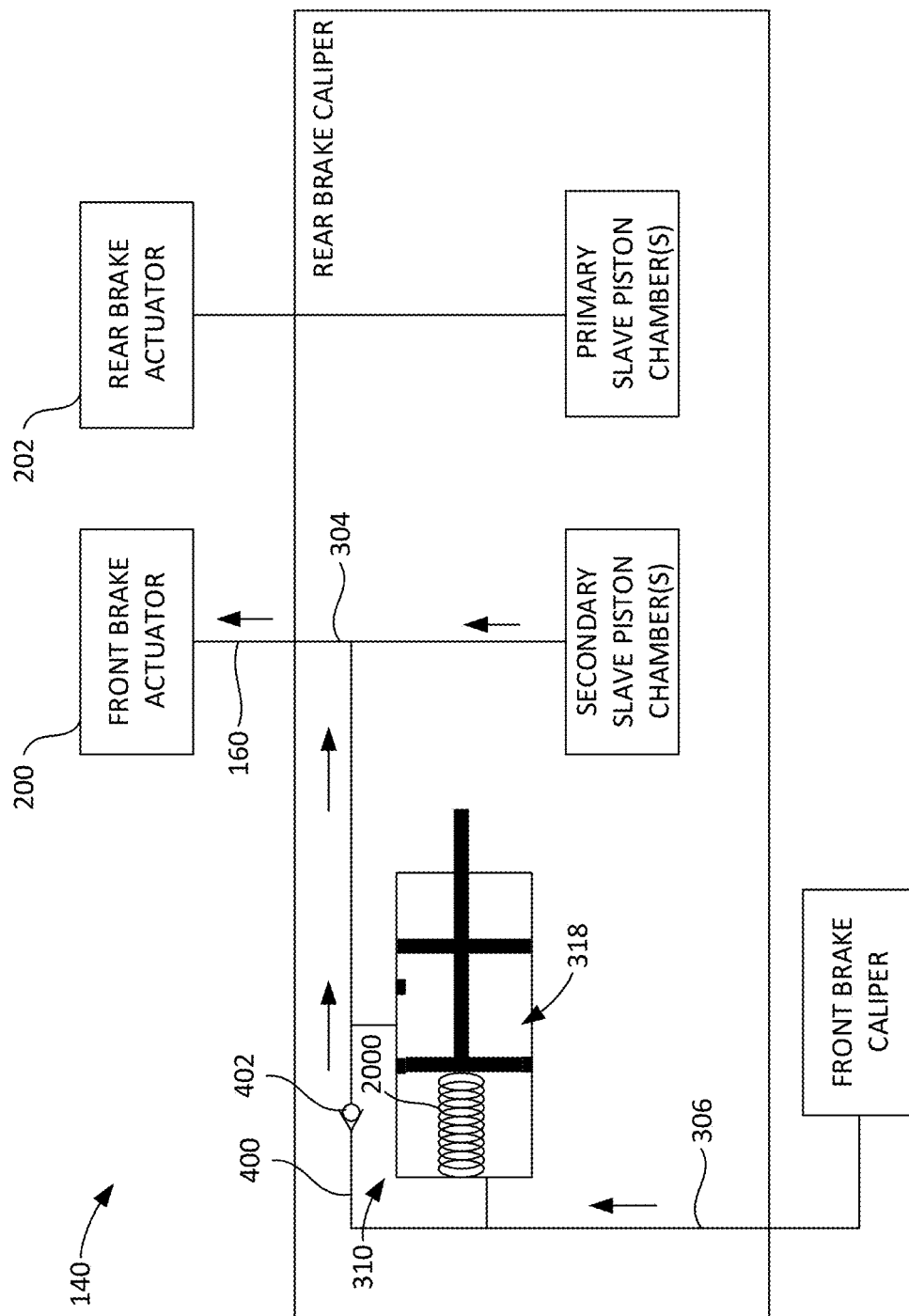
FIG. 20D shows the schematic diagram of FIGS. 20A-20C when the front brake actuator is released.

As shown in FIG. 20D, when the front brake actuator 200 is released to relieve braking pressure, the brake fluid in the first port 304 and the first fluid line 160 flows back toward the front brake actuator 200. As a result, the frictional engagement between the rear brake pads 1100, 1202 (FIGS. 12 and 13) and the rear brake disc 152 (FIG. 1) is reduced and/or ceased. Further, the pressure in the neutral cavity 318 of the spool valve 310 decreases. Once the pressure in the neutral cavity 318 decreases a sufficient amount, the force from the spring 2000 pushes the shuttle 316 to the closed position as shown in FIG. 20D.

In the illustrated example of FIGS. 20A-20D, the rear brake caliper 154 includes the bypass passageway 400 and the check valve 402 (referenced in FIG. 20D), which enables brake fluid to flow from the second port 306 to the first port 304 to relieve or reduce braking pressure more quickly. Thus, when releasing the front brake actuator 200, the brake fluid is moved from the front brake caliper 148 toward the front brake actuator 200, as indicated by the arrows. However, in other examples, the bypass passageway 400 and the check valve 402 may not be included. The rear brake actuator 202 may be used to independently actuate the rear brake caliper 154, similar to the example disclosed above.

In the example configurations shown in FIGS. 3A-4 (normally open) and FIGS. 20A-20D (normally closed), the secondary slave piston chamber(s) 302 are fluidly coupled to the first port 304 (e.g., upstream from the spool valve 310). Therefore, actuation or release of the front brake actuator 200 directly affects the pressure in the secondary slave piston chamber(s) 302, independent of whether the spool valve 310 is open or closed. In other examples, the rear brake caliper 154 may be configured such that the secondary slave piston chamber(s) 302 are fluidly coupled to the second port 306 (e.g., downstream from the spool valve 310). FIGS. 21A-21D are schematic diagrams of an example valve and fluid passageway configuration implemented in connection with the brake system 140 in which the secondary slave piston chamber(s) 302 are fluidly coupled to the second port 306. This valve configuration may be similarly implemented in connection with the rear brake caliper 154 shown in FIGS. 5-19.

Figure 21A:
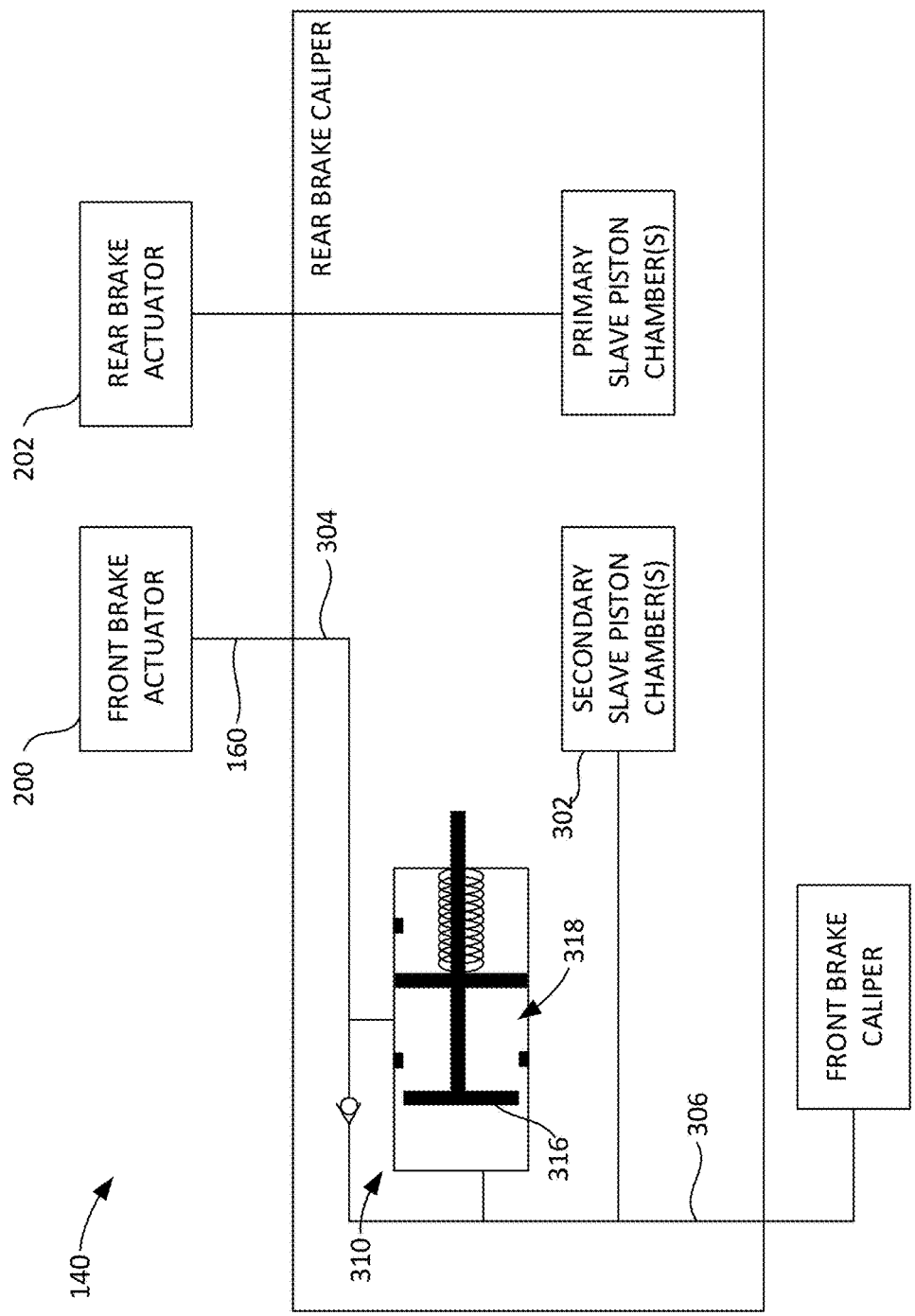
FIG. 21A is a schematic diagram of another example valve and fluid passageway configuration that may be implemented in the example brake system of FIGS. 1 and 2.

FIG. 21A illustrates a state of the brake system 140 when neither the front brake actuator 200 nor the rear brake actuator 202 is actuated. In this example, the spool valve 310 is configured as a normally open valve. Thus, the spool valve 310 operates substantially the same as disclosed above in connection with FIGS. 3A-3D. In FIG. 21A, the shuttle 316 is in the opened position. The first port 304 fluidly couples the first fluid line 160 to the neutral cavity 318 of the spool valve 310. In this example, the secondary slave piston chambers 302 are fluidly coupled to the second port 306.

Figure 21B:
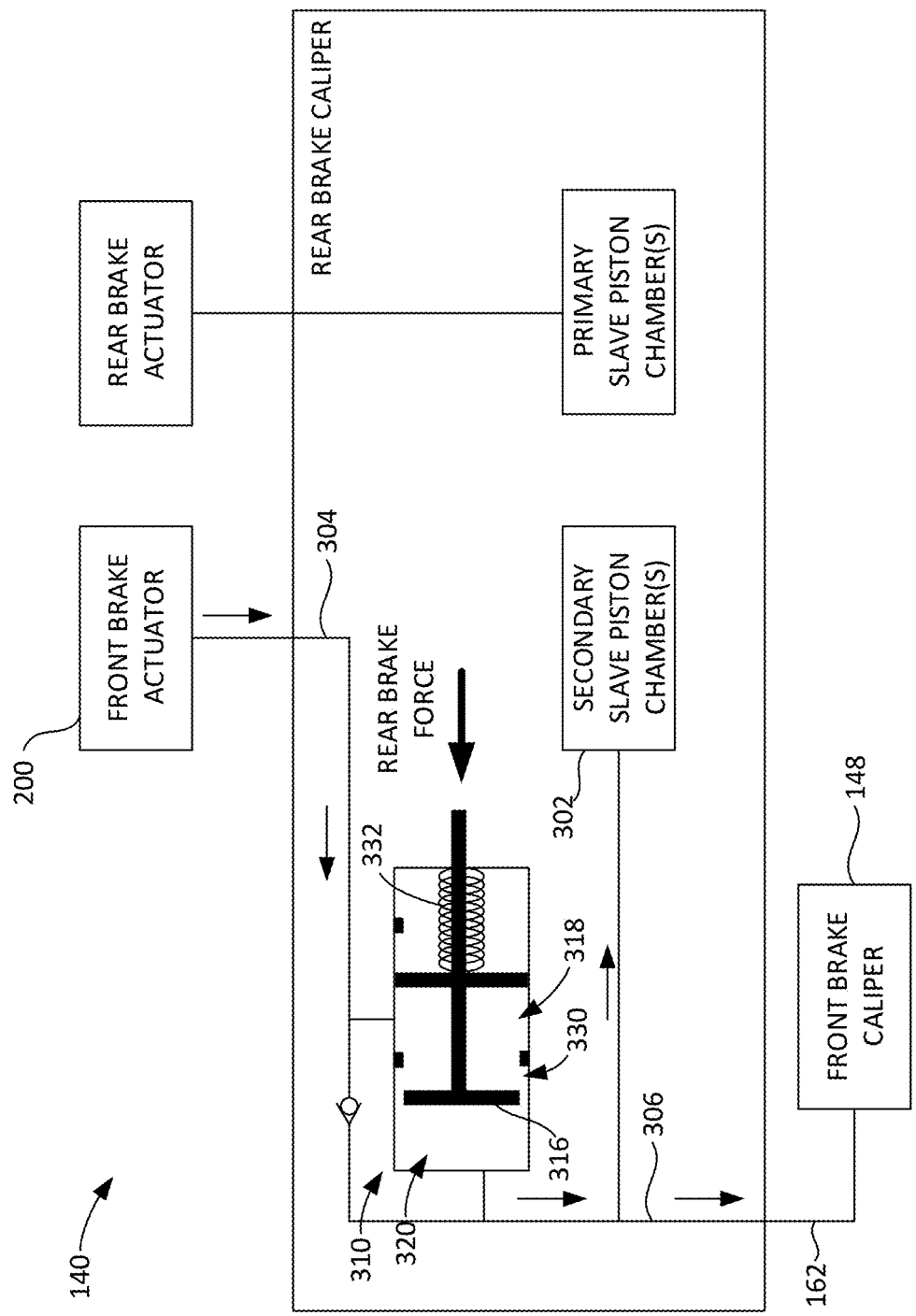
FIG. 21B shows the schematic diagram of FIG. 21A when a front brake actuator is actuated and a rear wheel of the example bicycle is in contact with a riding surface.

FIG. 21B shows the example valve and fluid passageway configuration of FIG. 20A when the front brake actuator 200 is actuated and the rear wheel 106 (FIG. 1) is rotating and remains in contact with the riding surface 110 (FIG. 1). As shown by the arrows, when the front brake actuator 200 is actuated, the front brake actuator 200 pushes brake fluid through the first port 304 and into the spool valve 310. The brake fluid is pushed through the neutral cavity 318, through the transfer path 330, through the biasing cavity 320, through the second port 306, and through the second fluid line 162 to the front brake caliper 142. The brake fluid also flows from the second port 306 into the secondary slave piston chamber(s) 302, which causes the rear brake pads 1100, 1202 (FIGS. 12 and 13) to engage the rear brake disc 152 (FIG. 1). If the rear wheel 106 is rotating (such as when the rear wheel 106 is in contact with the riding surface 110), the frictional force between the rear brake pads 1100, 1202 and the rear brake disc 152 biases the caliper housing 500 (FIG. 5) in the forward direction. As such, a rear brake force is applied to the shuttle 316 to move the shuttle 316 to the open position, as indicated by the arrow. For example, as shown in FIGS. 17A and 17B, the stop 802 biases the shuttle 316 to the open position (to the left in FIGS. 17A and 17B) when the rear brake force is applied. In this example, the combined force of the rear brake force and the spring 332 acting on the shuttle 316 is greater than the force from the pressure of the brake fluid in the neutral cavity 318. As such, the shuttle 316 is maintained in the open position. As such, as long as the rear wheel 106 is rotating (which is indicative of contact with the riding surface 110), the frictional engagement provides enough force to maintain the spool valve 310 in the open state. This enables brake fluid to flow back-and-forth between the front brake actuator 200 and the front brake caliper 148 as desired.

Figure 21C:
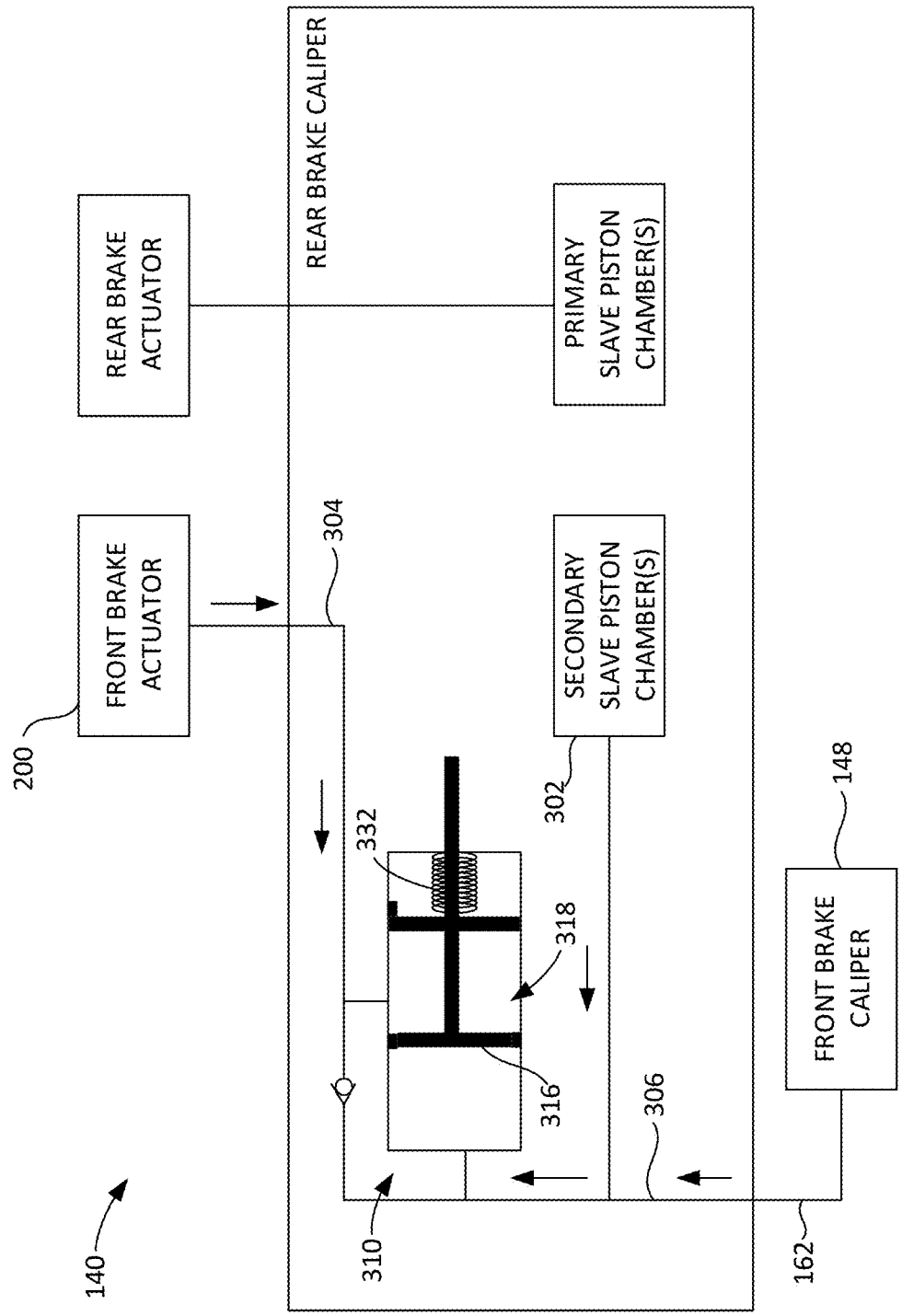
FIG. 21C shows the schematic diagram of FIGS. 21A and 21B when the front brake actuator is actuated and the rear wheel of the example bicycles is not in contact with the riding surface.

FIG. 21C shows the example valve and fluid passageway configuration of FIGS. 21A and 21B when the front brake actuator 200 is actuated while the rear wheel 106 (FIG. 1) is lifted off of the riding surface 110 (FIG. 1). As disclosed herein, when the rear wheel 106 is lifted off of the riding surface 110, the pressure from the rear brake pads 1100, 1202 (FIGS. 12 and 13) stops the rear brake disc 152 and the rear wheel 106. Once the rear wheel 106 has stopped rotating, the rear braking force (FIG. 21B) applied to the shuttle 316 ceases. The force from the pressure in the neutral cavity 318 overcomes the force from the spring 332 and moves the shuttle to the closed position (to the right in FIG. 21C).

When the shuttle 316 is in the closed position, the first port 304 is isolated or fluidly disconnected from the second port 306 and, thus, the front brake actuator 200 is disconnected from the front brake caliper 148. Therefore, the front brake actuator 200 cannot apply more pressure to the front brake caliper 148. The brake fluid in the second port 306, the second fluid line 162, and the front brake caliper 148 flows in the opposite direction (back toward the spool valve 310) and reduces in pressure. This reduces or relieves braking pressure at the front brake caliper 148. As a result, the front wheel 104 (FIG. 1) can move faster, which reduces the pitching moment and enables the rear wheel 106 to move back down to the riding surface 110. Further, the pressure of the brake fluid in the secondary slave piston chamber(s) 302 reduces slightly. However, enough pressure is still maintained such that the rear brake pads 1100, 1202 (FIGS. 12 and 13) remain engaged with the rear brake disc 152 (FIG. 1).

If the rear wheel 106 contacts the riding surface 110 again and begins to rotate, the rear brake force is applied again to the shuttle 316 (as in FIG. 21B), which causes the shuttle 316 to move to the open position (to the left in FIG. 21C). Similar to the valve configuration disclosed in connection with FIGS. 3A-3D and FIGS. 20A-20D, the spool valve 310 in this configuration may oscillate or alternate between the open and closed states as the rear wheel 106 is lifted up and down from the riding surface 110.

Figure 21D:
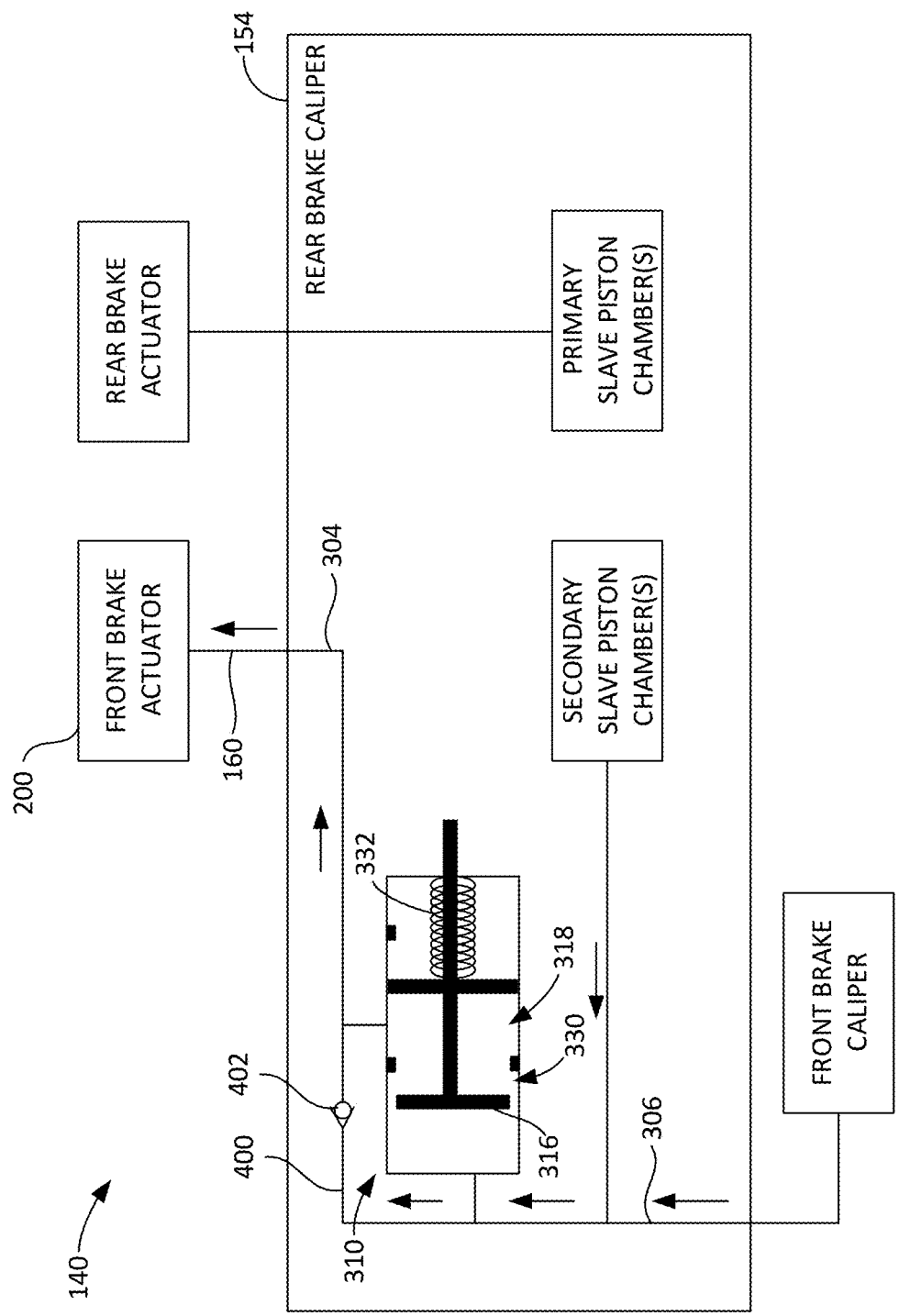
FIG. 21D shows the schematic diagram of FIGS. 21A-21C when the front brake actuator is released.

As shown in FIG. 21D, when the front brake actuator 200 is released to relieve braking pressure, the brake fluid in the first port 304 and the first fluid line 160 moves back toward the front brake actuator 200, as shown in FIG. 20D. In the illustrated example, the rear brake caliper 154 includes the bypass passageway 400 and the check valve 402, which enables brake fluid to flow from the second port 306 to the first port 304 to relieve or reduce braking pressure. Thus, the brake fluid in the second port 306 flows back toward the first port 304, thereby releasing the braking pressure applied on the front wheel 104 and the rear wheel 106. In other examples, the bypass passageway 400 and the check valve 402 may not be included. Once the pressure in the neutral cavity 318 decreases a sufficient amount, the force from the spring 332 pushes the shuttle 316 to the open position show in FIG. 21D. Once the shuttle 316 is open, brake fluid may also flow through the transfer path 330 back to the first port 304. The rear brake actuator 202 may be used to independently actuate the rear brake caliper 154, similar to the example disclosed above.

As disclosed above, with this example configuration, the pressure in the secondary slave piston chamber(s) 302 is slightly reduced when the spool valve 310 is closed. Therefore, when the rear wheel 106 falls back to the riding surface 110, less braking pressure is applied to the rear wheel 106, which results in a less abrupt impact when the rear wheel 106 comes into contact with the riding surface 110. In other words, the rear wheel 106 begins rotating again faster than the other configurations where higher braking pressure is maintained in the secondary slave piston chamber(s) 302 when the front brake actuator 202 is actuated.

Figure 22A:
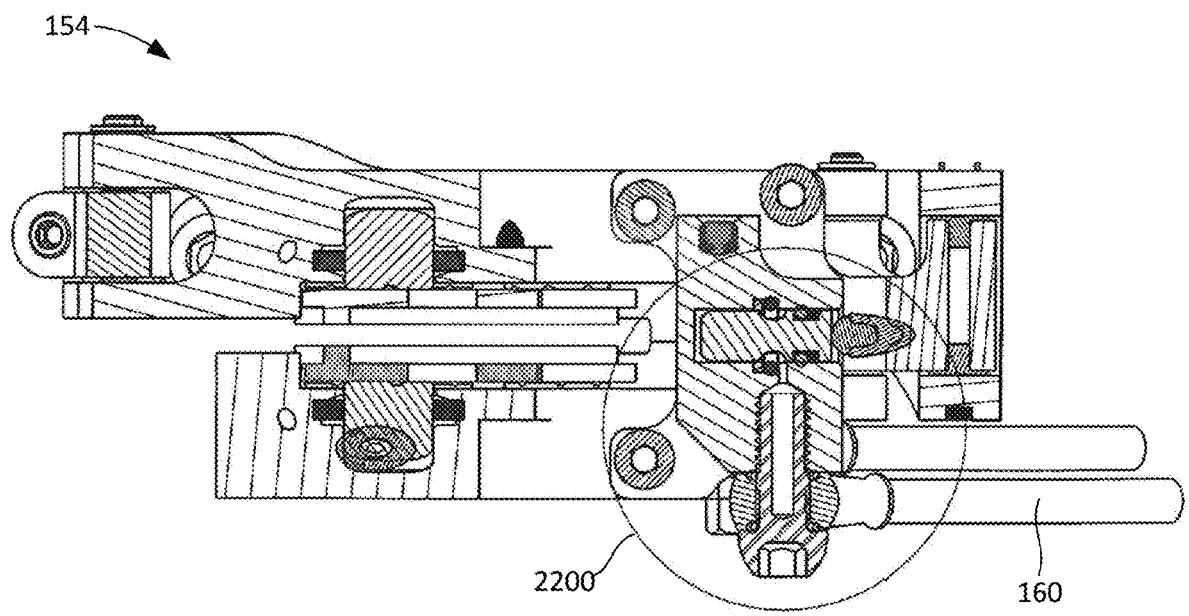
FIG. 22A is a cross-sectional view an example rear brake caliper of the example brake system of FIGS. 1 and 2 and implemented with the example configuration shown in the schematic diagram of FIGS. 21A-21D.
Figure 22B:
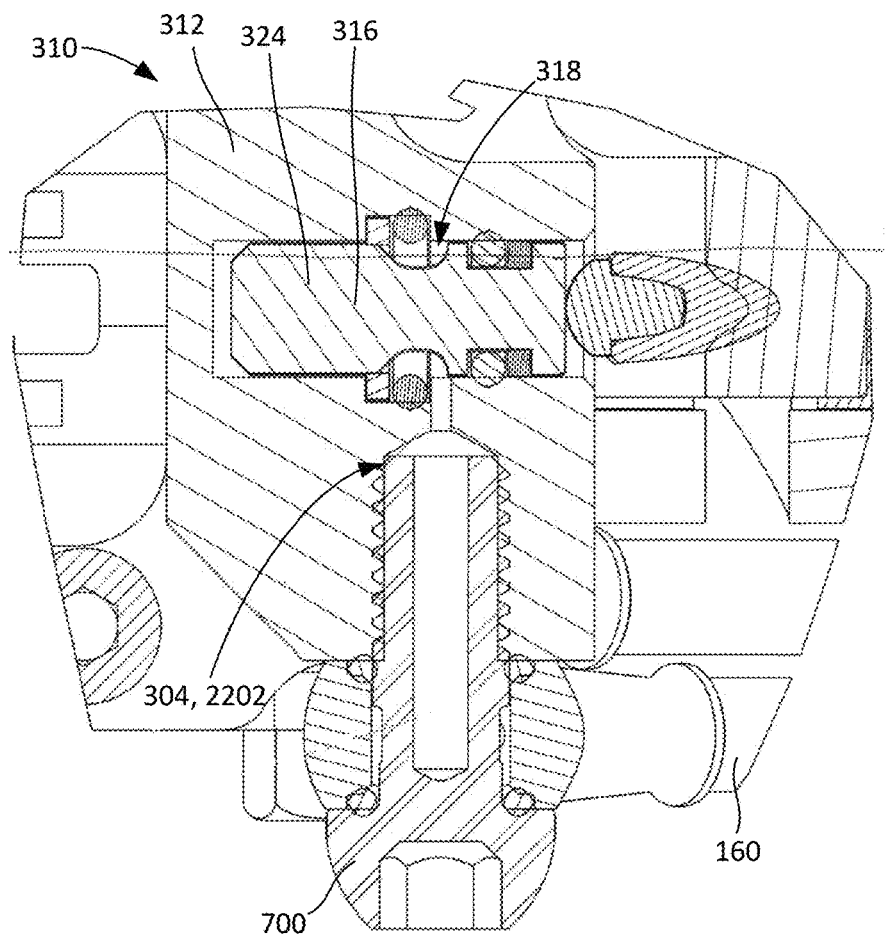
FIG. 22B is an enlarged view of the callout in FIG. 22A.

FIGS. 22A, 22B, 23A, and 23B illustrate an example physical implementation of the brake system 140 with the example valve and fluid passageway configuration illustrated in the schematic diagram of FIGS. 21A-21D. FIG. 22A is a cross-sectional view of the example rear brake caliper 154 taken along a similar line as F-F shown in FIG. 15. FIG. 22B is an enlarged view of the callout 2200 in FIG. 22A. In this example, the first and second ports 304, 306 have been switched as compared to the physical implementation in FIGS. 5-19. For example, the first port 304 is formed by a first bore 2202 formed in the valve housing 312 and fluidly coupled to the neutral cavity 318 of the spool valve 310. The first banjo bolt 700 is threadably inserted into the first bore 2202, such that the first fluid line 160 is fluidly coupled to the neutral cavity 318 of the spool valve. In this example, the second spool 324 of the shuttle 316 is larger (e.g., wider and/or longer) than the shuttle 316 in other examples. In some examples, a longer shuttle 316 is easier to install than a shorter shuttle 316. Further, in this example, the rear brake caliper 154 is shown without the bypass passageway 400 and the check valve 402. However, in other examples the rear brake caliper 154 may incorporate a check valve, similar to the example implementation shown in FIGS. 17B and 18B.

Figure 23A:
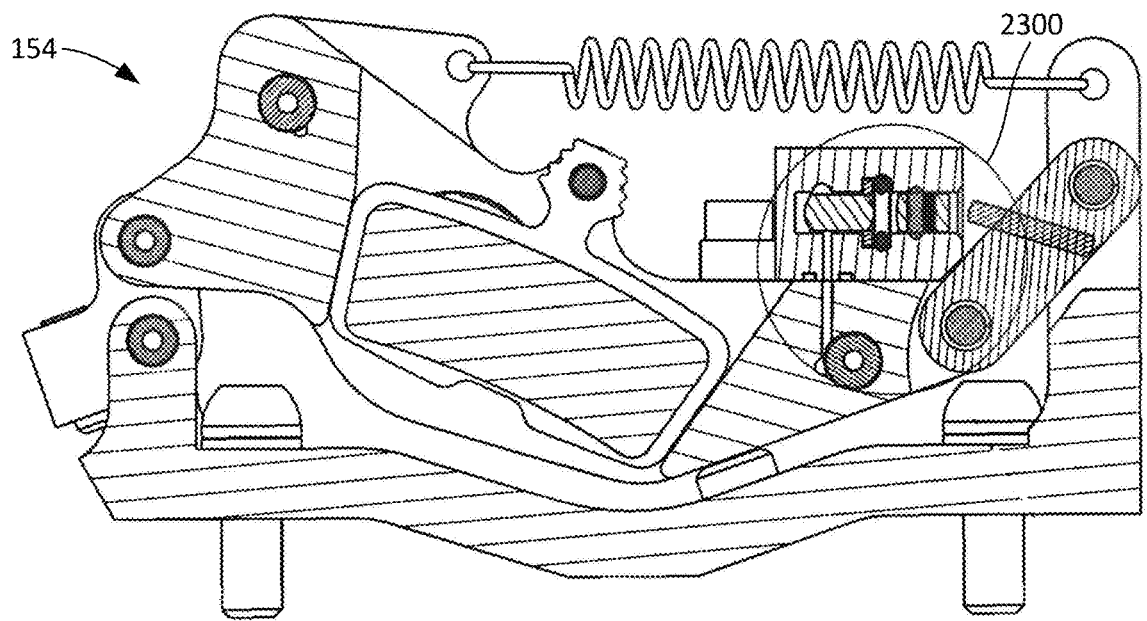
FIG. 23A is another cross-sectional view of the example rear brake caliper of FIG. 22A implemented with the example configuration shown in the schematic diagram of FIGS. 21A-21D.
Figure 23B:
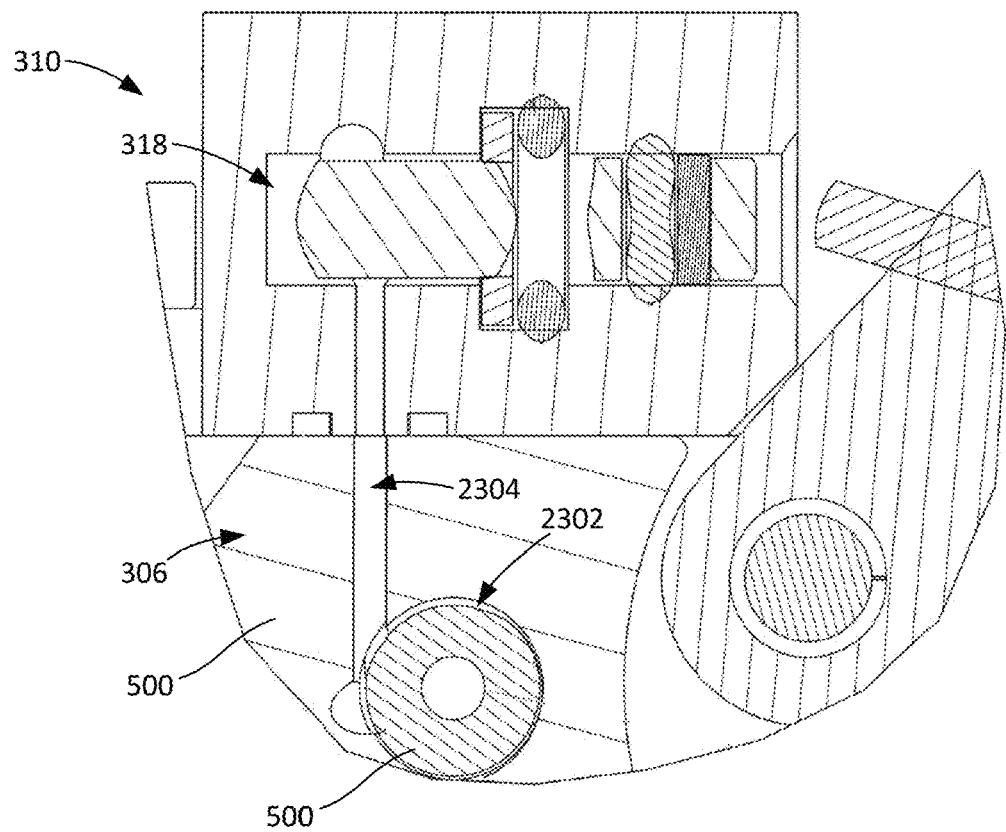
FIG. 23B is an enlarged view of the callout in FIG. 22A.

FIG. 23A is a cross-sectional view of the rear brake caliper 154 taken along a similar line as E-E shown in FIG. 14A. FIG. 23B is an enlarged view of the callout 2300 in FIG. 23A. In this example, the second port 306 is formed by a second bore 2302 formed in the caliper housing 500 and a passageway 2304 extending from the second bore 2302 to the biasing cavity 320 of the spool valve 310. The second banjo bolt 704 is threadably inserted into the second bore 2302. Further, additional passageways fluidly couple the second bore 2302 to the first and second secondary piston chambers 302a, 302b, similar to the first and second passageways 1308, 1310 shown in FIG. 13. Therefore, in this example, the secondary slave piston chamber(s) 302 are fluidly coupled to the second port 306 (e.g., downstream of the spool valve 310).

From the foregoing, it will be appreciated that the above disclosed brake systems and apparatus reduce the likelihood of or prevent pitch-over events from excessive braking on the front wheel of a bicycle. As such, the example brake systems and apparatus enable better control of the bicycle and improve safety to the rider. The example brake systems and methods achieve this result without electronic components, as seen in known anti-pitch systems. Further, the example brake systems and methods still enable independent control of the front and back brakes.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rear brake caliper for a bicycle, the rear brake caliper comprising:
    a caliper housing to be coupled to the bicycle, the caliper housing including:
        a port to be fluidly coupled to a fluid line fluidly coupled to a second brake caliper; and
        and a valve configured to control fluid flow between the port and the second brake caliper, wherein movement of the caliper housing causes a change in state of the valve.

2. The rear brake caliper of claim 1, further including an articulating mechanism, the caliper housing to be coupled to the bicycle via the articulating mechanism, wherein the articulating mechanism facilitates the movement of the caliper housing.

3. The rear brake caliper of claim 2, wherein the articulating mechanism includes a bracket, and wherein the caliper housing is moveable relative to the bracket between a forward position and a rearward position.

4. The rear brake caliper of claim 3, further including a stop engaged with a flow control member of the valve, the flow control member movable between an open position in which the port is fluidly coupled to the second caliper and a closed position in which the port is isolated from the second caliper.

5. The rear brake caliper of claim 4, further including a rear brake pad, wherein, when a front brake actuator is actuated and a rear wheel of the bicycle is in contact with a riding surface, the caliper housing is biased toward the forward position via frictional engagement between the rear brake pad and a rear brake disc, which biases the stop against the flow control member to maintain the flow control member in the open position.

6. The rear brake caliper of claim 5, wherein, when the front brake actuator is actuated and the rear wheel is not in contact with the riding surface, the flow control member is moved to the closed position, which moves the stop and causes the caliper housing to move toward the rearward position.

7. The rear brake caliper of claim 3, further including a spring coupled between the bracket and the caliper housing, the spring to bias the caliper housing toward the forward position.

8. The rear brake caliper of claim 1, further including a rear brake pad, wherein the caliper housing includes a secondary piston chamber with a secondary piston, the secondary piston coupled to the rear brake pad, and a second port fluidly coupled to the secondary piston chamber such that when a front brake actuator is actuated brake fluid is supplied to the secondary piston chamber to move the rear brake pad into engagement with a rear brake disc.

9. The rear brake caliper of claim 8, wherein the caliper housing includes:
 a primary piston chamber with a primary piston coupled to the rear brake pad, the primary piston chamber isolated from the secondary piston chamber; and
 a third port to be fluidly coupled to a third fluid line fluidly coupled to a rear brake actuator, the third port fluidly coupled to the primary piston chamber such that actuation of the rear brake actuator supplies brake fluid to the primary piston chamber to move the rear brake pad into engagement with the rear brake disc.

10. The rear brake caliper of claim 1, wherein the movement is caused by an interaction between the rear brake caliper and a brake disk.

11. The rear brake caliper of claim 1, wherein the movement is a first movement, and a second movement causes a second change in state of the valve.

12. The rear brake caliper of claim 11, wherein the first movement and the second movement are in opposing directions.

13. A brake system for a bicycle, the brake system comprising:
 a front brake actuator;
 a front brake caliper;
 a rear brake actuator;
 a rear brake caliper;
 a first fluid line coupled between the front brake actuator and the rear brake caliper;
 a second fluid line coupled between the rear brake caliper and the front brake caliper;
 wherein the rear brake caliper includes a valve configured to control fluid flow in the second fluid line.

14. The brake system of claim 13, wherein movement of a housing of the rear caliper causes a change in state of the valve.

15. The brake system of claim 14, further comprising a third fluid line coupled between the rear brake actuator and the rear brake caliper.

* * * * *